(12) United States Patent
Moto

(10) Patent No.: US 11,693,208 B2
(45) Date of Patent: Jul. 4, 2023

(54) OPTICAL SENSING SYSTEM

(71) Applicant: TDK TAIWAN CORP., Taoyuan (TW)

(72) Inventor: Ichitai Moto, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 690 days.

(21) Appl. No.: 16/738,486

(22) Filed: Jan. 9, 2020

(65) Prior Publication Data
US 2021/0190952 A1 Jun. 24, 2021

Related U.S. Application Data

(60) Provisional application No. 62/799,886, filed on Feb. 1, 2019.

(30) Foreign Application Priority Data

Dec. 20, 2019 (EP) .................................. 19218906

(51) Int. Cl.
| | | |
|---|---|---|
| *G02B 26/08* | (2006.01) | |
| *G02B 7/182* | (2021.01) | |
| *G02B 26/10* | (2006.01) | |
| *H02K 41/035* | (2006.01) | |
| *G01S 7/481* | (2006.01) | |
| *G01B 11/24* | (2006.01) | |
| *G01S 17/42* | (2006.01) | |

(52) U.S. Cl.
CPC ............ *G02B 7/1821* (2013.01); *G01B 11/24* (2013.01); *G01S 7/4813* (2013.01); *G01S 7/4816* (2013.01); *G01S 7/4817* (2013.01); *G01S 17/42* (2013.01); *G02B 26/0816* (2013.01); *G02B 26/101* (2013.01); *G02B 26/105* (2013.01); *H02K 41/0356* (2013.01); *H02K 2201/18* (2013.01)

(58) Field of Classification Search
None
See application file for complete search history.

(56) References Cited

U.S. PATENT DOCUMENTS

2015/0355089 A1* 12/2015 Takase ................. G01N 29/225

\* cited by examiner

*Primary Examiner* — Christopher G Findley
(74) *Attorney, Agent, or Firm* — Muncy, Geissler, Olds & Lowe, P.C.

(57) ABSTRACT

An optical sensing system is provided, including a sensing module, a light emitter, and a light receiver. The sensing module has a substrate, an optical waveguide disposed on the substrate, and a sensing membrane disposed on the optical waveguide for carrying a specimen. The light emitter emits a sensing light to the optical waveguide, and the light receiver receives the sensing light that propagates through the optical waveguide.

19 Claims, 49 Drawing Sheets

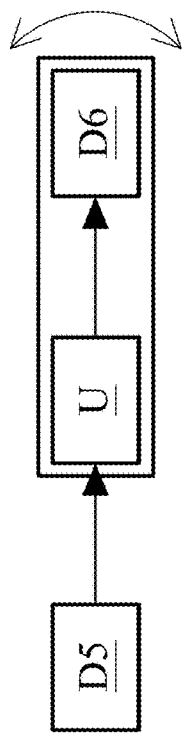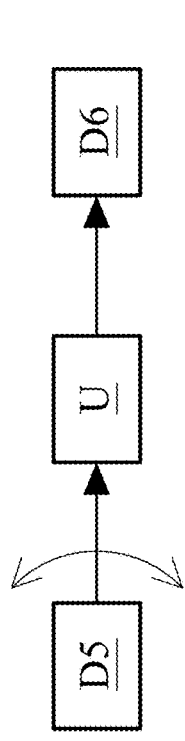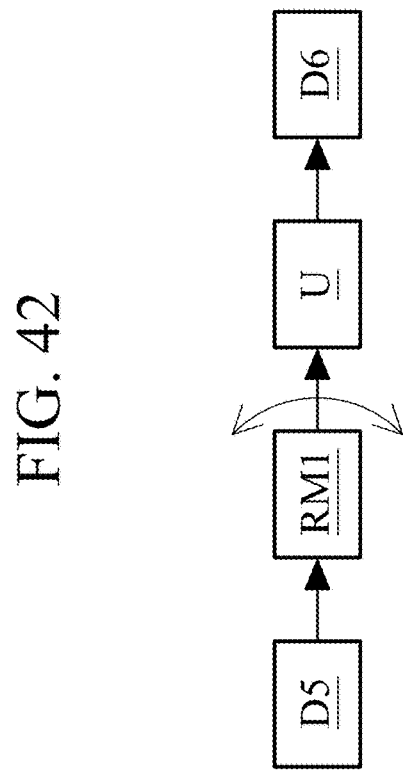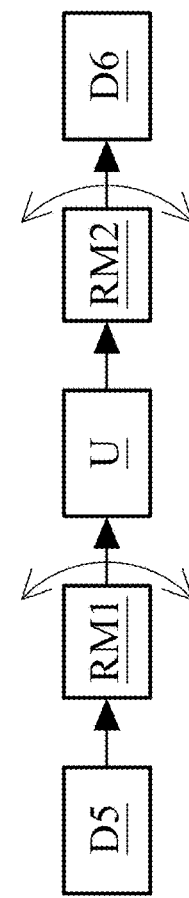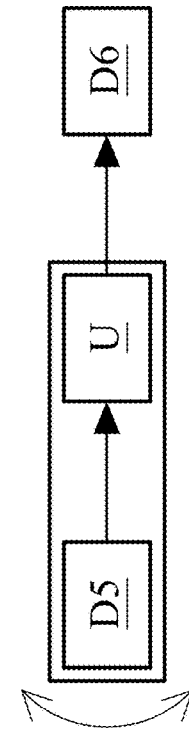
FIG. 38   FIG. 39   FIG. 40   FIG. 41   FIG. 42   FIG. 43   FIG. 44

OPTICAL SENSING SYSTEM

CROSS REFERENCE TO RELATED APPLICATIONS

This Application claims priority of provisional U.S. Patent Application Ser. No. 62/799,886, filed on Feb. 1, 2019, and European Patent Application No. 19218906.6 filed Dec. 20, 2019, the entirety of which are incorporated by reference herein.

BACKGROUND OF THE INVENTION

Field of the Invention

The application relates in general to a driving mechanism, and in particular, to a driving mechanism for moving an optical element.

Description of the Related Art

With the progress being made in 3D sensing technologies, Advanced Driver Assistance Systems (ADAS) have been installed in modern vehicles. For example, Advanced Driver Assistance Systems (ADAS) may have such functions as real-time 3D object detection, large-scale 3D vehicle detection, and 3D object recognition.

Conventional 3D sensing technologies may be implemented by applying light detection and ranging (LiDAR), infrared detection, or ultrasound detection. However, to improve the efficiency and reduce the sizes of conventional 3D sensing devices become a challenge. Moreover, since various optical sensing technologies have been applied to the field of point-of-care testing (POCT), it has also become a challenge to improve the efficiency and achieve miniaturization of the optical sensing systems.

BRIEF SUMMARY OF INVENTION

In view of the aforementioned problems, the object of the invention is to provide an optical sensing system that includes a sensing module, a light emitter, and a light receiver. The sensing module has a substrate, a light guide element disposed on the substrate, and a sensing film disposed on the light guide element for retaining a specimen. The light emitter emits a sensing light to the light guide element. The light receiver receives the sensing light that propagates through the light guide element.

BRIEF DESCRIPTION OF DRAWINGS

The invention can be more fully understood by reading the subsequent detailed description and examples with references made to the accompanying drawings, wherein:

FIG. 38 is a perspective diagram showing the sensing light L propagates from the light emitter D5 through the sensing module U to the light receiver D6.

FIG. 39 is a perspective diagram showing the light emitter D5 is rotatable relative to the sensing module U.

FIG. 40 is a perspective diagram showing the light emitter D5 and the light receiver D6 are both rotatable relative to the sensing module U.

FIG. 41 is a perspective diagram showing the light emitter D5 and the sensing module U are rotatable relative to the light receiver D6.

FIG. 42 is a perspective diagram showing the light receiver D6 and the sensing module U are rotatable relative to the light emitter D5.

FIG. 43 is a perspective diagram showing the first light path adjusting element RM1 is rotatable relative to the sensing module U.

FIG. 44 is a perspective diagram showing the first and second light path adjusting elements RM1 and RM2 are both rotatable relative to the sensing module U.

DETAILED DESCRIPTION OF INVENTION

The making and using of the embodiments of the optical sensing system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
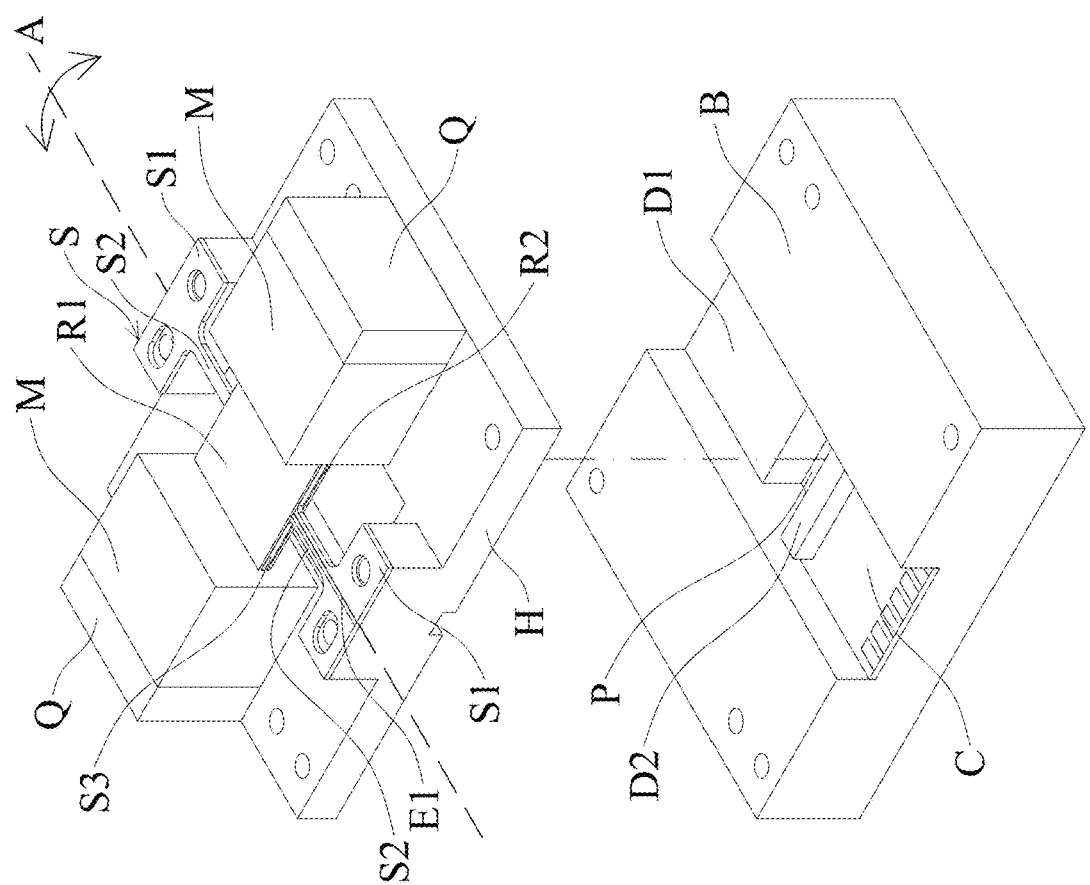
FIG. 1 is an exploded diagram of a driving mechanism in accordance with an embodiment of the invention.
Figure 2:
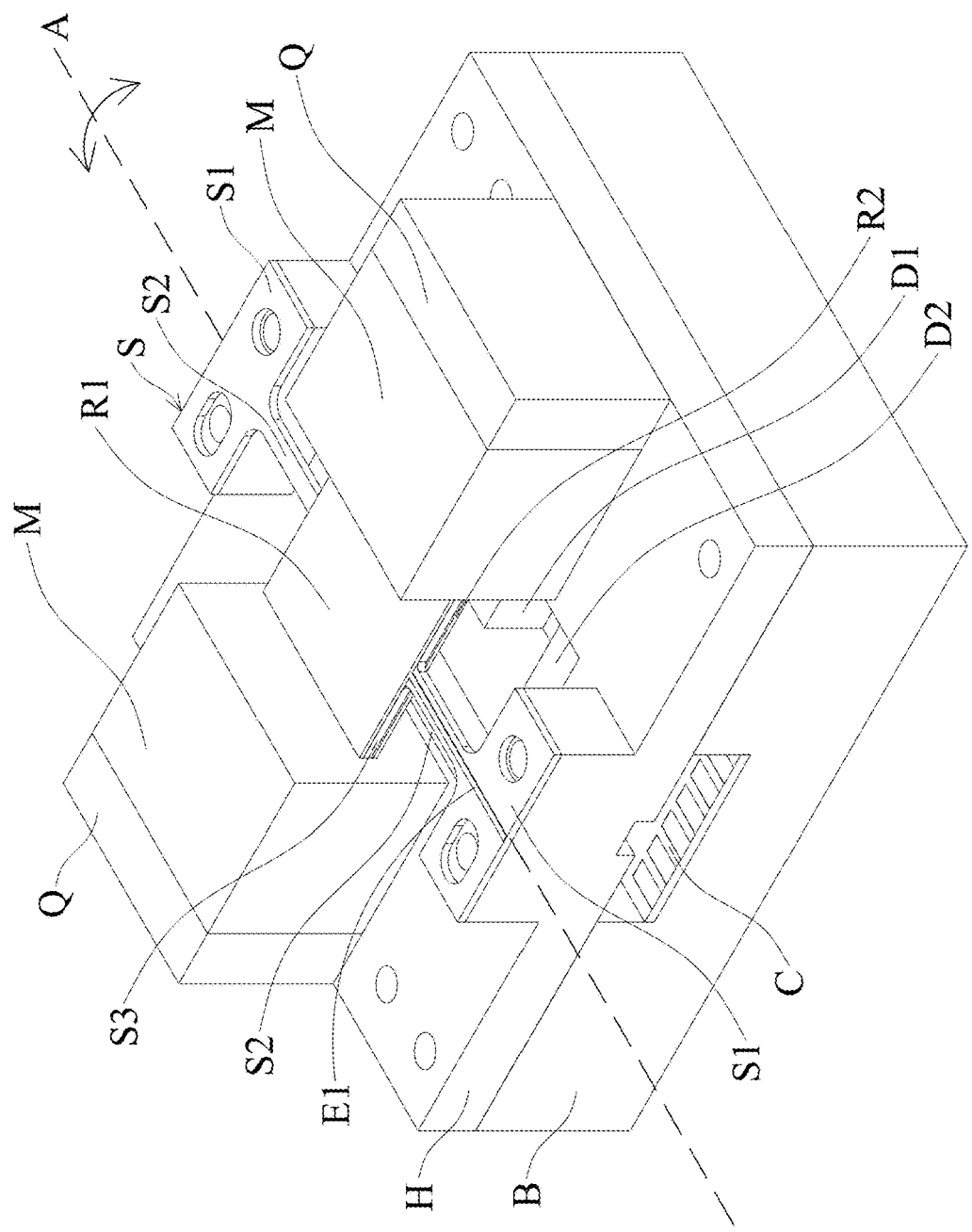
FIG. 2 is a perspective diagram of the driving mechanism in FIG. 1 after assembly.
Figure 3:
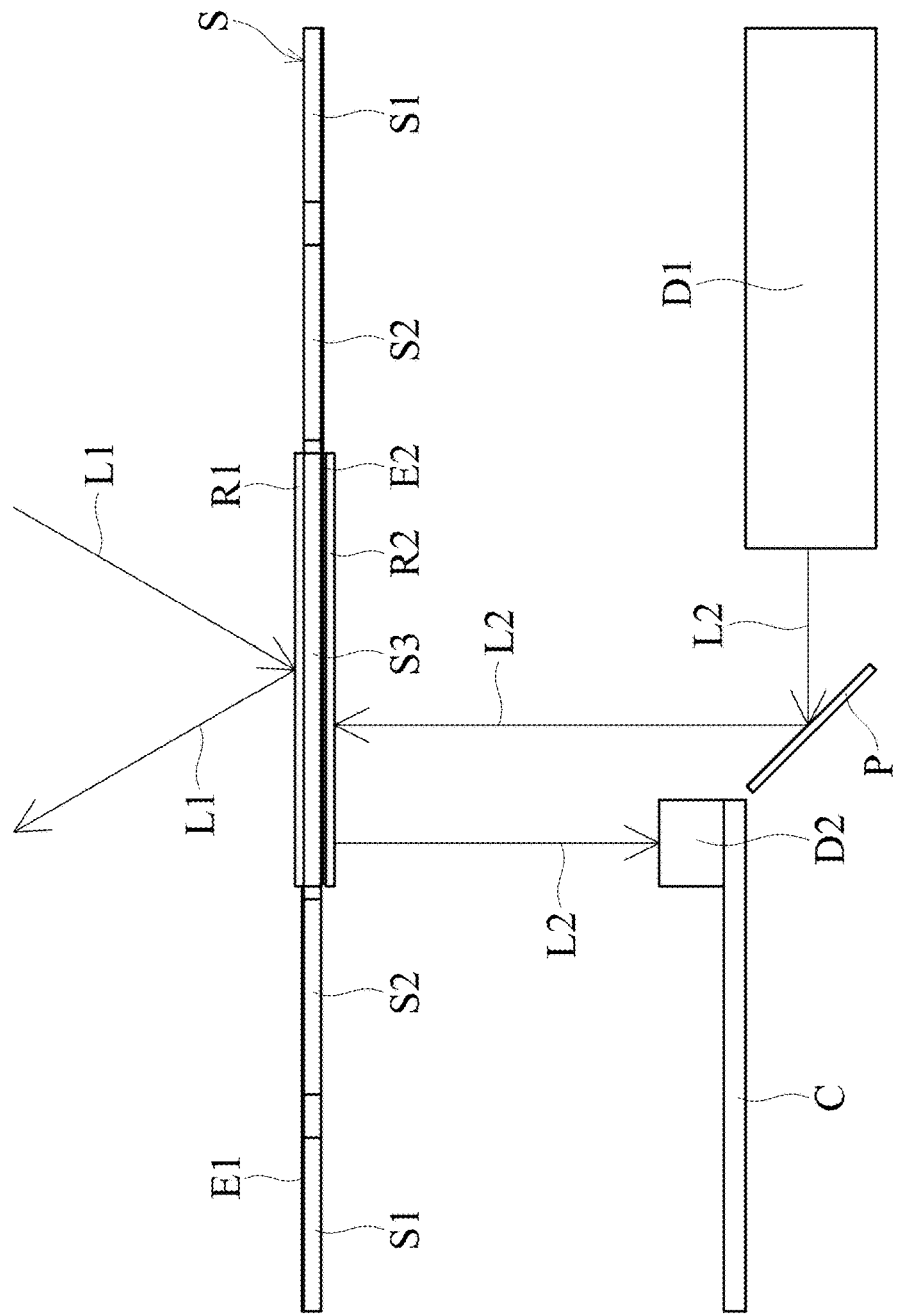
FIG. 3 is a perspective diagram showing an optical system in the driving mechanism of FIGS. 1 and 2.
Figure 4:
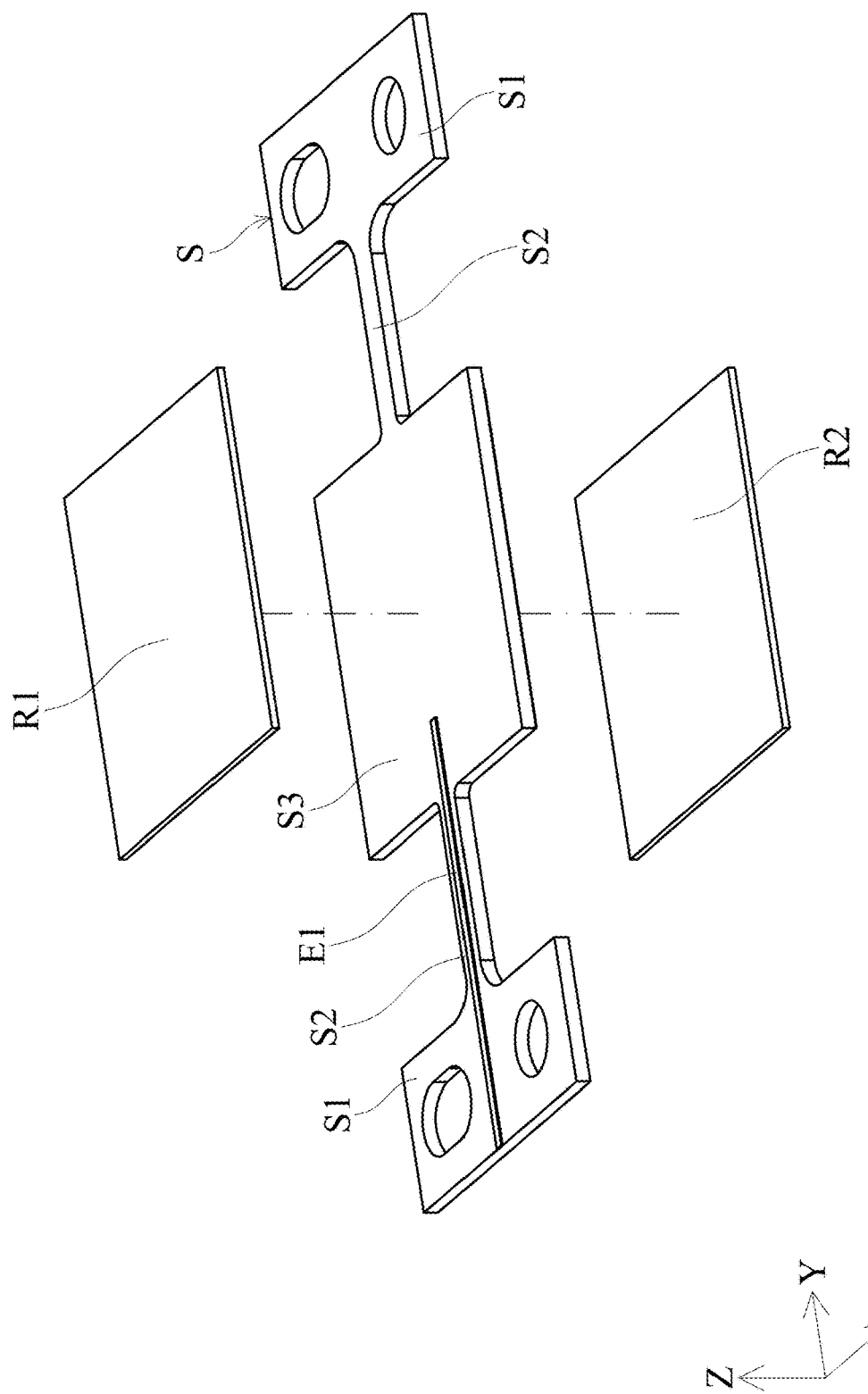
FIG. 4 is an exploded diagram of the spring sheet S, the optical element R1, and the mirror R2 in FIG. 3.

Referring to FIGS. 1-4, FIG. 1 is an exploded diagram of a driving mechanism in accordance with an embodiment of the invention, FIG. 2 is a perspective diagram of the driving mechanism in FIG. 1 after assembly, FIG. 3 is a perspective diagram showing an optical system in the driving mechanism of FIGS. 1 and 2, and FIG. 4 is an exploded diagram of the spring sheet S, the optical element R1, and the mirror R2 in FIG. 3.

As shown in FIGS. 1 and 2, the driving mechanism in this embodiment is used to drive an optical element R1 (e.g. reflecting mirror) to rotate back and forth within a range, wherein the optical element R1 can reflect light to an object for the purpose of depth sensing or 3D scanning.

The driving mechanism includes an upper module and a lower module. The lower module primarily comprises a base B, a light emitter D1 disposed on the base B, a light path adjusting element P, a circuit board C, and a light receiver D2 disposed on the circuit board C. The upper module primarily comprises a fixed member H, a spring sheet S, two magnets M, and two magnetic permeable sheets Q. The fixed member H is secured on the base B, and the spring sheet S, the magnets M, and the magnetic permeable sheets Q are disposed on the fixed member H. Here, the fixed member H and the base B constitute a fixed part of the driving mechanism. The optical element R1 is disposed on a stage S3 of the spring sheet S, and they can rotate relative to the fixed member H to perform rapid depth sensing or 3D scanning of an object.

The spring sheet S is used as a movable part of the driving mechanism, and it has two fixed ends S1 affixed to the fixed member H, two deformable portions S2, and a stage S3. The optical element R1 is disposed on the top side of the stage S3, and the deformable portions S2 respectively connecting the fixed ends S1 to the stage S3.

Specifically, a mirror R2 and at least one coil E2 are disposed on the bottom side of the stage S3 (FIG. 3). When an external circuit applies a current signal to the coil E2 via the circuit E1 on the spring sheet S, the magnet M and the coil E2 (driving assembly) can generate a magnetic force to rotate the stage S3 around a long axis A (first axis) of the spring sheet S.

As shown in FIG. 3, when an external light source (not shown) emits a sensing light L1 to the optical element R1 on the stage S3, the optical element R1 reflects the sensing light L1 to an object for depth sensing or 3D scanning. Additionally, the light emitter D1 in the lower module of the driving mechanism can emit another sensing light L2 to the light path adjusting element P (e.g. prism). The light path adjusting element P can guide the sensing light L2 to the mirror R2 on the bottom side of the stage S3, and the mirror R2 reflects the sensing light L2 to the light receiver D2, so as to obtain posture angle information of the optical element R1 relative to the fixed member H. When the light receiver D2 receives the sensing light L2 that is reflected by the mirror R2, it can transmit an electrical signal to a processor via the circuit board C, whereby closed-loop rotational control for the stage S3 of the spring sheet S and the optical element R1 can be performed.

In some embodiments, the mirror R2 may be omitted from the driving mechanism, and the bottom surface of the stage S3 may be smooth or polished to reflect the sensing light L2. In some embodiments, a through hole may be formed on the stage S3 for receiving the optical element R1 (e.g. double-sided mirror) without the mirror R2.

It should be noticed that the spring sheet S in this embodiment has a first resonance frequency with respect to the fixed part (the fixed member H and the base B), and an AC current signal can be applied to the coil E2 on the stage S3, wherein the frequency of the AC current signal corresponds to the first resonance frequency. Thus, the stage S3 can be driven to rapidly rotate back and forth within a range around the long axis A of the spring sheet S for depth sensing or 3D scanning of an object. For example, the first resonance frequency is about 300-1000 Hz, and the frequency of the AC current signal is about 0.9 to 1.1 times the first resonance frequency, so that the rotational angle of the stage S3 and the scanning range of the sensing light L1 can be increased.

Figure 5:
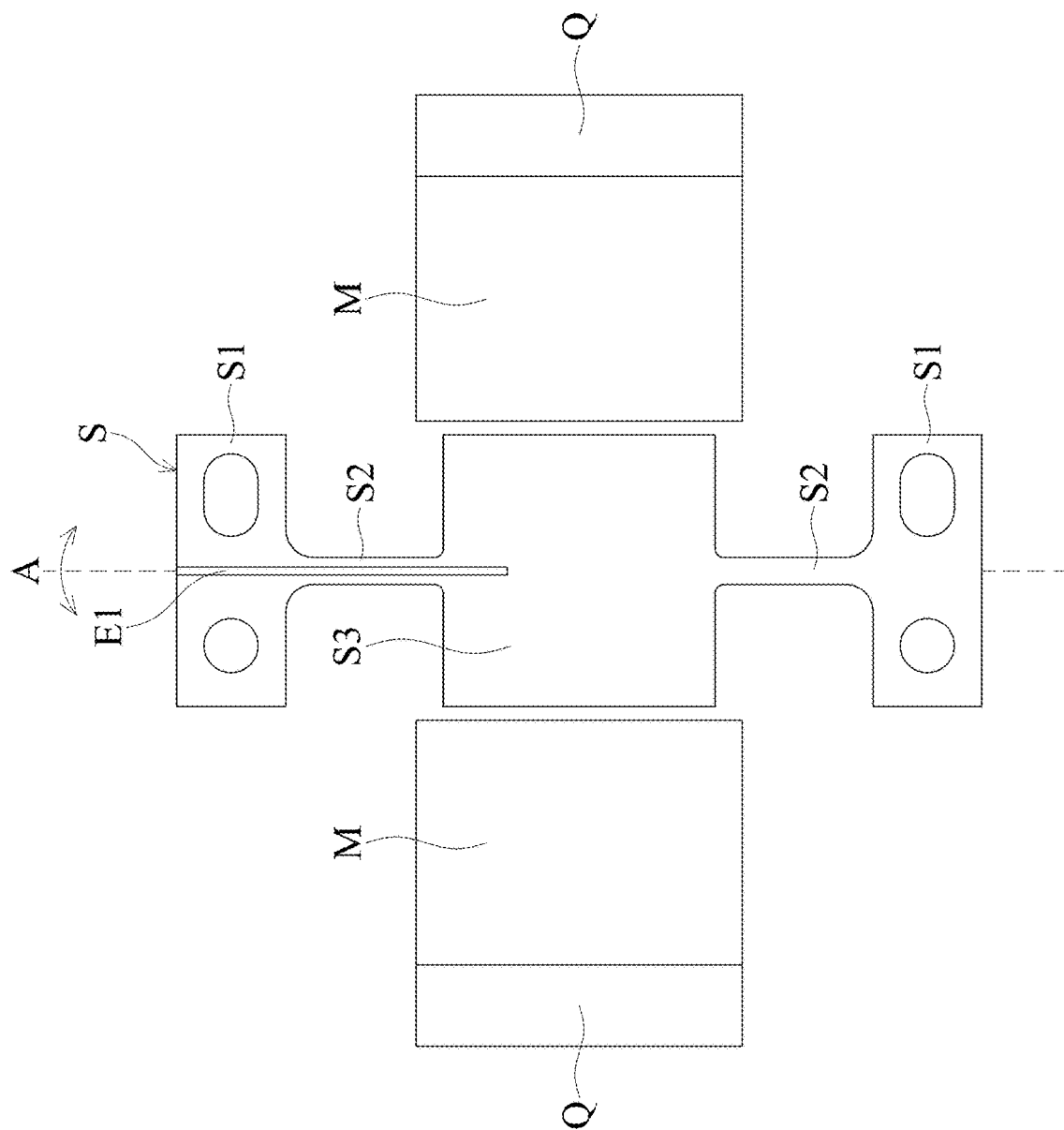
FIG. 5 is a top view of the spring sheet S, the magnets M, and the magnetic permeable sheets Q in FIGS. 1 and 2.
Figure 6:
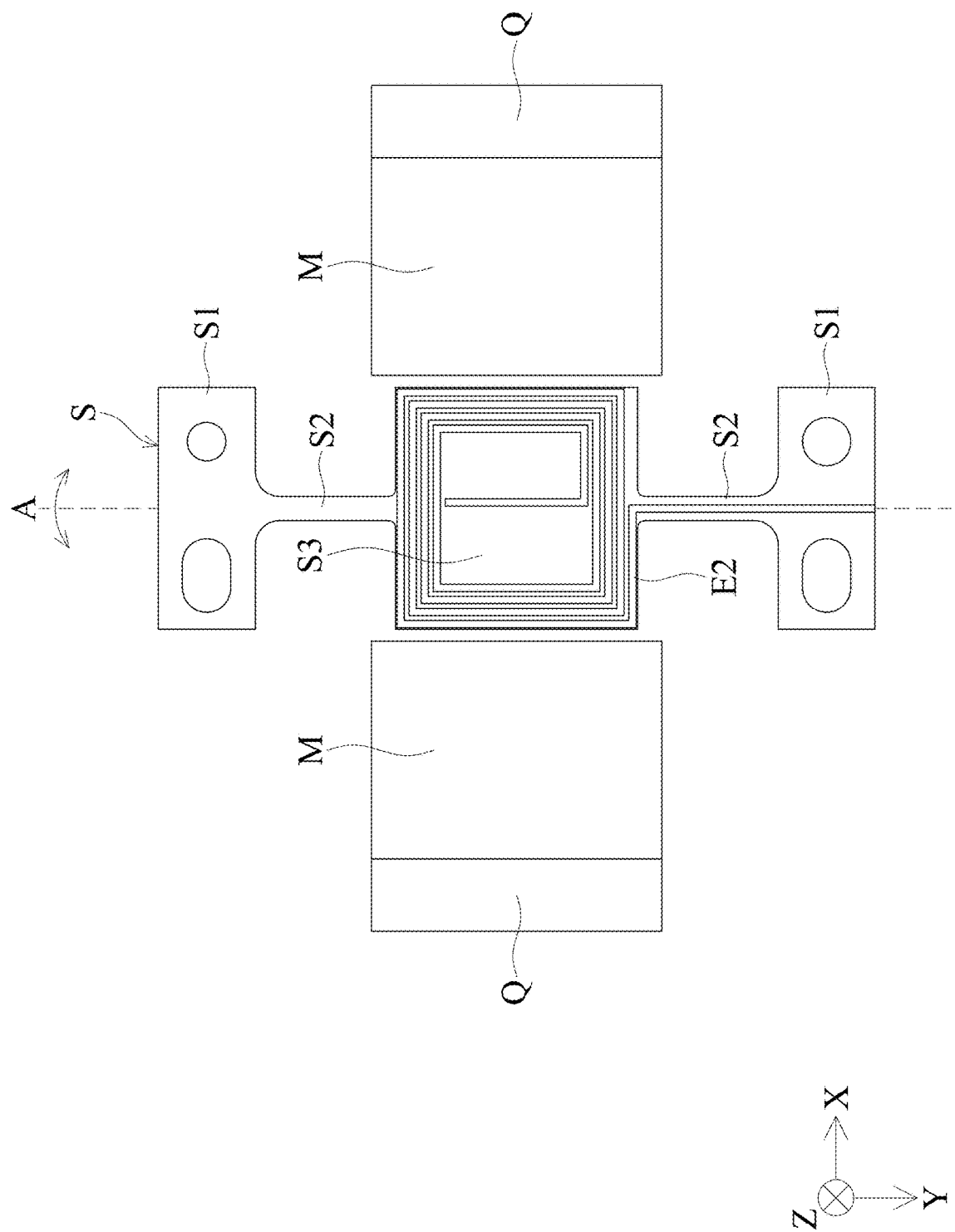
FIG. 6 is a bottom view of the spring sheet S, the magnets M, and the magnetic permeable sheets Q in FIGS. 1 and 2.

FIG. 5 is a top view of the spring sheet S, the magnets M, and the magnetic permeable sheets Q in FIGS. 1 and 2, and FIG. 6 is a bottom view of the spring sheet S, the magnets M, and the magnetic permeable sheets Q in FIGS. 1 and 2. As shown in FIGS. 5 and 6, the spring sheet S may comprise metal and have a rectangular structure. The magnets M and the magnetic permeable sheets Q are arranged on two long sides of the spring sheet S, and the circuit E1 and the coil E2 are respectively formed on the top and bottom sides of the spring sheet S by metallic printing ink or circuit-on-metal technology. In some embodiments, the spring sheet S may comprise SUS 304H stainless steel that has high mechanical strength and reliability.

As mentioned above, the circuit E1 and the coil E2 can be integrally formed on the top and bottom sides of the spring sheet S, wherein an insulating layer is formed between the circuit E1 and the spring sheet S, and another insulating layer is formed between the coil E2 and the spring sheet S. The circuit E1 and the coil E2 can be electrically connected to each other via the stage S3 of the spring sheet S. When an external circuit applies a current signal to the coil E2 on the bottom side of the spring sheet S via the circuit E1, the magnet M and the coil E2 can produce a magnetic force to rotate the stage S3 around the long axis A of the spring sheet S, so as to perform depth sensing or 3D scanning of an object.

Specifically, the circuit E1 and the coil E2 in FIGS. 5-6 both have at least one segment parallel to the long axis A (first axis), and the segment at least partially overlaps the long axis A when viewed along the Z direction that is perpendicular to the spring sheet S. In some embodiments, the circuit E1 and the coil E2 may also have a plurality of segments that are parallel to but do not overlap the long axis A when viewed along the Z direction.

Figure 7:
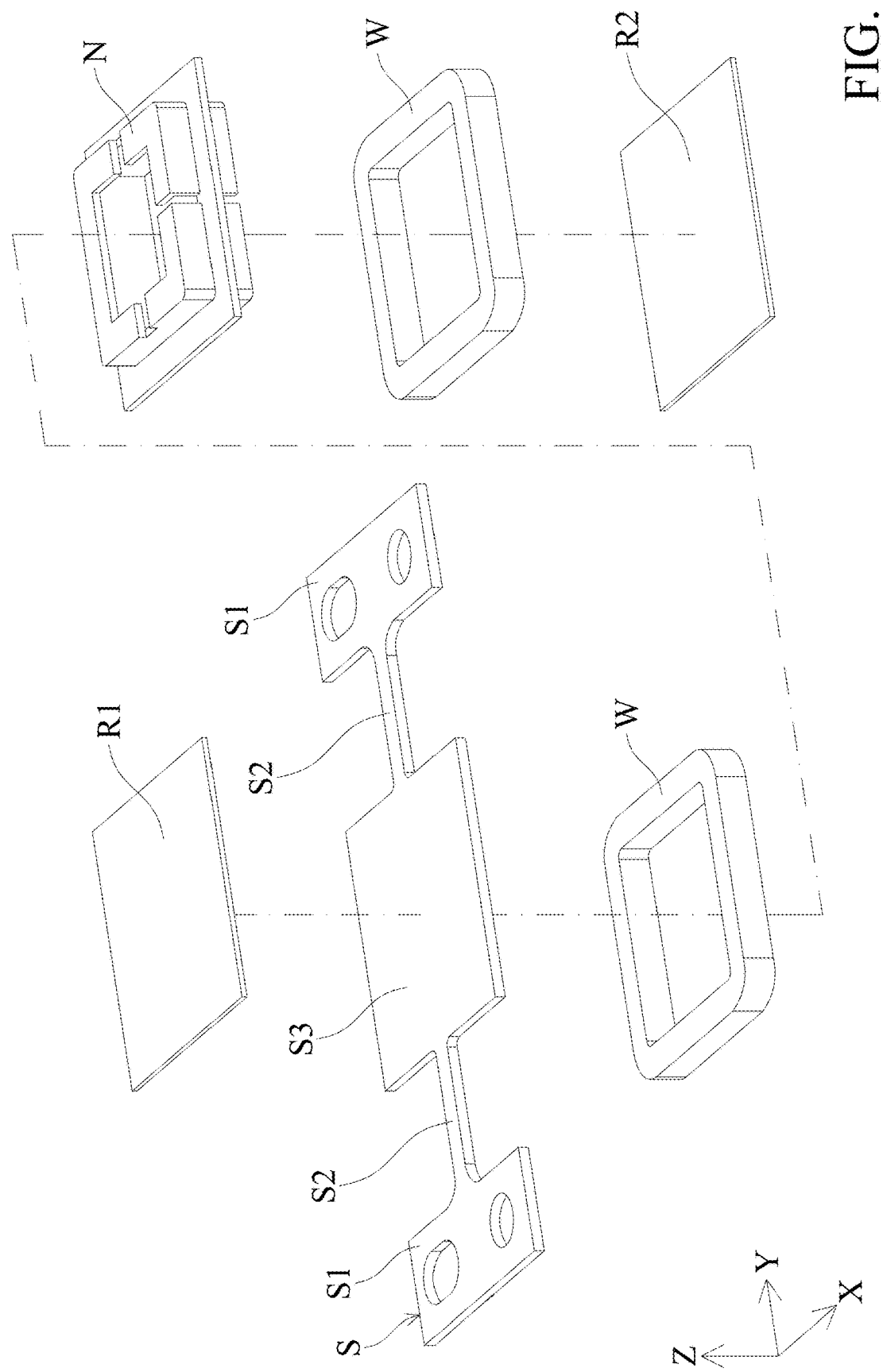
FIGS. 7 and 8 are exploded and perspective diagrams of a spring sheet S, an optical element R1, a mirror R2, two coils W, and a bobbin N, in accordance with another embodiment of the invention.
Figure 8:
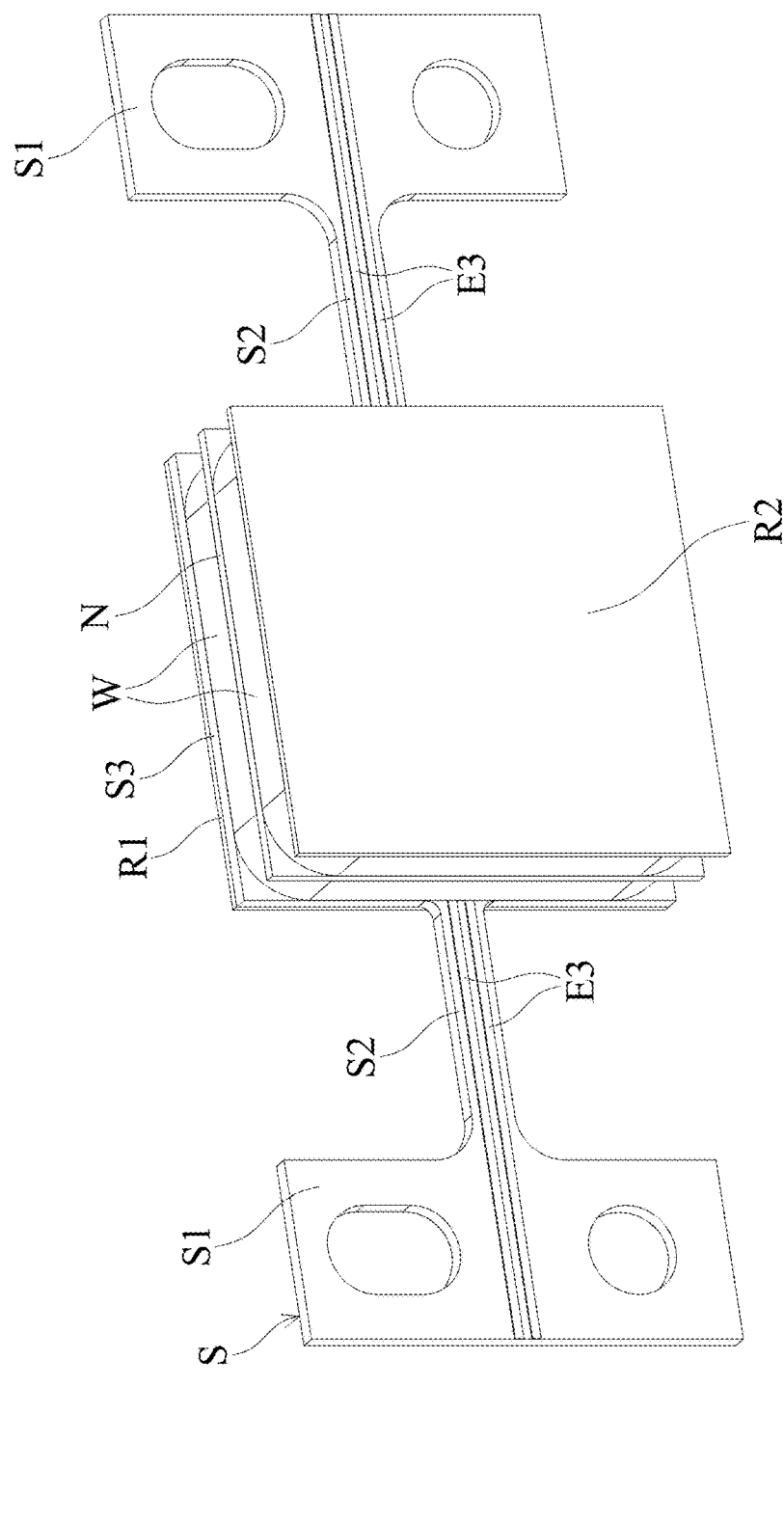
Figure 9:
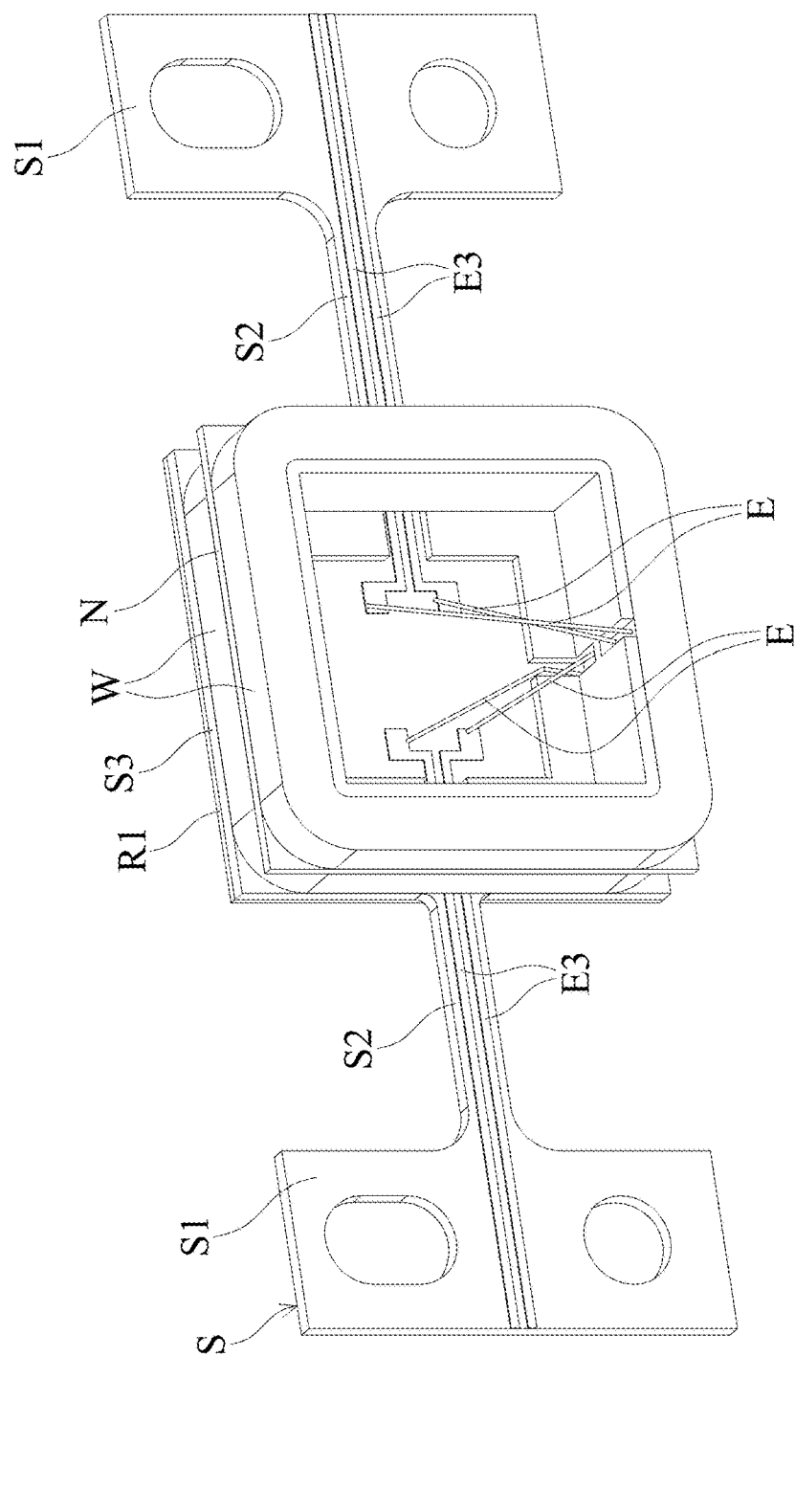
FIG. 9 is a perspective diagram that shows the coils W in FIG. 8 electrically connecting to the circuits E3 on the spring sheet S.
Figure 10:
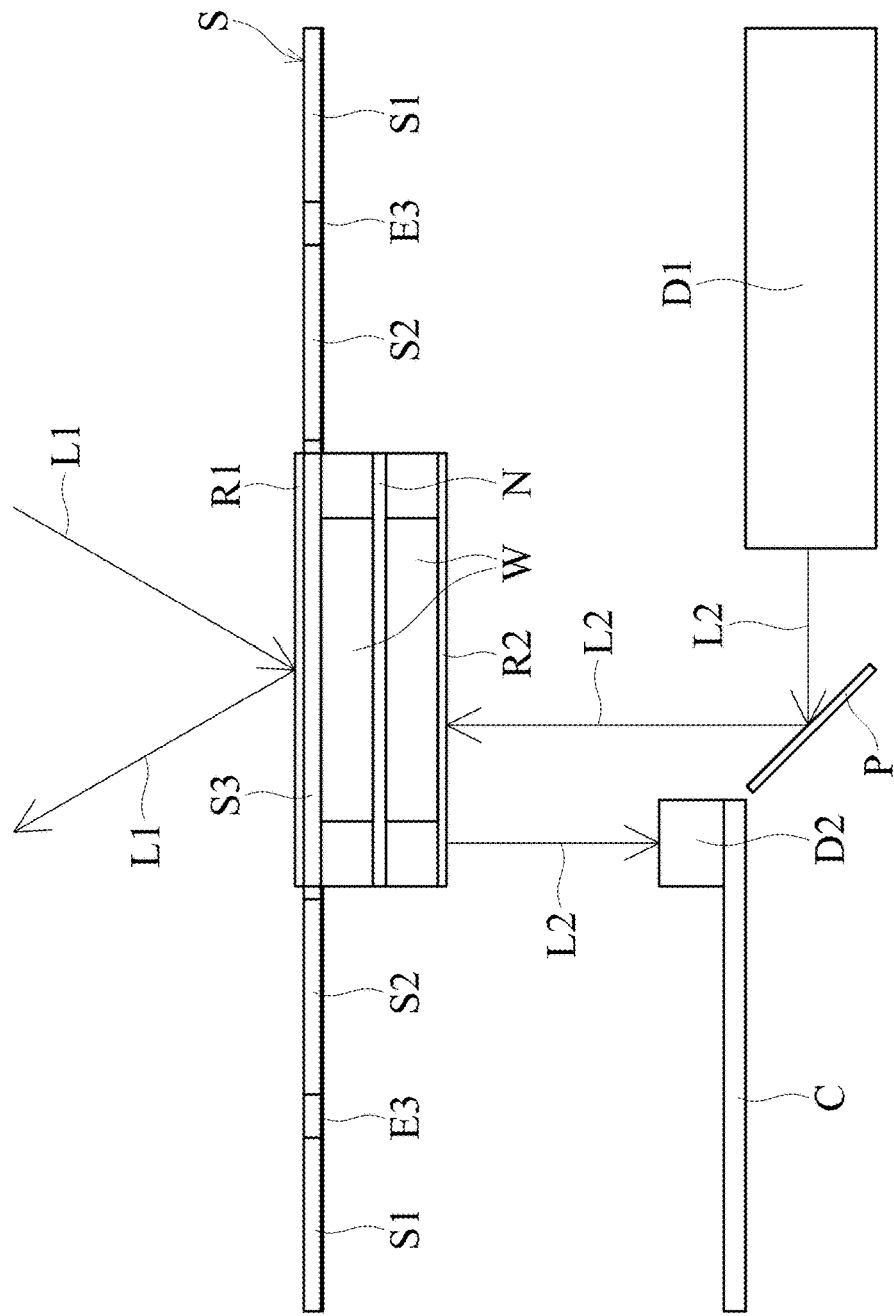
FIG. 10 is a perspective diagram of an optical system in accordance with another embodiment of the invention.

FIGS. 7 and 8 are exploded and perspective diagrams of a spring sheet S, an optical element R1, a mirror R2, two coils W, and a bobbin N, in accordance with another embodiment of the invention. FIG. 9 is a perspective diagram that shows the coils W in FIG. 8 electrically connecting to the circuits E3 on the spring sheet S. FIG. 10 is a perspective diagram of an optical system in accordance with another embodiment of the invention.

As shown in FIGS. 7-10, this embodiment is different from FIGS. 1-6 in that a plurality of circuits E3 are integrally formed on the bottom side of the spring sheet S by metallic printing ink or circuit-on-metal technology, wherein an insulating layer is formed between the circuits E3 and the spring sheet S to prevent a short circuit therebetween.

The two coils W in FIGS. 9-10 are respectively connected to the circuits E3 via the wires E, whereby an external circuit can transmit electrical signals to the coils W via the wires E and the circuits E3. It should be noted since two coils W are provided on the bottom side of the spring sheet S, the magnetic force for driving the stage S3 to rotate can be increased, and the range of depth sensing or 3D scanning can also be increased.

Figure 11:
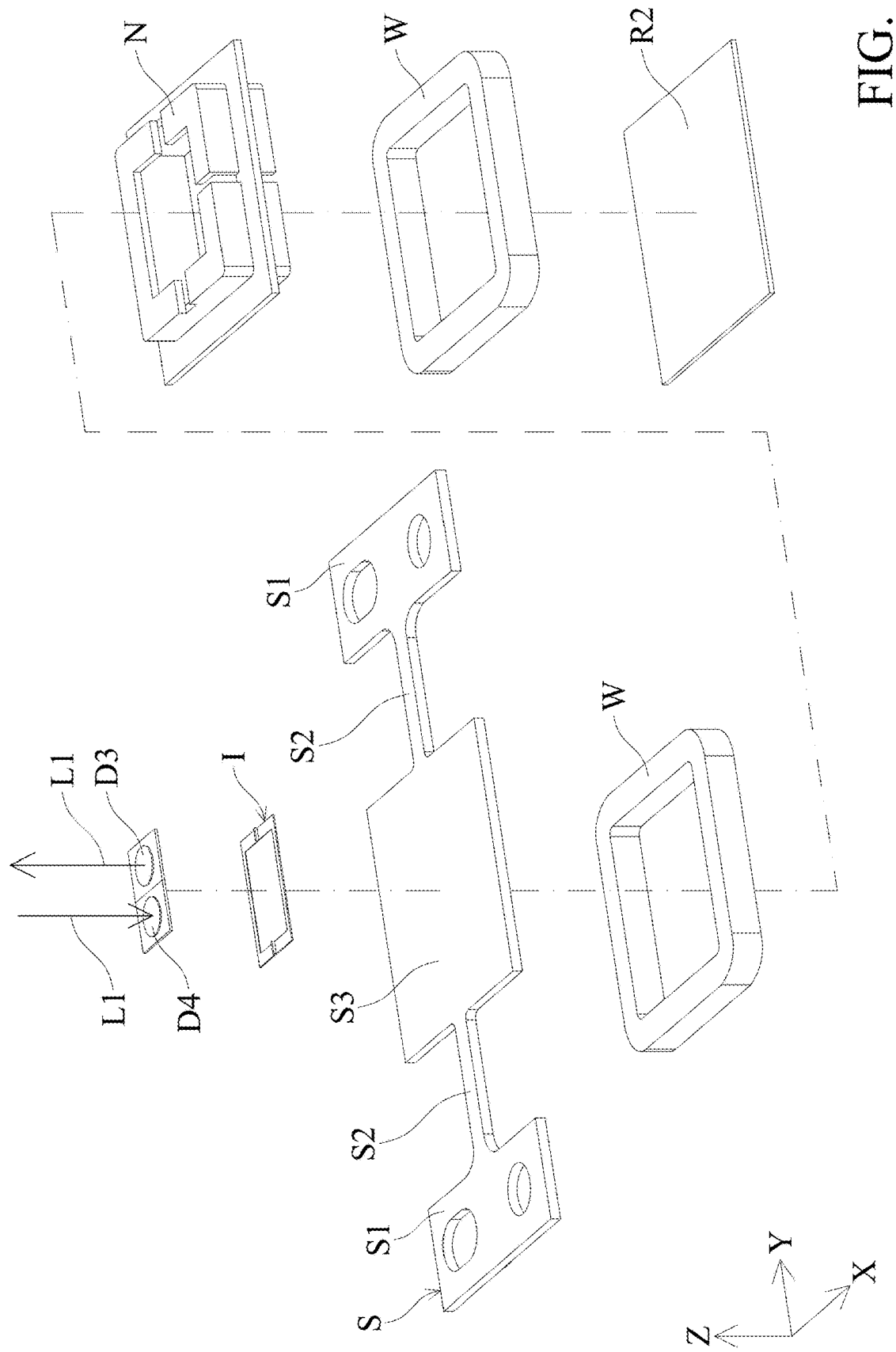
FIGS. 11 and 12 are exploded and perspective diagrams of a light emitter D3, a light receiver D4, and a substrate I disposed on a spring sheet S, in accordance with another embodiment of the invention.
Figure 12:
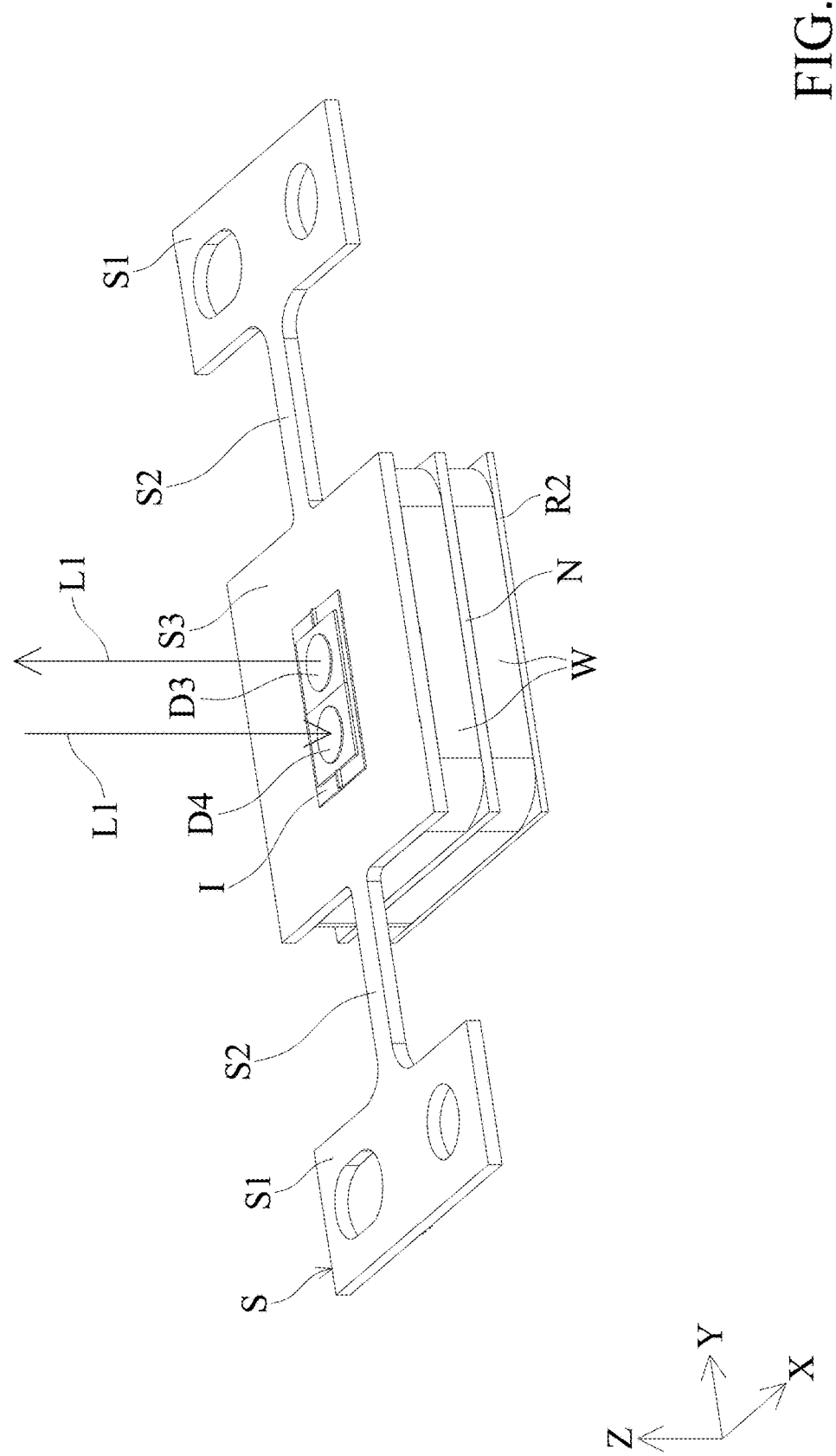
Figure 13:
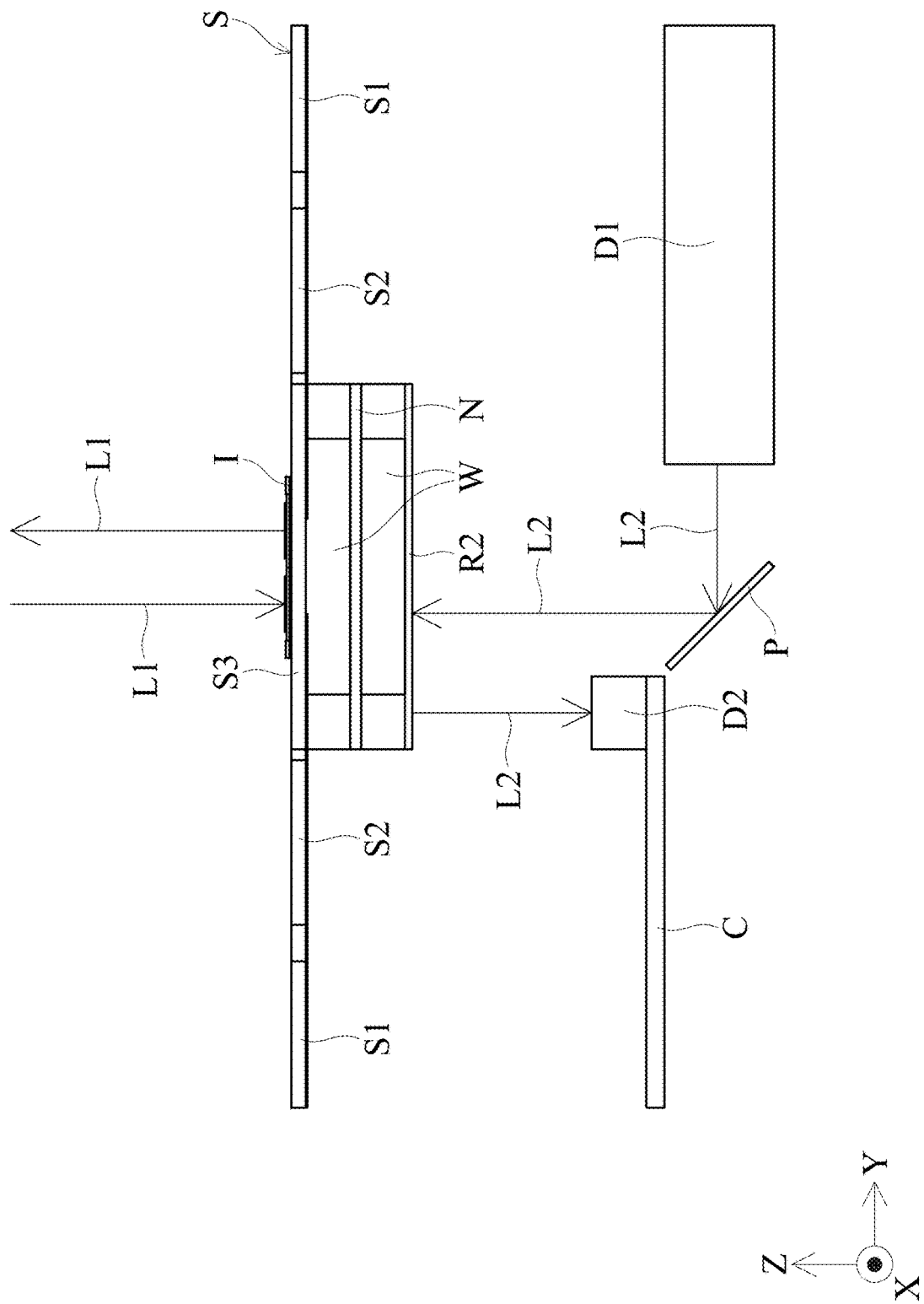
FIG. 13 is a perspective diagram of an optical system in accordance with another embodiment of the invention.

FIGS. 11 and 12 are exploded and perspective diagrams of a light emitter D3, a light receiver D4, and a substrate I disposed on a spring sheet S, in accordance with another embodiment of the invention. FIG. 13 is a perspective diagram of an optical system in accordance with another embodiment of the invention.

As shown in FIGS. 11-13, this embodiment is different from FIGS. 7-10 in that a light emitter D3, a light receiver D4, and a substrate I are disposed on a spring sheet S, and the optical element R1 shown in FIGS. 7-10 is omitted from the driving mechanism. FIG. 13 shows that the substrate I is disposed on the top side of the spring sheet S, and the light emitter D3 and the light receiver D4 are disposed on the substrate I, wherein an insulating layer is formed between the substrate I and the spring sheet S. For example, the light emitter D3 and the light receiver D4 may respectively comprise laser diode and photo diode, and the substrate I may comprise a circuit board for electrically connecting the light emitter D3 and the light receiver D4 to an external circuit.

By directly affixing the light emitter D3 and the light receiver D4 to the spring sheet S, the optical element R1 (e.g. mirror) can be omitted from the driving mechanism. Thus, the positioning accuracy during assembly and the performance of depth sensing or 3D scanning can be greatly increased. Moreover, the production cost and the dimensions of the driving mechanism can also be reduced. In some embodiments, only one of the light emitter D3 and the light receiver D4 is disposed on the spring sheet S, so that the circuits on the substrate I can be simplified.

Figure 14:
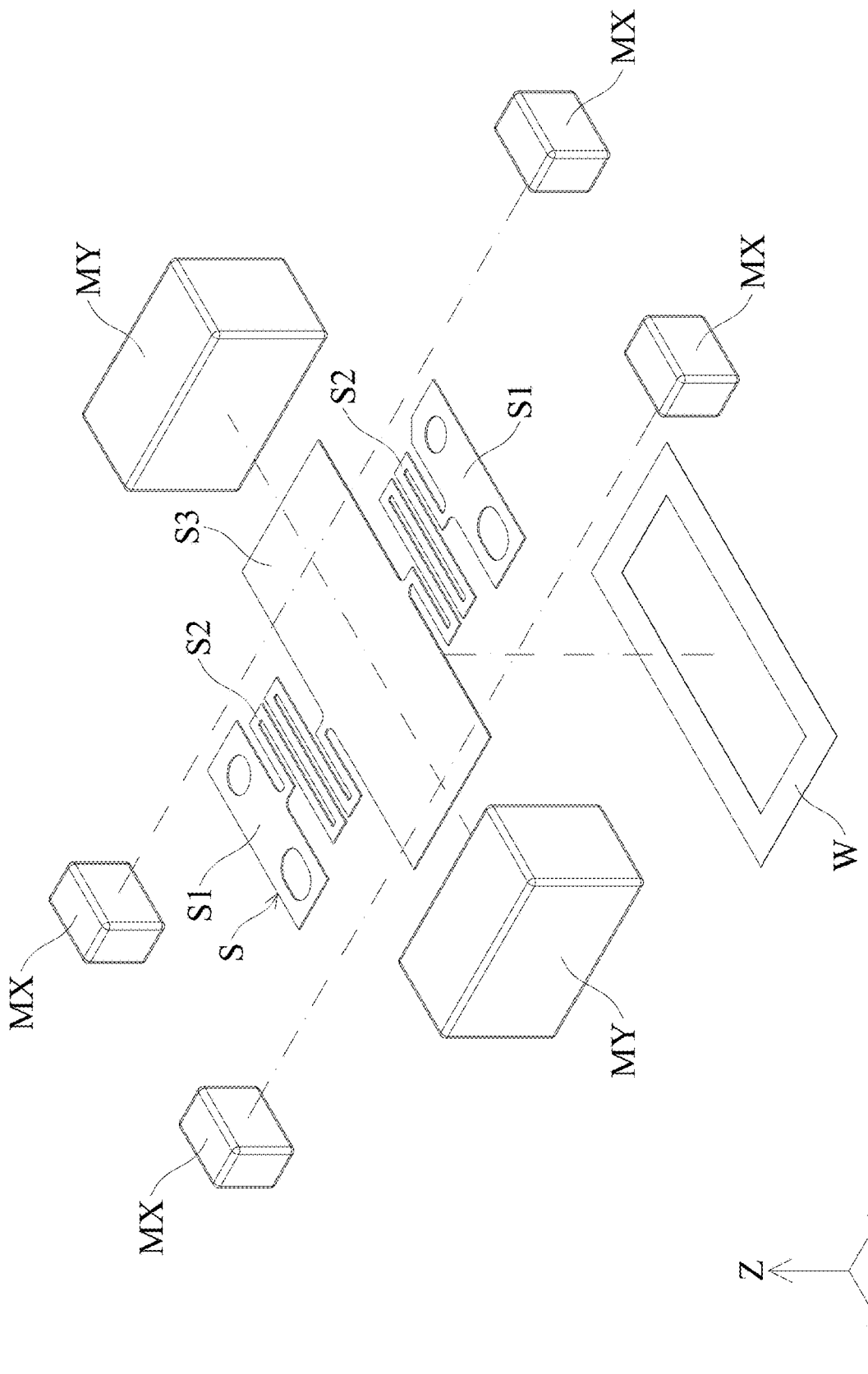
FIG. 14 is an exploded diagram of a spring sheet S, a coil W, and several magnets MX and MY, in accordance with another embodiment of the invention.
Figure 15:
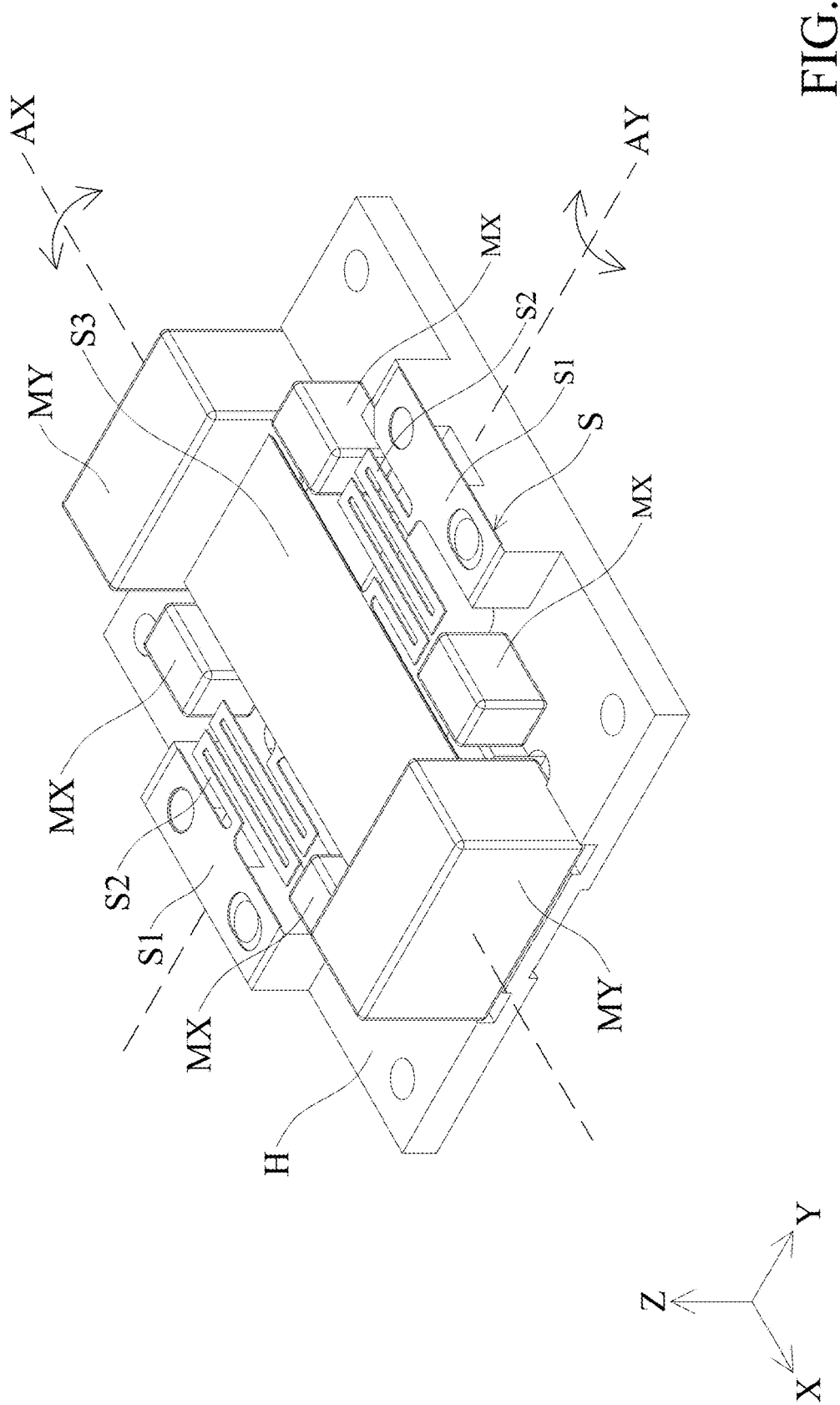
FIG. 15 is a perspective diagram showing the spring sheet S, the coil W, and the magnets MX and MY in FIG. 14 assembled to a fixed member H.
Figure 16:
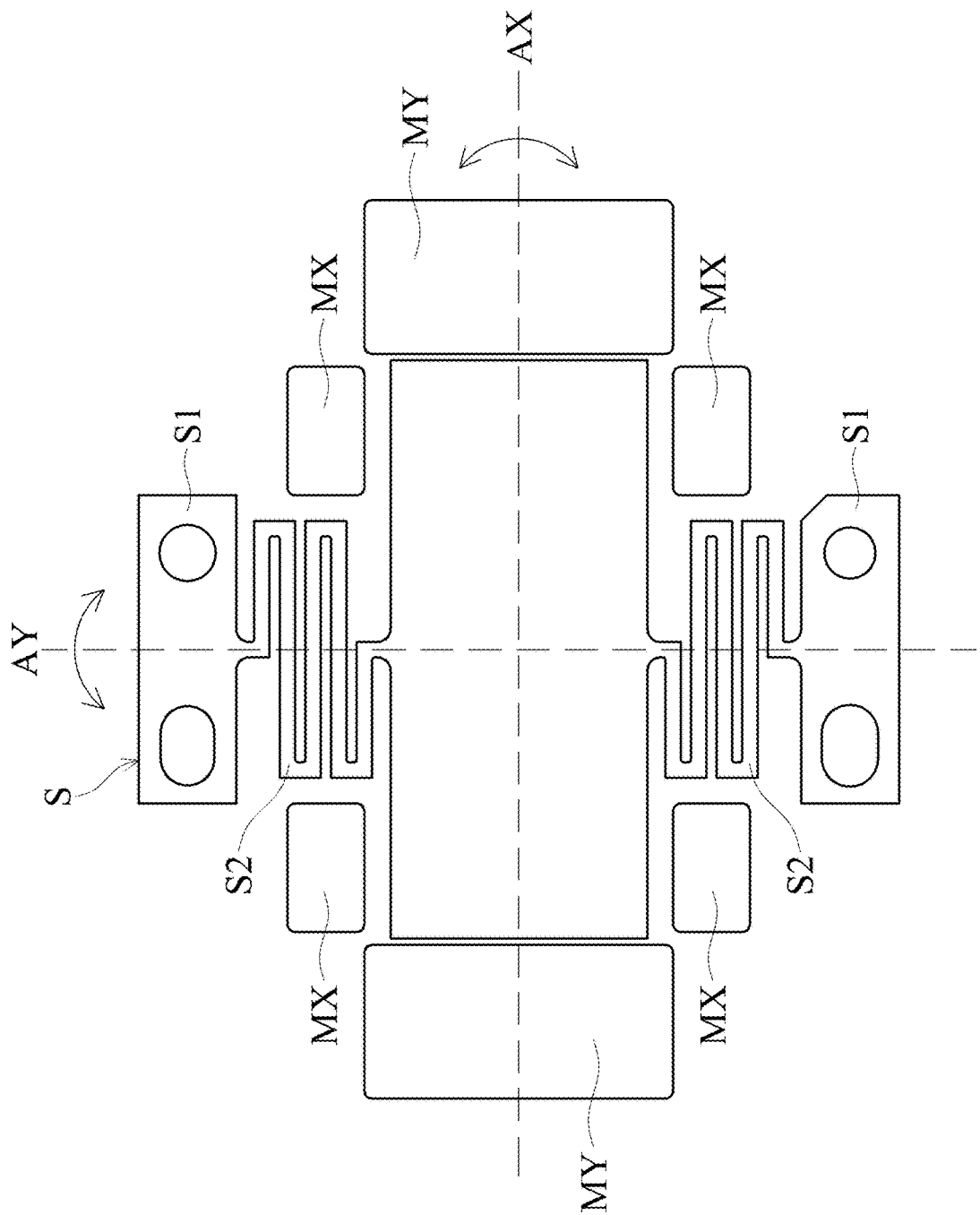
FIG. 16 is a perspective diagram showing the relative positions of the spring sheet S and the magnets MX and MY in FIG. 15.

FIG. 14 is an exploded diagram of a spring sheet S, a coil W, and several magnets MX and MY, in accordance with another embodiment of the invention. FIG. 15 is a perspective diagram showing the spring sheet S, the coil W, and the magnets MX and MY in FIG. 14 assembled to a fixed member H. FIG. 16 is a perspective diagram showing the relative positions of the spring sheet S and the magnets MX and MY in FIG. 15.

As shown in FIGS. 14-16, the spring sheet S and the magnets MX and MY in this embodiment are affixed to the fixed member H, wherein the coil W can be integrally formed on the bottom side the spring sheet S by metallic printing ink or circuit-on-metal technology. Specifically, the spring sheet S has two meandering deformable portions S2. When the coil W is energized by an electrical current signal, the coil W and the magnets MY (first magnets) can produce a first magnetic force driving the stage S3 to rotate around a first axis AY, and the coil W and the magnets MX (second magnets) can produce a second magnetic force driving the stage S3 to rotate around a second axis AX.

For example, the spring sheet S may have a first resonance frequency and a second resonance frequency with respect to the fixed member H, corresponding to the first and second axes AY and AX. When a first AC current signal and a second AC current signal are sequentially applied to the coil W in a first time interval and a second time interval, the stage S3 of the spring sheet S can be driven to rotate around the first and second axes AY and AX to perform depth sensing or 3D scanning of an object, wherein the frequencies of the first and second AC current signals correspond to the first and second resonance frequencies.

In some embodiments, the aforementioned driving mechanism may utilize the two coils W and the bobbin N in FIGS. 7-10 with the circuits E3 and wires E (FIGS. 8-10). Thus, two different current signals can be individually applied to the two coils W, to drive the stage S3 and the optical element R1 (e.g. mirror) on the stage S3 to rotate around the first axis AY and the second axis AX at the same time. Here, the second resonance frequency could be over 10 times the first resonance frequency.

As shown in FIG. 16, four magnets MX and two magnets MY are provided in the driving mechanism, wherein the stage S3 and the magnets MY overlap when viewed in the X direction, and the stage S3 and the magnets MX overlap when viewed in the Y direction. Therefore, the stage S3 and the optical element R1 thereon can be driven to rotate around the first axis AY and the second axis AX at the same time by the coil W and the magnets MY and MX (driving assembly), thus greatly increasing the range of depth sensing or 3D scanning.

Figure 17:
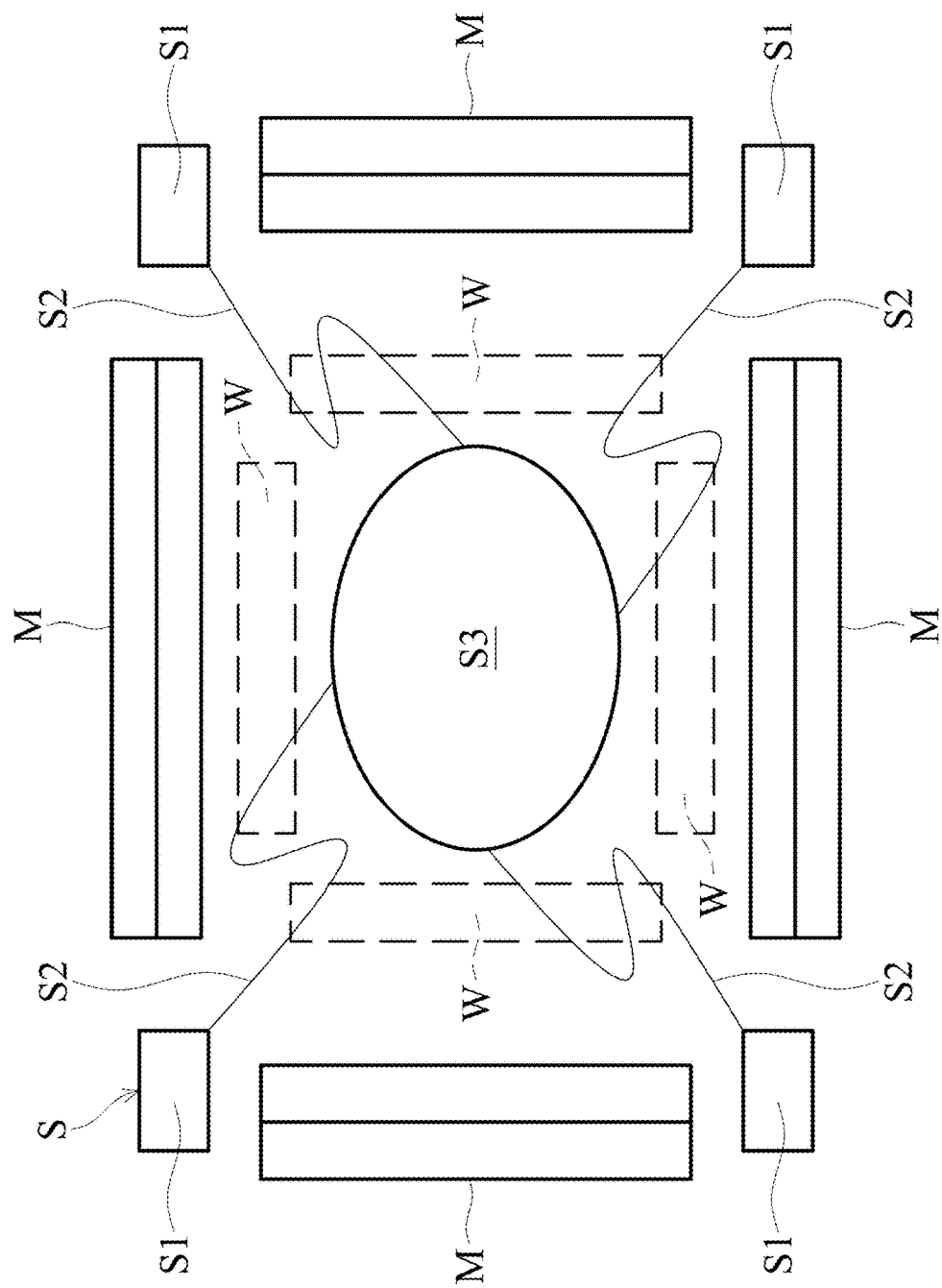
FIG. 17 is a perspective diagram showing the relative positions of a spring sheet S, at least one coil W, and several magnets M, in accordance with another embodiment of the invention.

FIG. 17 is a perspective diagram showing the relative positions of a spring sheet S, at least one coil W, and several magnets M, in accordance with another embodiment of the invention. As shown in FIG. 17, the spring sheet S in this embodiment has four fixed ends S1 affixed to the fixed part (the fixed member H and the base B), a stage S3 for carrying the optical element R1, and four deformable portions S2 connecting the four fixed ends S1 to the stage S3. Additionally, four magnets M are affixed to the fixed part, and at least one coil W is affixed to the stage S3. When an electrical current signal is applied to the coil W, a magnetic force can be produced to rotate the stage S3 back and forth within a range relative to the fixed part. Here, the spring sheet S can define a rectangular area, and the four fixed ends S1 of the spring sheet S are located at the four corners of the rectangular area.

Figure 18:
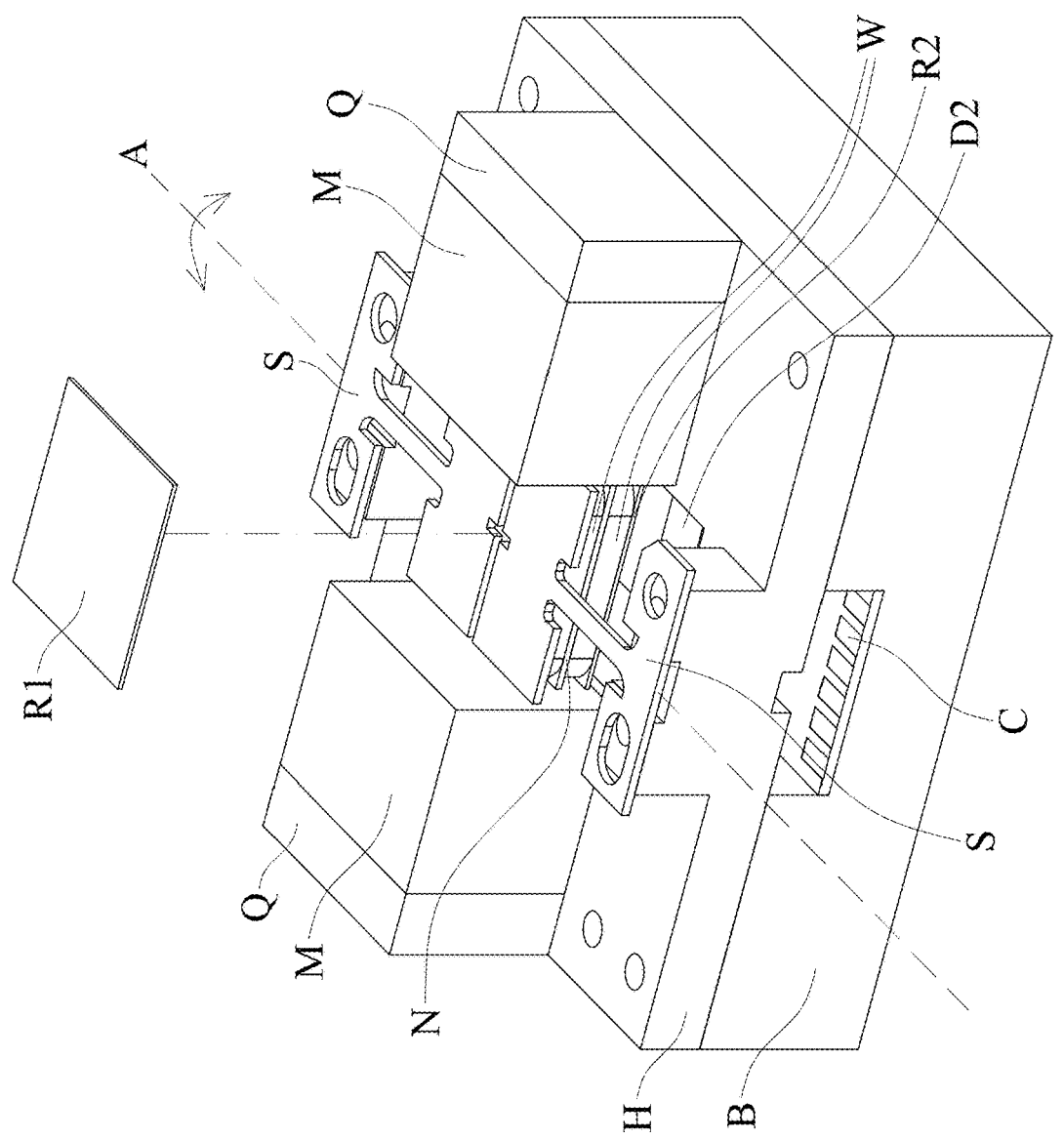
FIG. 18 is a perspective diagram of a driving mechanism in accordance with an embodiment of the invention.
Figure 19:
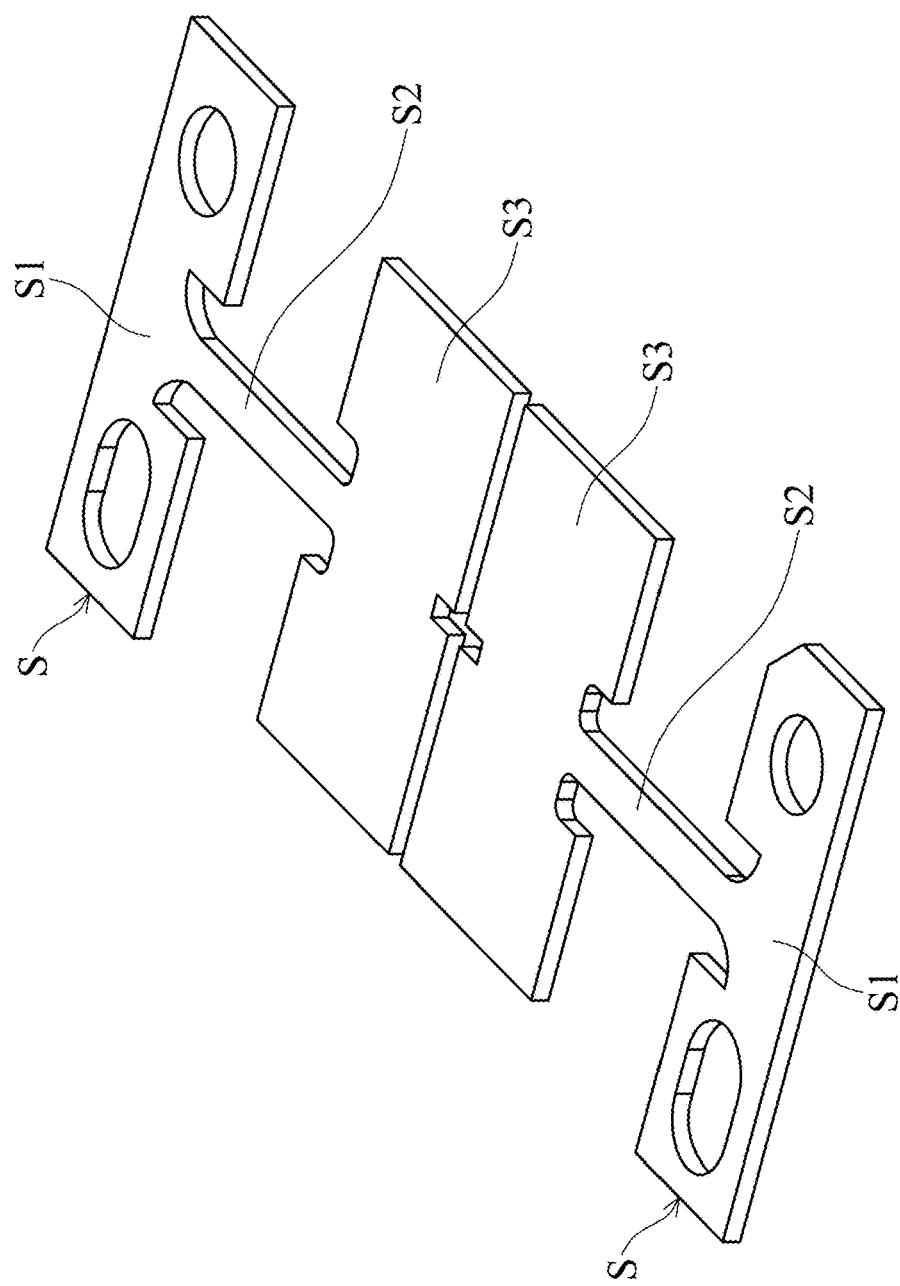
FIG. 19 is a perspective diagram of the two spring sheets S in FIG. 18.

Referring to FIGS. 18 and 19, FIG. 18 is a perspective diagram of a driving mechanism in accordance with an embodiment of the invention, and FIG. 19 is a perspective diagram of the two spring sheets S in FIG. 18.

As shown in FIGS. 18 and 19, this embodiment is different from FIGS. 1-2 in that the movable part includes two spring sheets S. Each of the spring sheet S that has a fixed end S1 secured on the fixed member H, a deformable portion S2, and a stage S3 for carrying the optical element R1.

In this embodiment, the stages S3 of the two spring sheets S are spaced apart from each other, and a bobbin N and two coils W are disposed on the bottom sides of the stages S3. Here, the bobbin N is affixed to the stages S3, and the coils W are wound on the bobbin N.

In some embodiments, several circuits such as the circuits E3 in FIG. 9 may be integrally formed on the stages S3 by metallic printing ink or circuit-on-metal technology to electrically connect to the two coils W.

Figure 20:
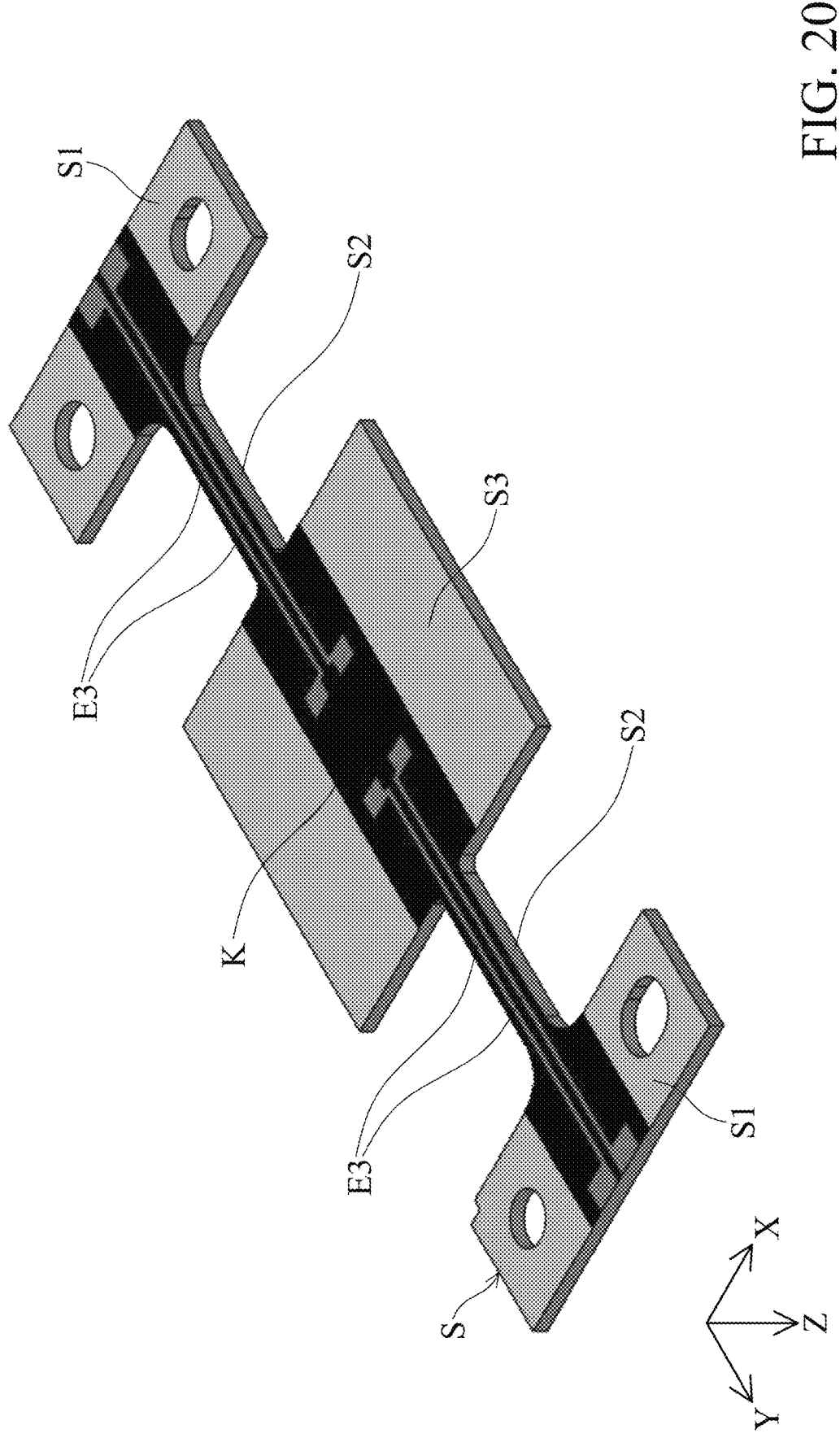
FIG. 20 is a perspective diagram of a spring sheet S in accordance with another embodiment of the invention.

FIG. 20 is a perspective diagram of a spring sheet S in accordance with another embodiment of the invention. Referring to FIG. 20, the movable part may comprise only one spring sheet S, and two sets of circuits E3 are integrally formed on the stages S3 of the spring sheet S by metallic printing ink or circuit-on-metal technology. It should be noted that the two sets of circuits E3 can be electrically connected to the two coils W, respectively. Moreover, an insulating layer K is formed between the circuits E3 and the spring sheet S to prevent short circuit therebetween.

Figure 21:
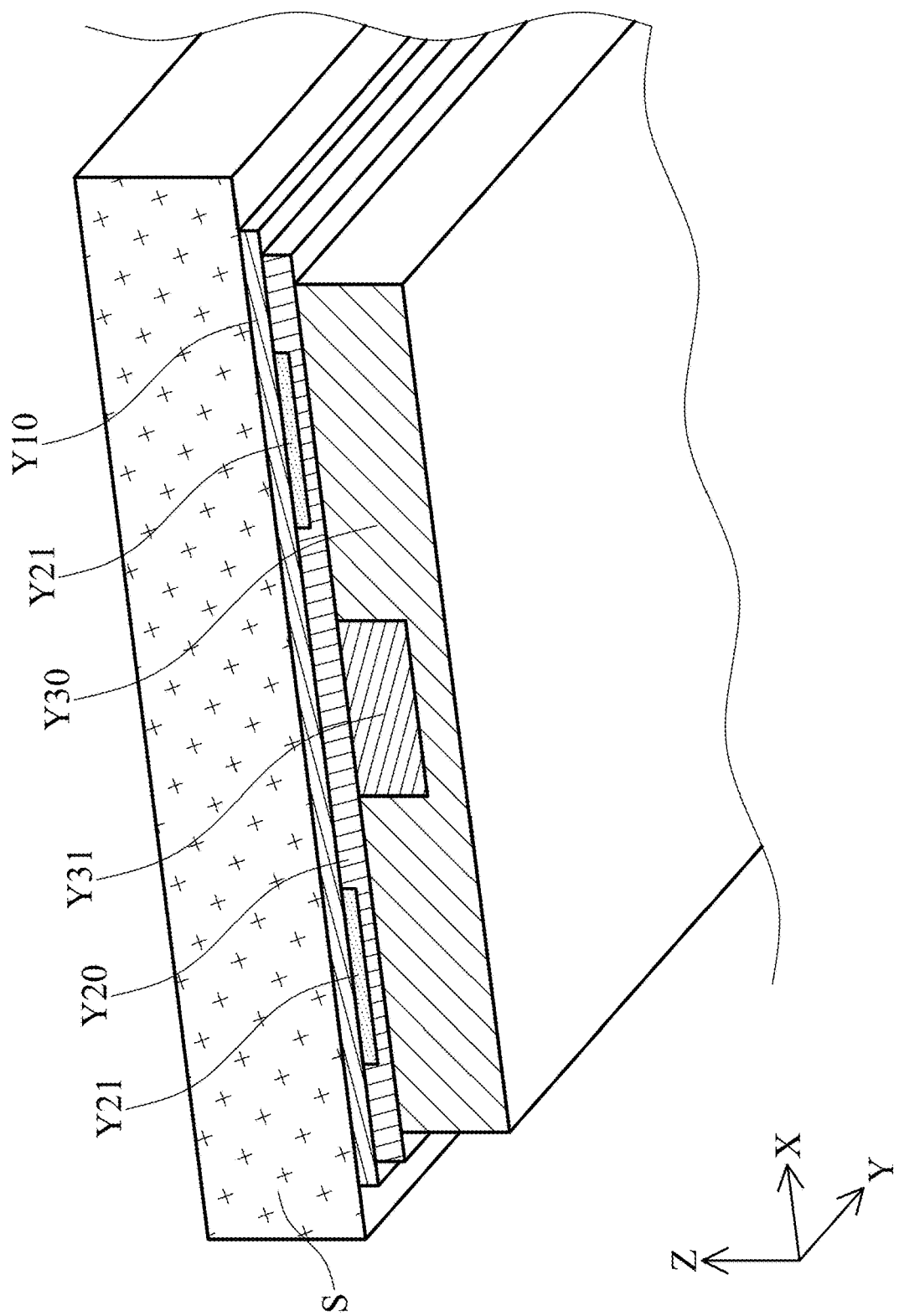
FIG. 21 is a partial sectional view showing a coil Y21 and a circuit Y31 formed on the same side of the spring sheet S.

FIG. 21 is a partial sectional view showing a coil Y21 and a circuit Y31 formed on the same side of the spring sheet S. As shown in FIG. 21, a multi-layer circuit structure can be formed on a surface of the spring sheet S to replace the bobbin N and the coil W in FIG. 18.

In some embodiments, the coil Y21 and the circuit Y31 can be formed and stacked on the top side of the spring sheet S by metallic printing ink or circuit-on-metal technology, wherein the coil Y21 is located between the circuit Y31 and the spring sheet S. Moreover, an insulating layer Y10 is formed between the coil Y21 and the spring sheet S, and two insulating structures Y20 and Y30 are formed around the coil Y21 and the circuit Y31 to prevent short circuit therebetween.

Figure 22:
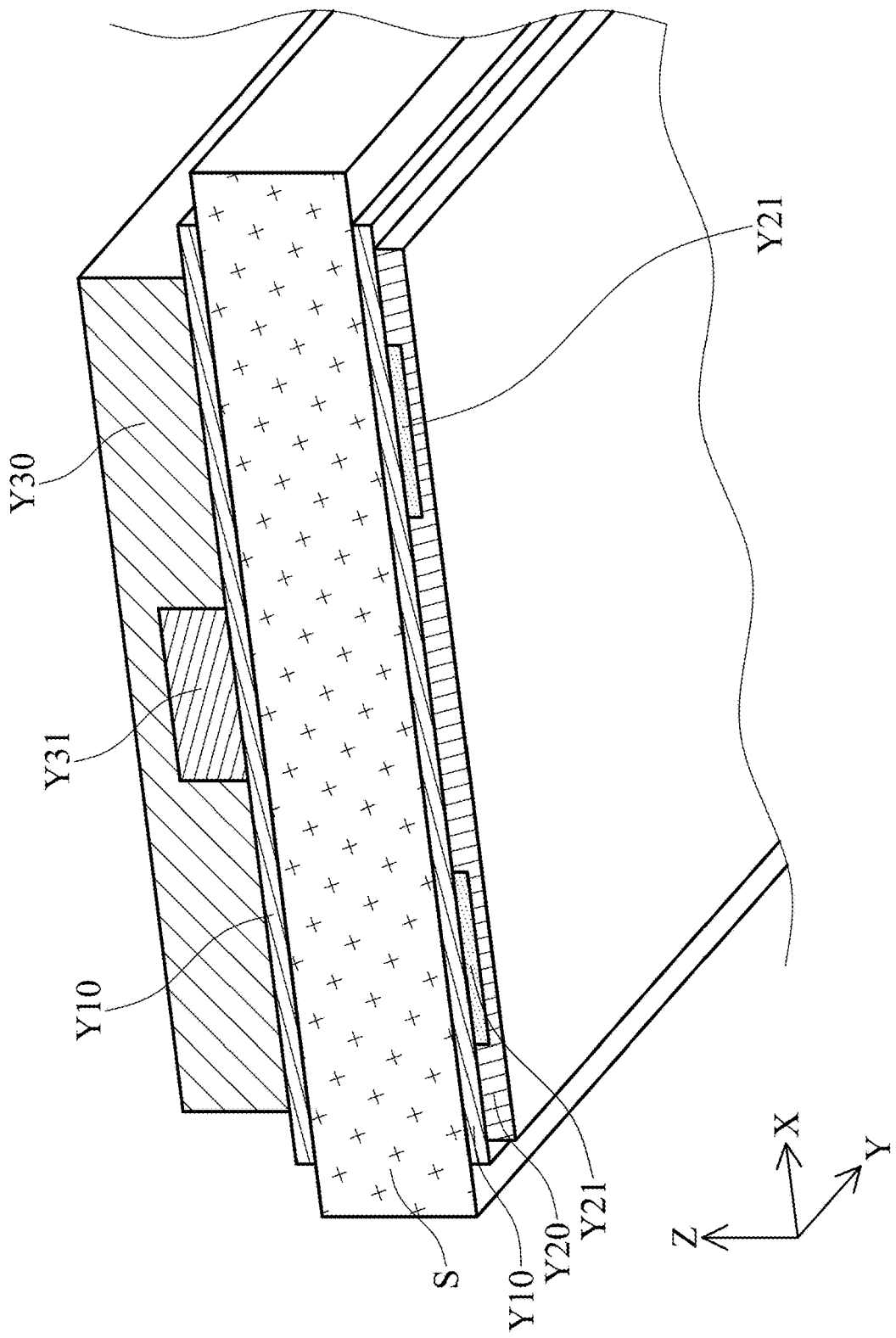
FIG. 22 is a partial sectional view showing a coil Y21 and a circuit Y31 formed on the opposite sides of the spring sheet S.

FIG. 22 is a partial sectional view showing a coil Y21 and a circuit Y31 formed on the opposite sides of the spring sheet S. As shown in FIG. 22, this embodiment is different from FIG. 21 in that the coil Y21 and the circuit Y31 are formed on the opposite sides of the spring sheet S, wherein an insulating layer Y10 is formed between the coil Y21 and the spring sheet S, and another layer Y10 is formed between the circuit Y31 and the spring sheet S. Thus, a multi-layer circuit structure can be formed on the spring sheet S to greatly reduce production cost and the thickness of the driving mechanism.

Figure 23:
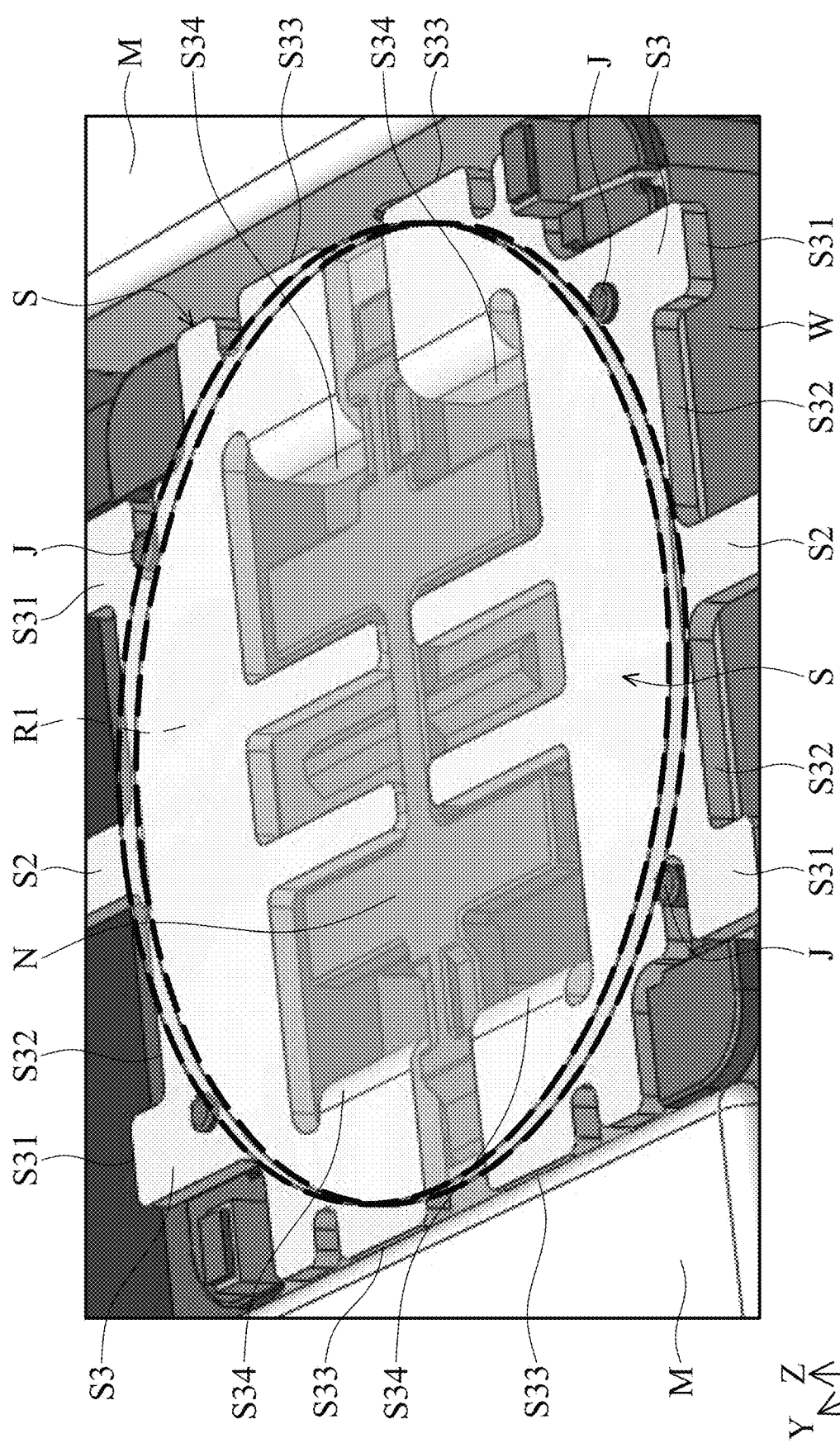
FIGS. 23 and 24 are partial perspective view and top view of a driving mechanism in accordance with another embodiment of the invention.
Figure 24:
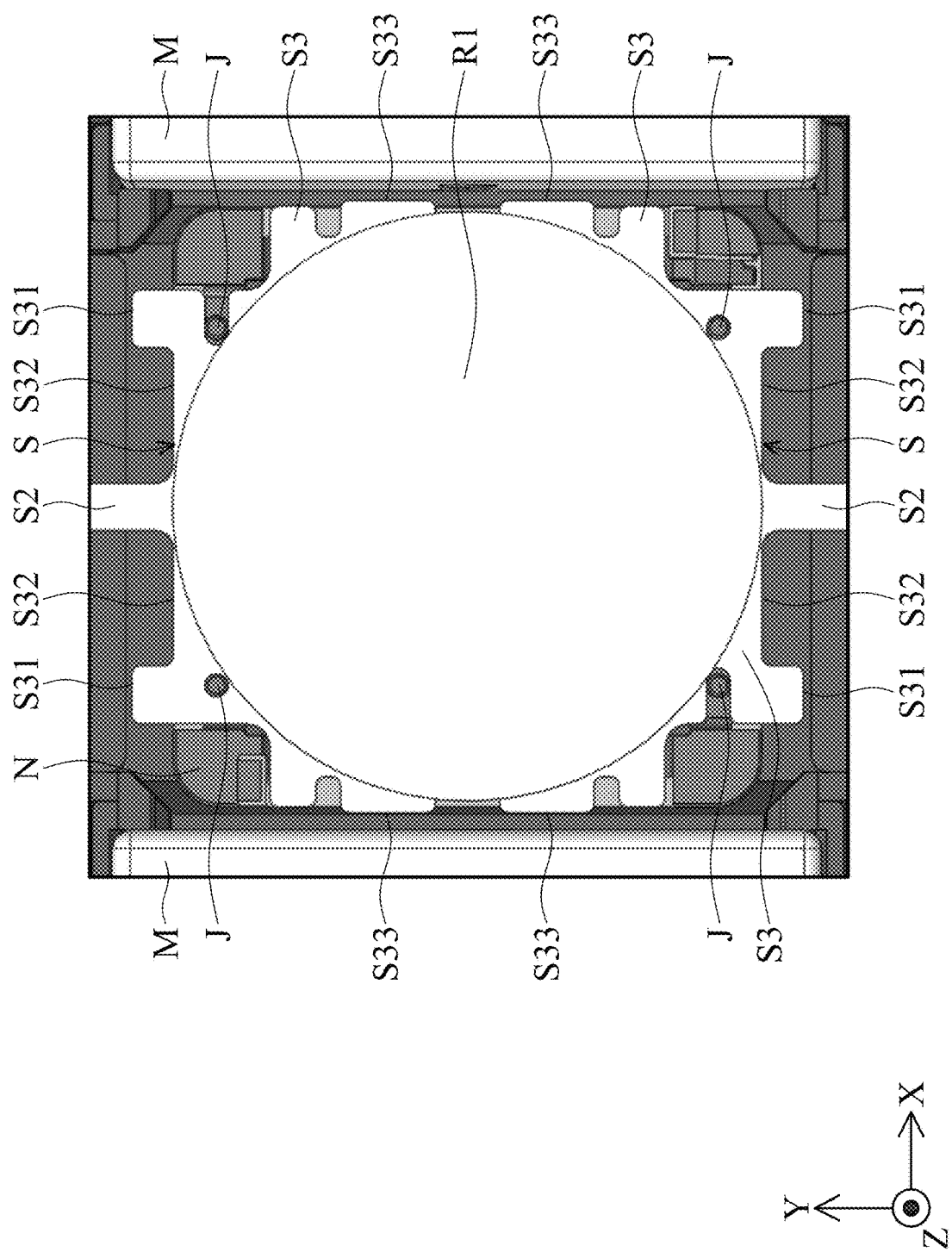

FIGS. 23 and 24 are partial perspective view and top view of a driving mechanism in accordance with another embodiment of the invention. Referring to FIGS. 23 and 24, two spring sheets S are used as the movable part of the driving mechanism for sustaining a round optical element R1. Moreover, a bobbin N and at least one coil W are affixed to the bottom side of the two spring sheets S, wherein the coil W is wound on the bobbin N.

In this embodiment, the bobbin N has a plurality of pins J (positioning structures), and at least one of the pins J extends through and protrudes from the top surface of the spring sheet S to contact and restrict the optical element R1 in a predetermined position, as shown in FIGS. 23 and 24.

It should be noted that the driving mechanism may further include a cover (not shown) to protect the spring sheets S and the optical element R1, and the stage S3 of the spring sheet S forms a protrusion S31 (positioning structure) protruding form a side of the spring sheet S, so as to restrict the cover can in a recess S32 adjacent to the protrusion S31. In this embodiment, each spring sheet S forms two protrusions S31 that are symmetrical to the deformable portion S2, and the two recesses S32 are formed between the two protrusions S31 and the deformable portion S2.

The spring sheet S in this embodiment forms at least one flat surface S33 (positioning structure) to contact and restrict the magnet M in a predetermined position in the X direction. Additionally, to enhance the connection strength between the spring sheet S and the bobbin N, the spring sheet S forms a bent portion S34 (FIG. 23) bent toward the bobbin N, whereby the adhesion area between the spring sheet S and the bobbin N can be efficiently increased to prevent the bobbin N being separated from the spring sheet S.

Figure 25:
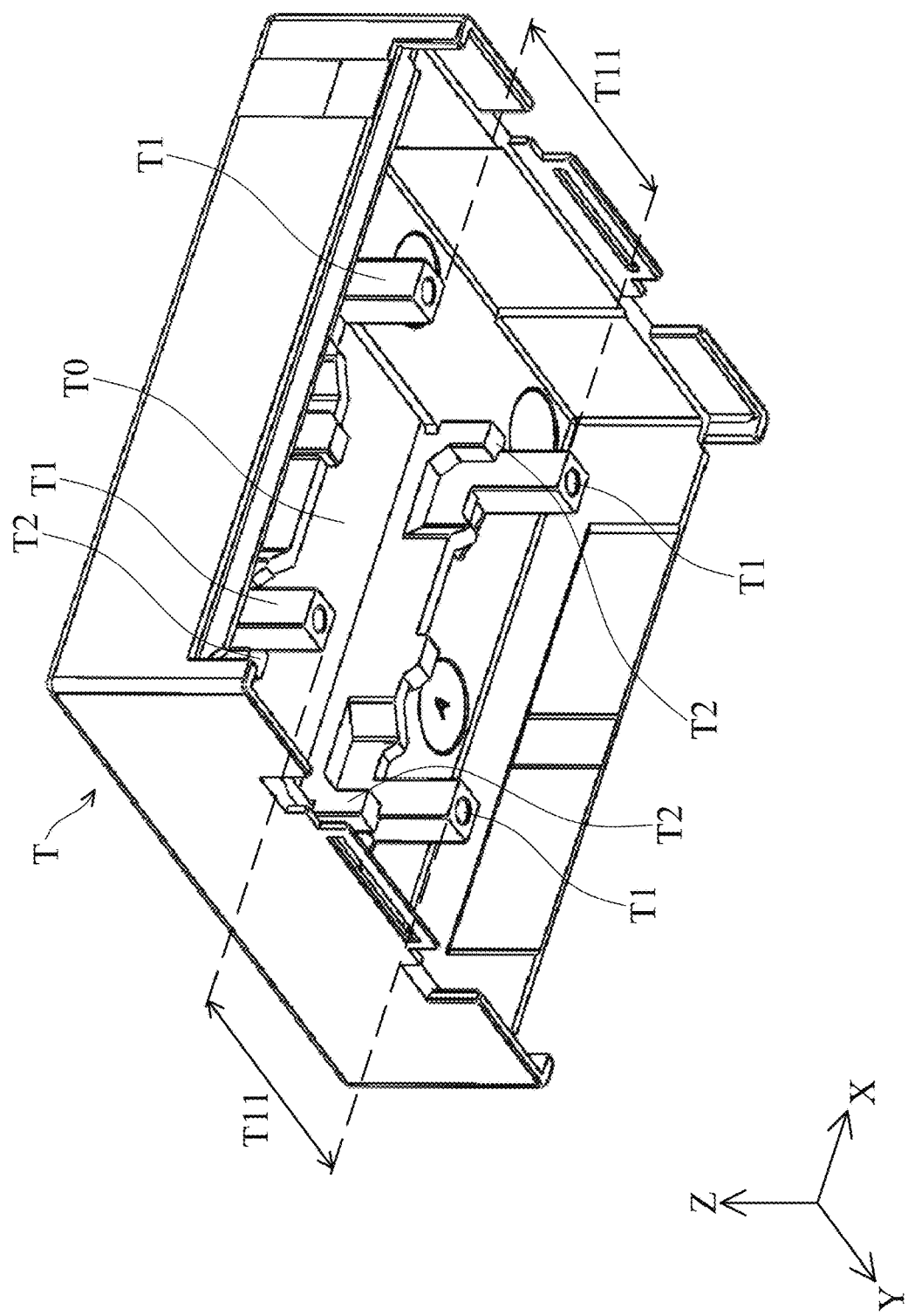
FIG. 25 is a perspective diagram of a cover T in accordance with another embodiment of the invention.
Figure 26:
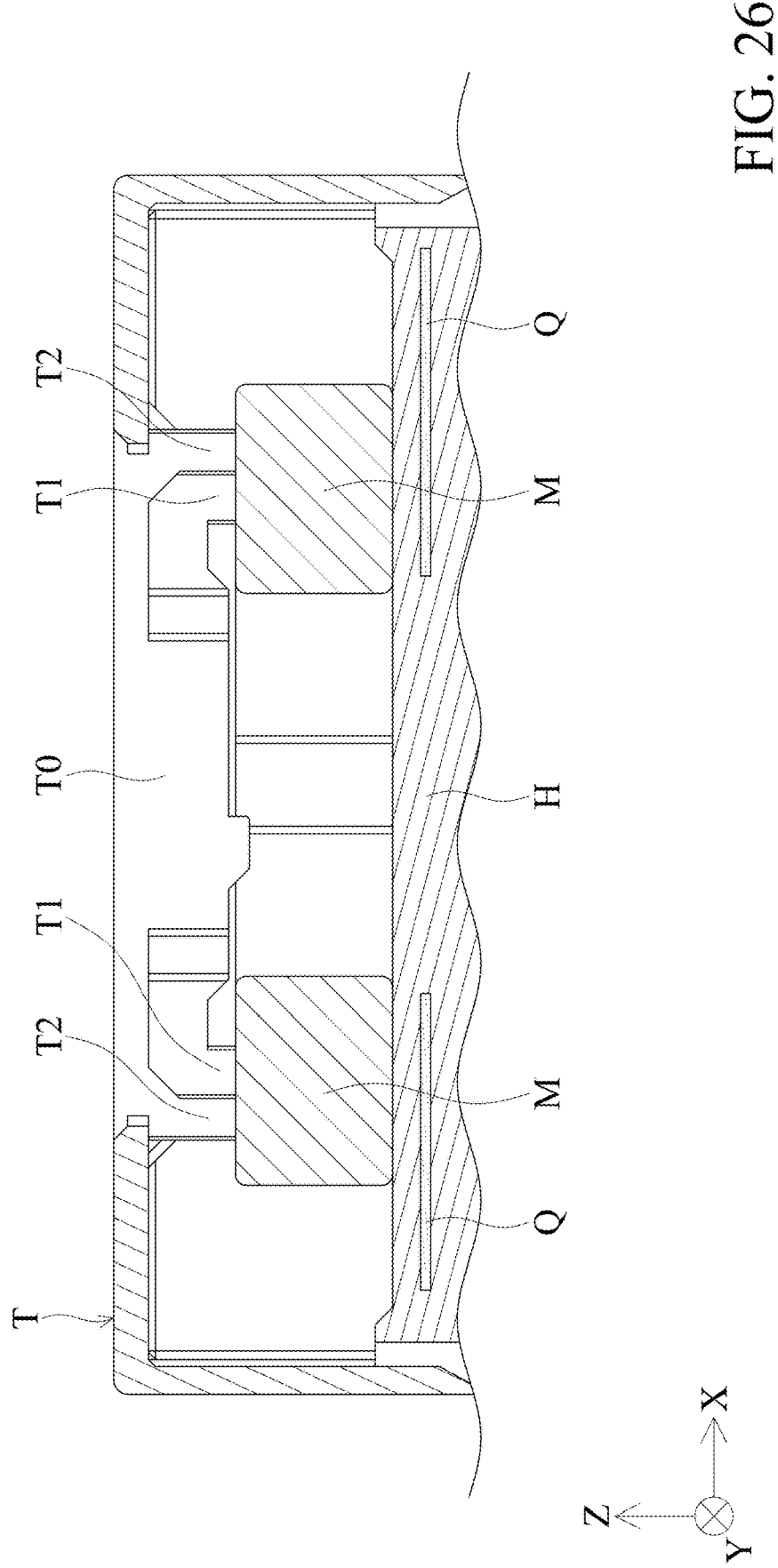
FIG. 26 is a partial sectional view of the cover T in FIG. 25, a fixed member H connected to the cover T, and two magnets M received in the cover T after assembly.

FIG. 25 is a perspective diagram of a cover T in accordance with another embodiment of the invention, and FIG. 26 is a partial sectional view of the cover T in FIG. 25, a fixed member H connected to the cover T, and two magnets M received in the cover T after assembly.

Referring to FIGS. 25 and 26, the cover T in this embodiment is mounted to the fixed member H to protect the components therein. The cover T forms an opening T0, a plurality of pillars T1, and a plurality of protrusions T2, wherein the pillars T1 and the protrusions T2 are formed on the inner side of the cover T and extend in the −Z direction (vertical direction).

During assembly, each of the magnets M can be positioned in a space T11 (FIG. 25) between two of the pillars T1, and the pillars T1 can restrict the magnets M to move in the Y direction (horizontal direction). Moreover, as shown in FIG. 26, the protrusions T2 on the inner side of the cover T can contact the magnets M in the −Z direction (vertical direction), so that the magnets M can be restricted in a predetermined position to prevent the magnets M being separated from the fixed member H.

Still referring to FIG. 26, two magnetic permeable sheets Q may be embedded in the plastic fixed member H by insert molding. As the magnetic permeable sheets Q are located close to the magnets M, the magnets M can be rapidly and automatically attached to the surface of the fixed member H by magnetic attraction between the magnets M and the magnetic permeable sheets Q. Therefore, high positioning accuracy and efficient assembly of the driving mechanism can be achieved.

Figure 27:
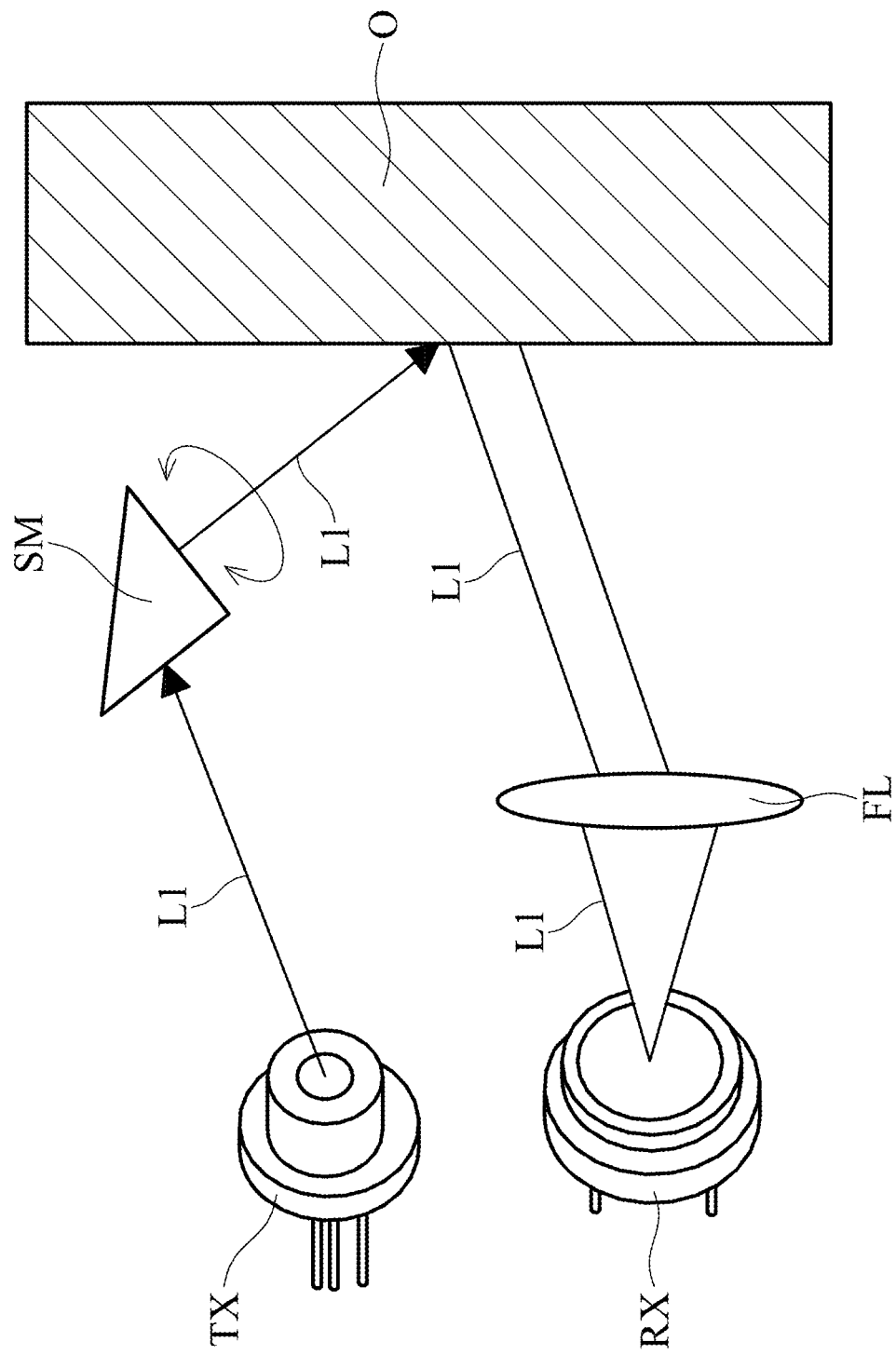
FIG. 27 is a perspective diagram of an optical sensing system in accordance with an embodiment of the invention.
Figure 28:
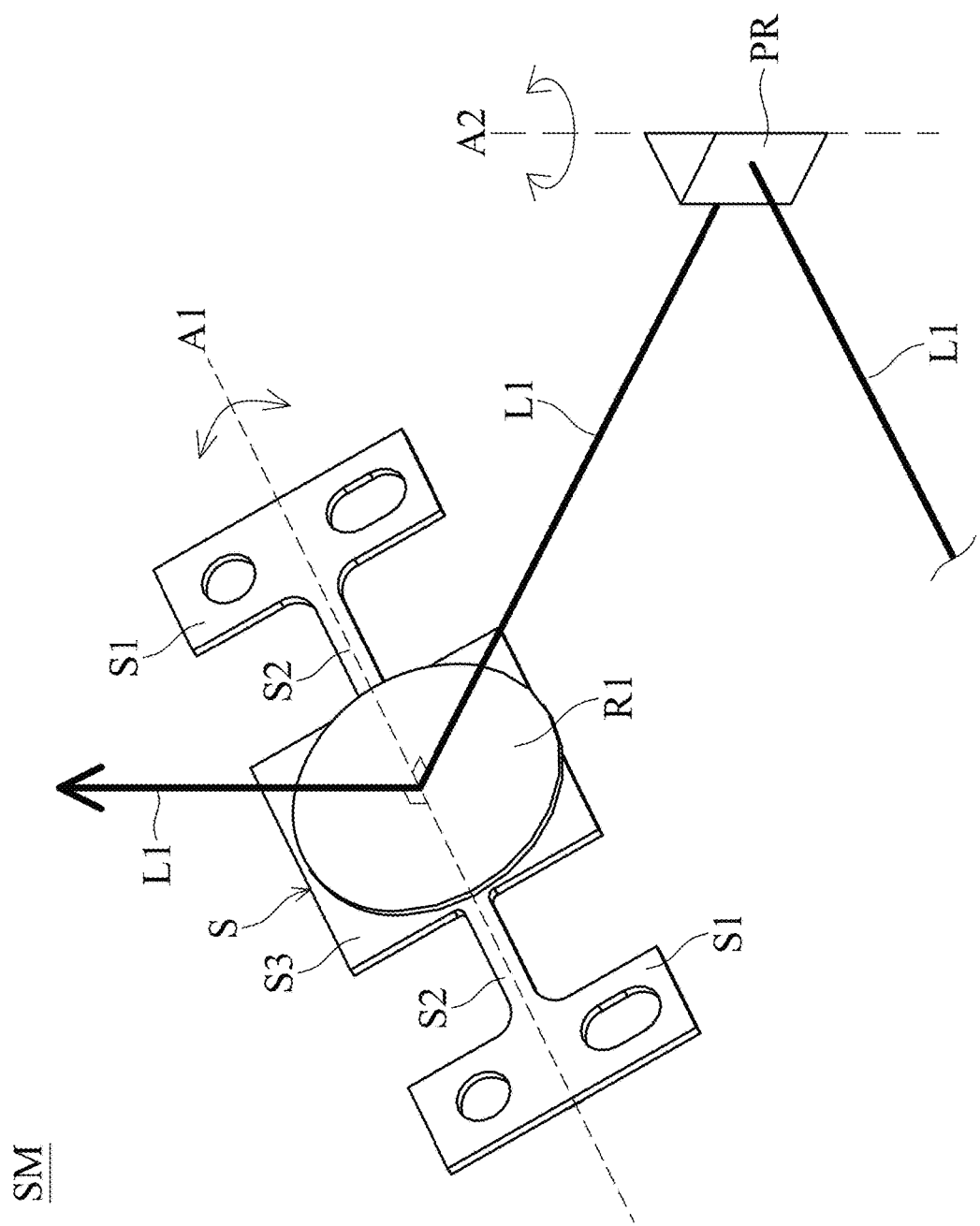
FIG. 28 is a perspective diagram of the optical module SM that changes the propagation direction of the sensing light L1 in FIG. 27.

Referring to FIGS. 27 and 28, FIG. 27 is a perspective diagram of an optical sensing system in accordance with an embodiment of the invention, and FIG. 28 is a perspective diagram of the optical module SM that changes the propagation direction of the sensing light L1 in FIG. 27.

As shown in FIGS. 27 and 28, the optical sensing system primarily comprises a light emitter TX, a light receiver RX, an optical module SM, and a focusing lens FL. The optical module SM includes a light path adjusting element PR and an optical element R1 (FIG. 28). The optical element R1 and the light path adjusting element PR can be driven to respectively rotate around a first axis A1 and a second axis A2 within a range by a driving assembly (e.g. magnets and coils), so as to perform depth sensing or 3D scanning of an object O.

Still referring to FIGS. 27 and 28, the light emitter TX can emit a sensing light L1 to the optical module SM, and the light path adjusting element PR and the optical element R1 of the optical module SM can redirect the sensing light L1 to the object O. Subsequently, the sensing light L1 is reflected by the object O and propagates through the focusing lens FL to the light receiver RX. In this embodiment, the light receiver RX can transfer light into an electrical signal and then transmit the electrical signal to a processor (not shown), so that 3D surface and depth information of the object O can be obtained.

The optical element R1 in FIG. 28 is disposed on a stage S3 of the spring sheet S. The spring sheet S may comprise a round, oval or rectangular mirror, and any one of the driving mechanisms as disclosed in FIGS. 1-26 may be applied to the spring sheet S, so that the spring sheet S can be driven to rotate around a first axis A1 within a first range. Additionally, the light path adjusting element PR may comprise a prism that is movably connected to a fixed part (e.g. the base B and the fixed member H in FIGS. 1-2), and it can rotate around a second axis A2 relative to the fixed part, wherein the second axis A2 is not parallel to the first axis A1. Here, the second axis A2 is perpendicular to the first axis A1.

In this embodiment, the sensing light L1 emitted from the light emitter TX propagates in an initial direction to the light path adjusting element PR, and the light path adjusting element PR redirects the sensing light L1 to propagate in an incident direction to the optical element R1 on the spring sheet S. Subsequently, the sensing light L1 is reflected by the optical element R1 to propagate in a reflecting direction and then reach the object O (FIG. 27). Here, the first axis A1 is perpendicular to the incident direction and the reflecting direction, and the second axis A2 is perpendicular to the initial direction and the incident direction.

It should be noted that the optical element R1 and the light path adjusting element PR can respectively rotate around the first and second axes A1 and A2 back and forth for depth sensing or 3D scanning a surface of the object O. In some embodiments, the optical element R1 and the stage S3 of the spring sheet S may be driven to rotate around the first axis A1 back and forth within a first range by open-loop control, and the light path adjusting element PR may be driven to rotate around the second axis A2 within a second range by closed-loop control.

In some embodiments, the spring sheet S has a first resonance frequency relative to the fixed part, and a first AC current signal can be applied to the coil of the driving assembly, thus driving the stage S3 to rotate around the first axis A1 back and forth within the first range. Additionally, the light path adjusting element PR may be driven to rotate around the second axis A2 by a voice coil motor (VCM).

Figure 29:
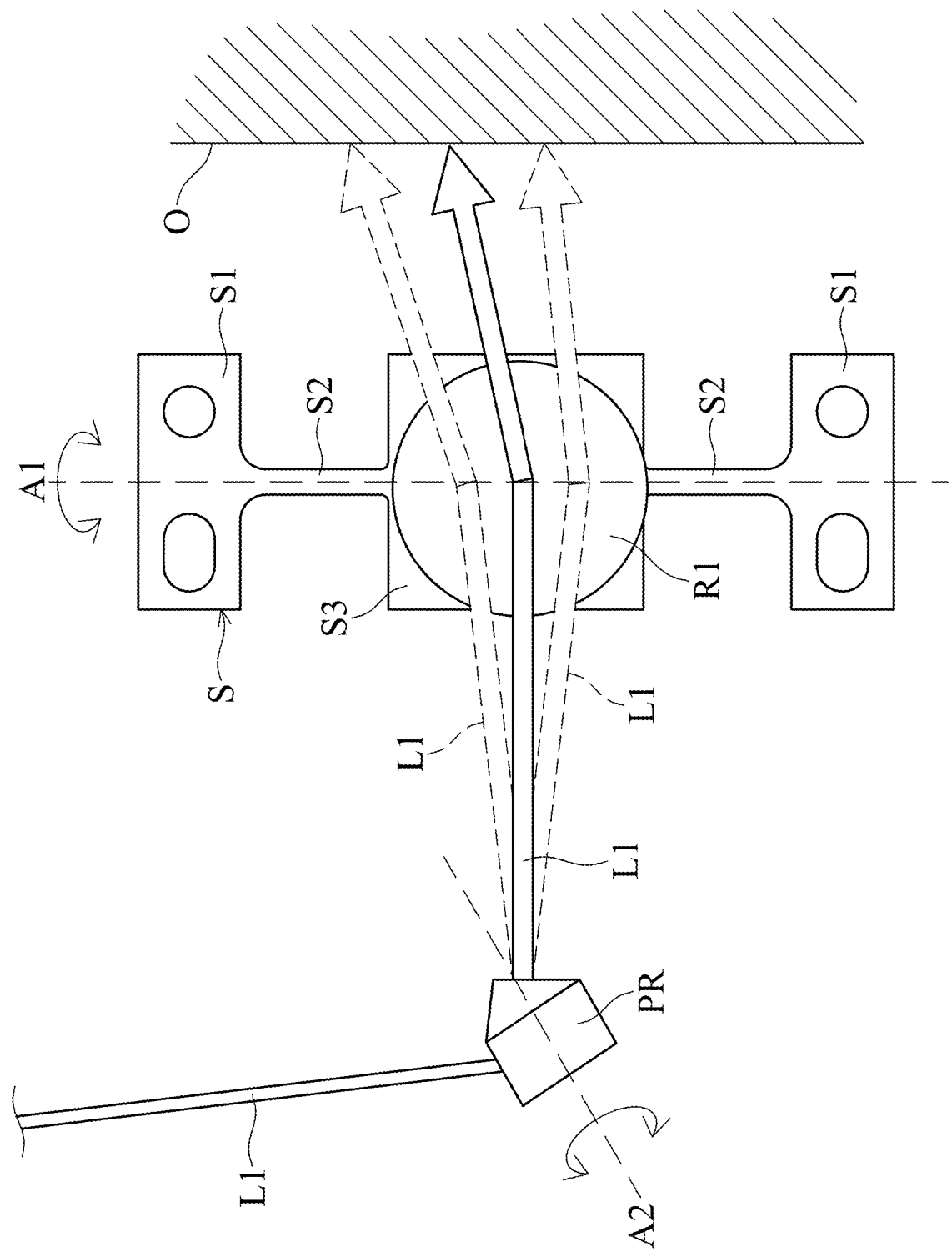
FIG. 29 is a perspective diagram of the sensing light L1 reflected by the optical element R1 to the object O while the light path adjusting element PR rotates around the second axis A2.
Figure 30:
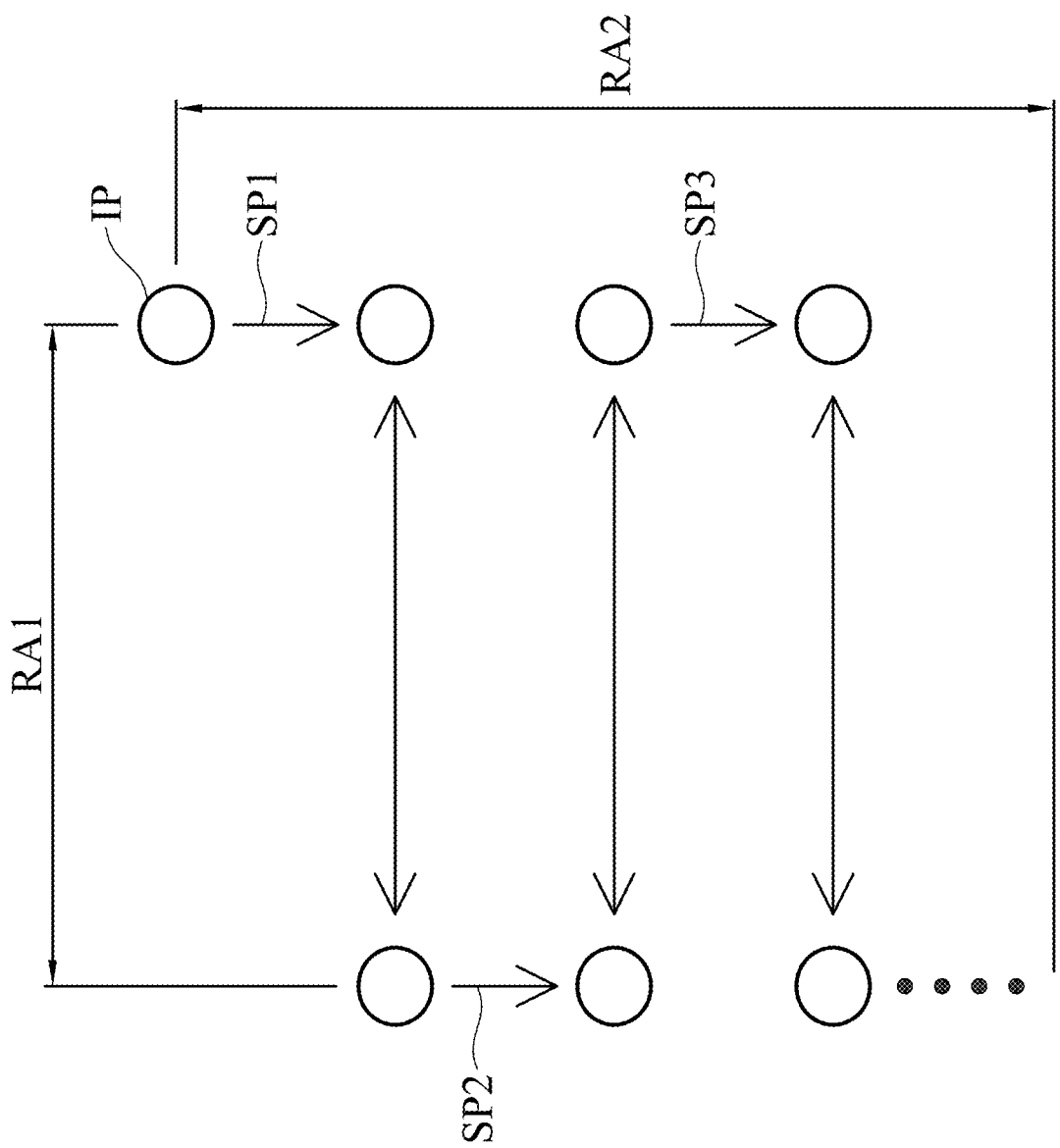
FIG. 30 is a perspective diagram showing the optical element R1 continuously rotates around the first axis A1 back and forth within a first range RA1, and the light path adjusting element PR rotates around the second axis A2 within a second range RA2 in a stepwise manner.

FIG. 29 is a perspective diagram of the sensing light L1 reflected by the optical element R1 to the object O while the light path adjusting element PR rotates around the second axis A2. FIG. 30 is a perspective diagram showing the optical element R1 continuously rotates around the first axis A1 back and forth within a first range RA1, and the light path adjusting element PR rotates around the second axis A2 within a second range RA2 in a stepwise manner.

As shown in FIG. 29, when the light path adjusting element PR rotates around the second axis A2, the sensing light L1 can scan through a fan-shaped area. Since the stage S3 of the spring sheet S can also rotate around the first axis A1 back and forth, the sensing light L1 can reach a specific surface area on the object O for depth sensing of 3D scanning.

Referring to FIG. 30, the optical element R1 and the stage S3 of the spring sheet S are driven to continuously rotate around the first axis A1 back and forth within the first range RA1. However, the light path adjusting element PR is driven to rotate in a stepwise manner around the second axis A2 within the second range RA2, different from the optical element R1 and the spring sheet S.

It should be noted that after the light path adjusting element PR rotates a first step angle SP1 in a predetermined direction around the second axis A2 from an initial position IP, the light path adjusting element PR stops rotating around the second axis A2 temporarily. The light path adjusting element PR will rotate a second step angle SP2 again in the predetermined direction around the second axis A2 after the optical element R1 and the stage S3 of the spring sheet S rotates throughout the first range RA1.

Furthermore, after the light path adjusting element PR rotates the second step angle SP2 around the second axis A2, the light path adjusting element PR stops rotating around the second axis A2 temporarily. Again, the light path adjusting element PR will rotate a third step angle SP3 around the second axis A2 after the optical element R1 and the stage S3 of the spring sheet S rotates throughout the first range RA1, and so on. With the optical element R1 and the light path adjusting element PR respectively rotating around the first and second axes A1 and A2, the sensing light L1 can be projected onto a surface area on the object O for depth sensing of 3D scanning.

Figure 31:
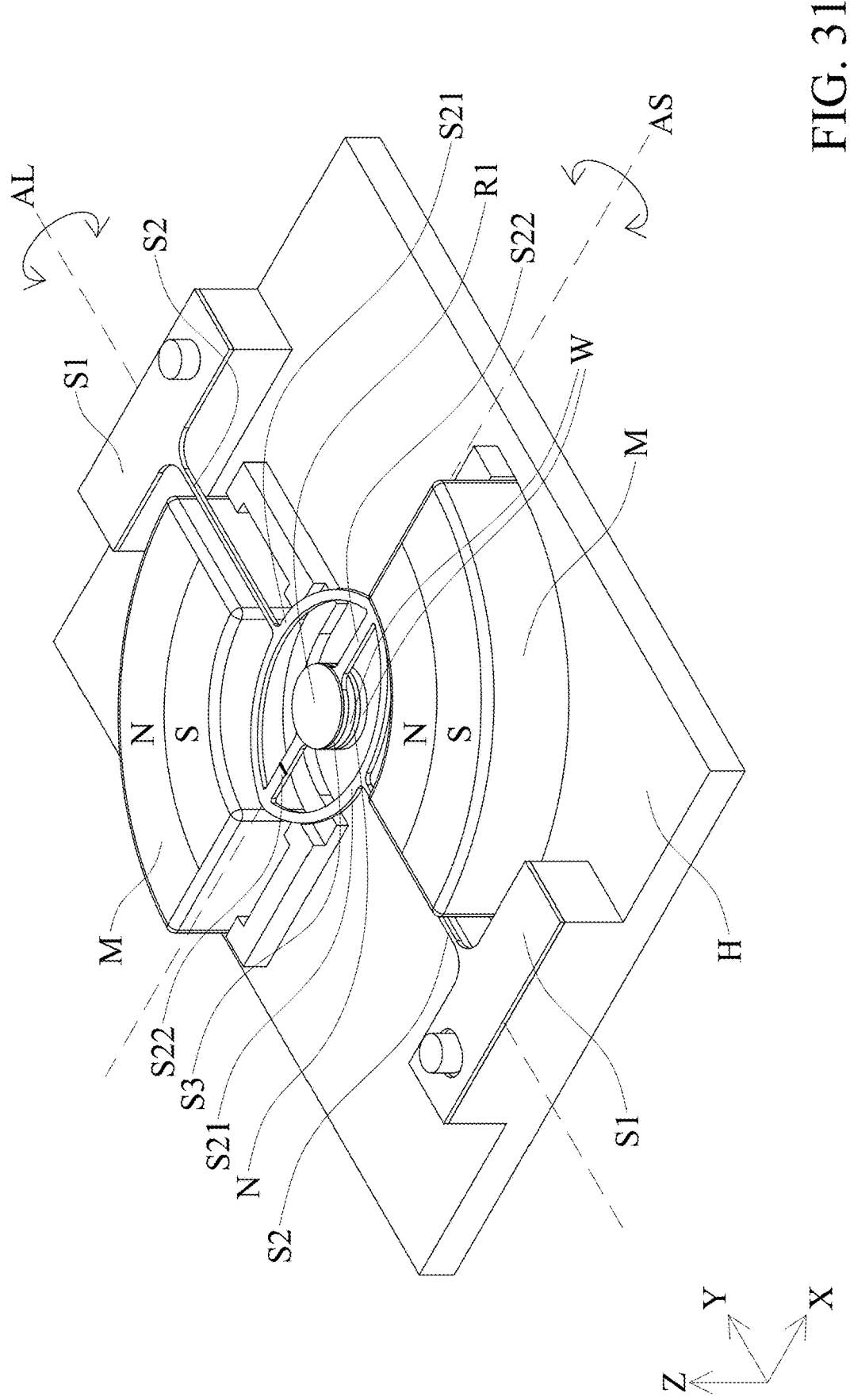
FIG. 31 is a perspective diagram of an upper module of a driving mechanism in accordance with an embodiment of the invention.
Figure 32:
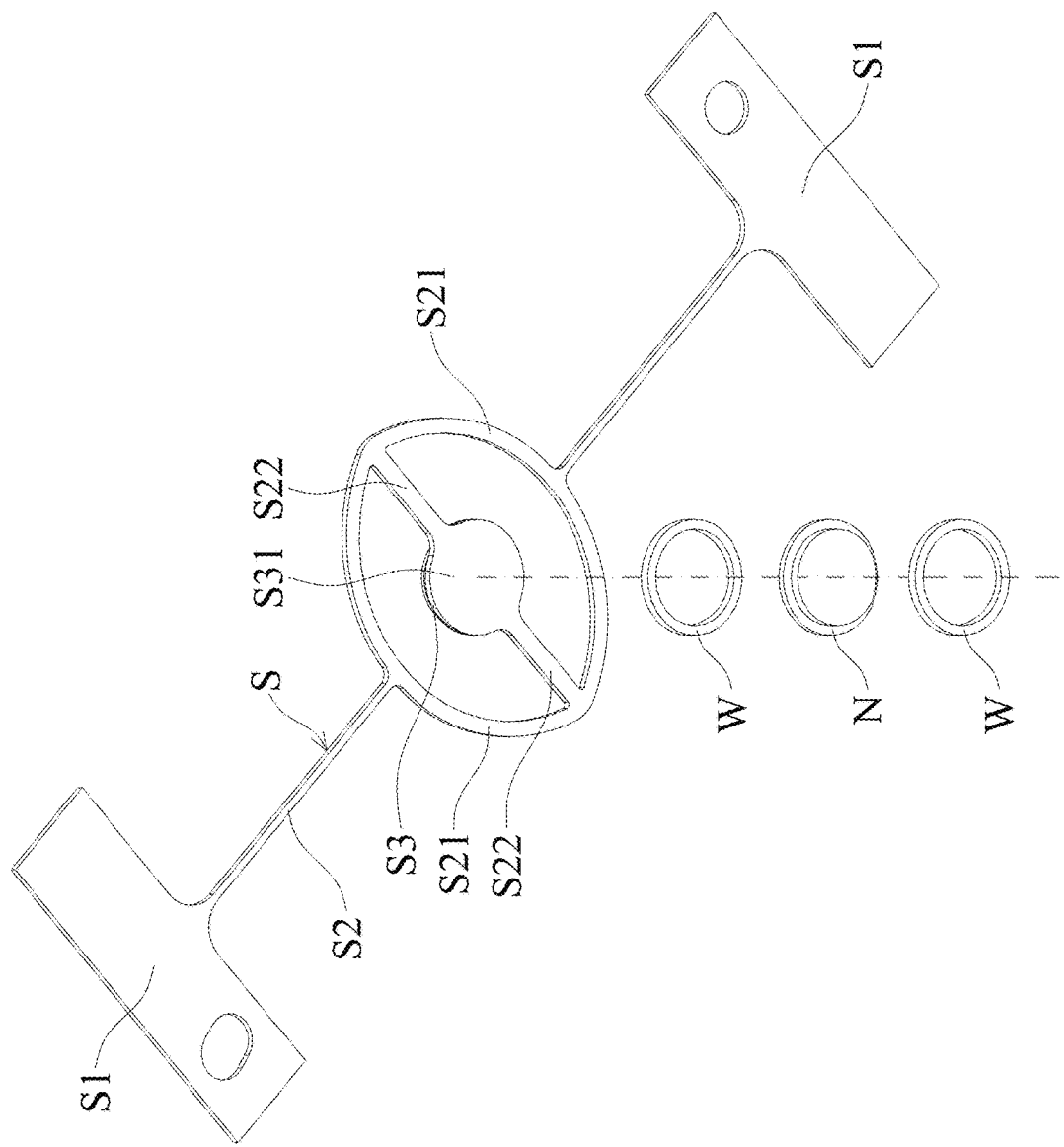
FIG. 32 is an exploded diagram of the spring sheet S, the coils W, and the bobbin N in FIG. 31.

FIG. 31 is a perspective diagram of an upper module of a driving mechanism in accordance with an embodiment of the invention. FIG. 32 is an exploded diagram of the spring sheet S, the coils W, and the bobbin N in FIG. 31.

Referring to FIG. 31, the upper module in this embodiment is different from FIGS. 1-2 in that the longitudinal spring sheet S has two curved portions S21 and two bridge portions S22. The curved portions S21 respectively connects the deformable portions S2 to the round stage S3, and an opening is formed between the curved portions S21 and two bridge portions S22.

FIG. 31 also shows that an optical element R1 and two coils W are respectively disposed on the top side and bottom side of the stage S3. In this embodiment, two magnets M are arranged along the diagonal direction of the spring sheet S, and they have the same polar directions.

Additionally, FIG. 32 shows the bobbin N and two coils W (as disclosed in FIGS. 7-10) are disposed on the bottom side of the stage S3. Here, the spring sheet S has a first resonance frequency and a second resonance frequency with respect to the fixed part. A first AC current signal can be applied to the coils W in a first time interval, and a second AC current signal can be applied to the coils W in a second time interval. Thus, the stage S3 can be driven to rotate back and forth around the long axis AL and the short axis AS of the spring sheet S in different time periods.

However, in some embodiments, the two coils W can also be energized by the first and second AC current signals at the same time. Thus, the stage S3 can be driven to rotate back and forth around the long axis AL and the short axis AS of the spring sheet S at the same time, wherein the long axis AL is perpendicular to the short axis AS. For example, the first resonance frequency is from 10 Hz to 30 Hz, and the second resonance frequency is from 300 Hz to 1000 Hz, wherein the second resonance frequency may be over 10 times the first resonance frequency.

In some embodiments, the bobbin N can also be replaced by the multiple circuit structure as disclosed in FIGS. 21 and 22, wherein the coil or the circuit may be integrally formed on top or bottom side of the spring sheet S by metallic printing ink or circuit-on-metal technology. When the coil is energized by a current signal, the stage S3 of the spring sheet S can rotate around the long axis AL or the short axis AS. In some embodiments, the circuit may be connected to a position sensor (e.g. Hall effect sensor) to obtain the posture angle of the stage S3 and the optical element R1.

Figure 33:
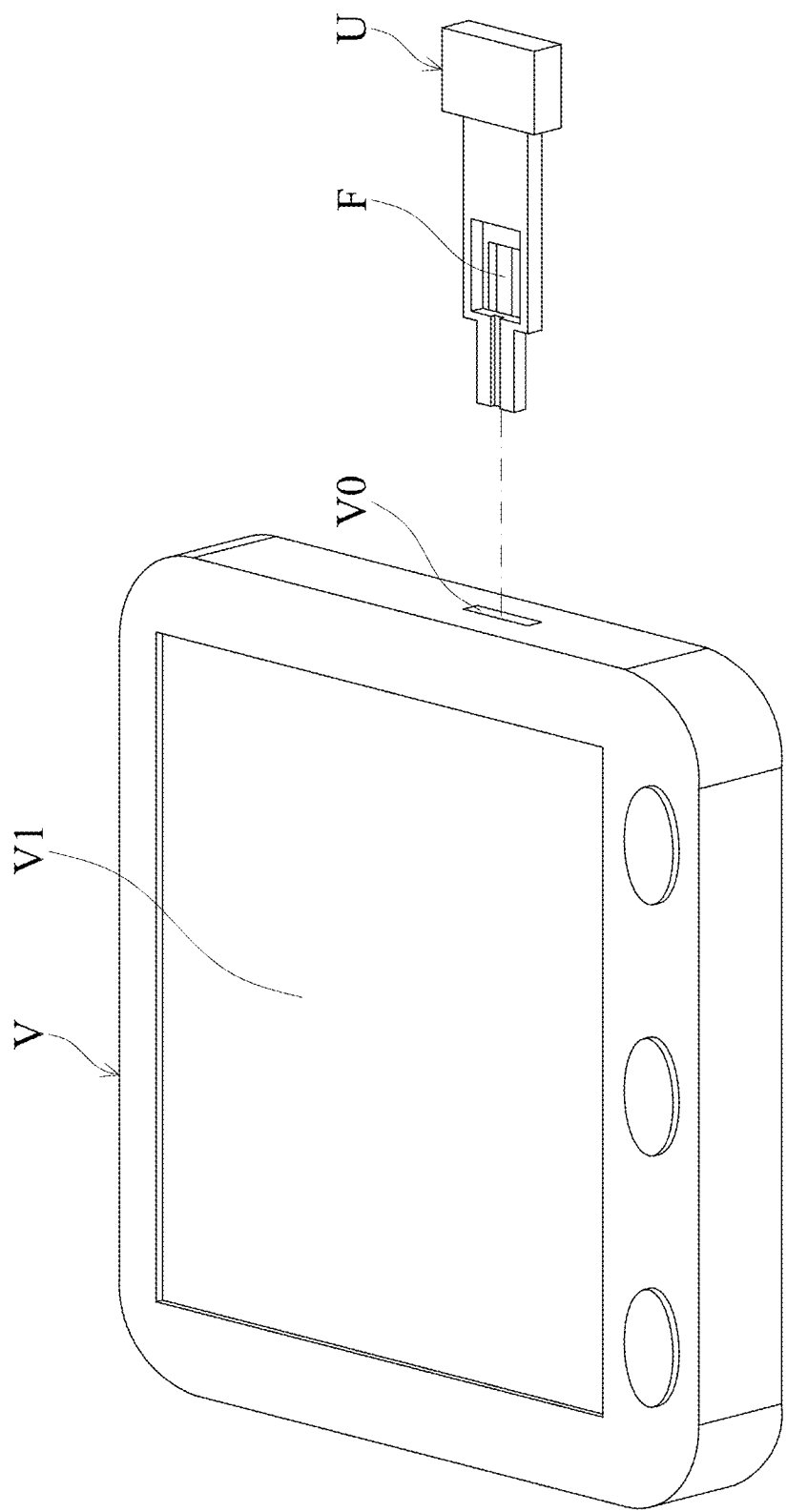
FIG. 33 is a perspective diagram of sensing module U and an analyzing device V.
Figure 34:
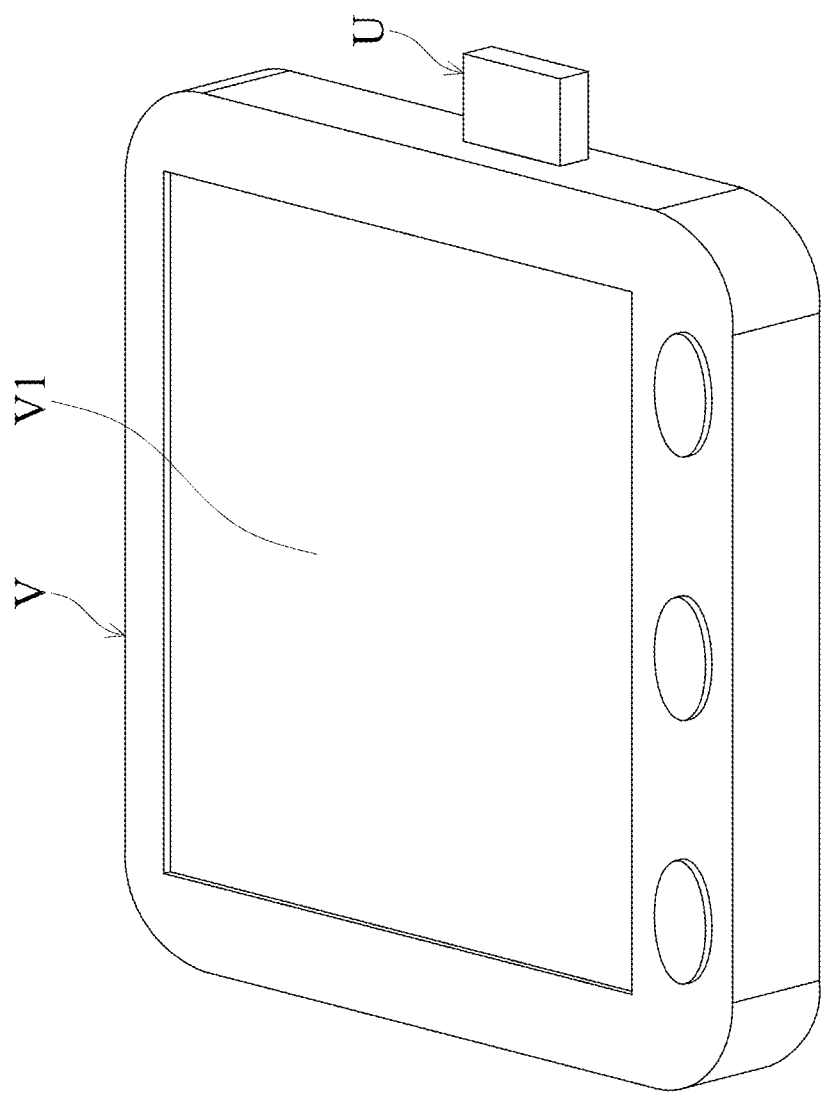
FIG. 34 is a perspective diagram showing the sensing module U when connected to the analyzing device V.

FIG. 33 is a perspective diagram of a sensing module U and an analyzing device V, and FIG. 34 is a perspective diagram showing the sensing module U when connected to the analyzing device V.

Referring to FIGS. 33 and 34, the sensing module U in this embodiment has a sensing film F. The sensing film F may comprise porous material to adsorb a specimen. To detect some specific substance in the specimen, the sensing module U can be inserted into a slot V0 on a side of the analyzing device V, so that the sensing module U and the analyzing device V are electrically connected to each other. Subsequently, a light source in the analyzing device V can project light onto the sensing module U for obtaining concentration or quantity information of the substance in the specimen.

In some embodiments, the sensing module U may comprise disposable material and is detachably connected to the analyzing device V. Hence, it could be easy to use and especially suitable in the field of point-of-care testing (POCT).

Figure 35:
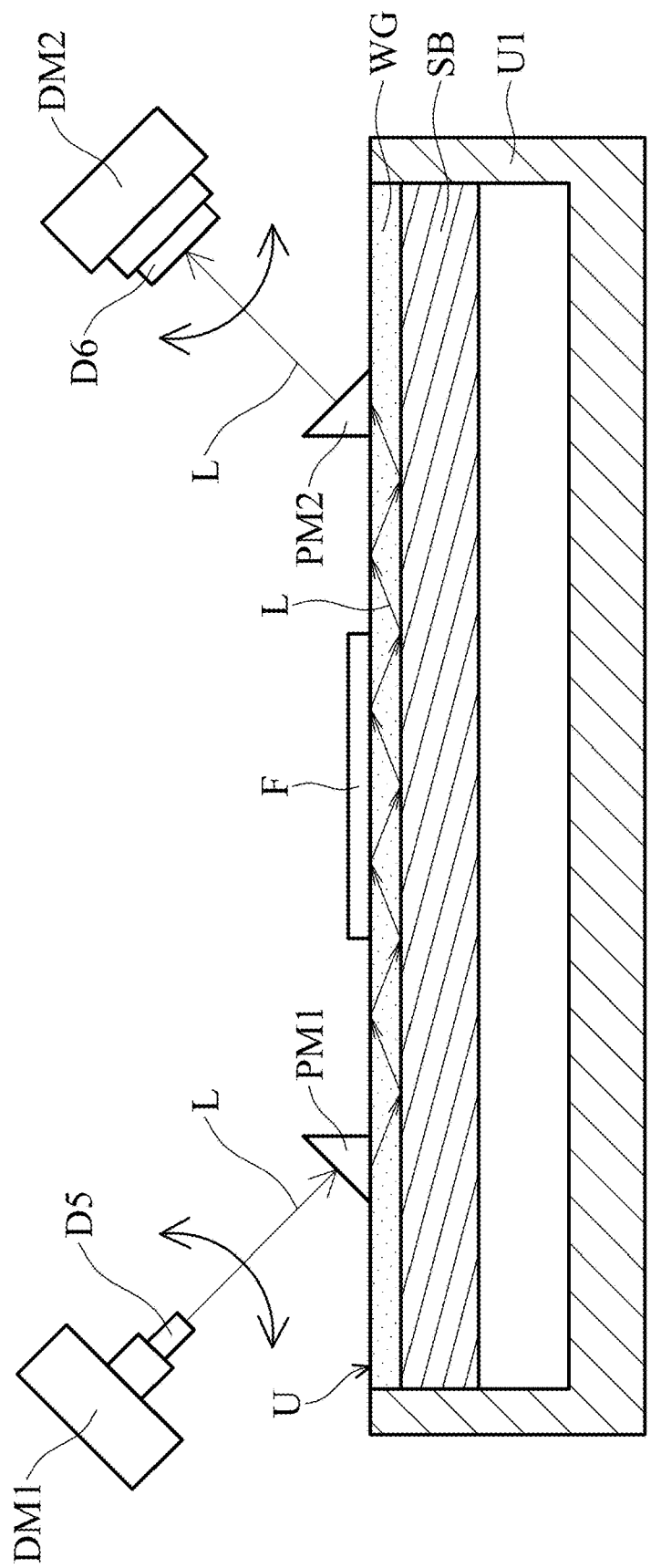
FIG. 35 is a perspective diagram of an optical sensing system in accordance with an embodiment of the invention.

FIG. 35 is a perspective diagram of an optical sensing system in accordance with an embodiment of the invention. As shown in FIG. 35, when the sensing module U and the analyzing device V are connected to each other, a light emitter D5 can emit a sensing light L to a first optical coupler PM1 of the sensing module U, and the sensing light L then enters a light guide element WG under the first optical coupler PM1. Subsequently, the sensing light L is reflected multiple times within the light guide element WG and propagates into a second optical coupler PM2. A light receiver D6 in the analyzing device V finally receive the sensing light L and transfer the sensing light L into an electrical signal.

It should be noted that the light receiver D6 can transmit sensing data to a processing unit (not shown) in the analyzing device V according to the sensing light L. The processing unit compares the sensing data with reference data in a memory unit and then transmits an image signal to the display V1. In this embodiment, the sensing data includes intensity or phase information of the sensing light L.

The light emitter D5, the light receiver D6, and the sensing module U can constitute an optical system, wherein the sensing module U has a hollow housing U1 and a substrate SB disposed in the housing U1. The light guide element WG is disposed on the substrate SN, and the sensing film F, the first optical coupler PM1, and the second optical coupler PM2 are all disposed on a top surface of the light guide element WG.

In some embodiments, the light guide element WG may be an optical waveguide (OWG) that comprises polymer resin, and the substrate SB may comprise quartz or glass. The light emitter D5 may comprise an LED or LD, the light receiver D6 may comprise photodiode, and the sensing light L may be laser or general light. Additionally, the first and second optical couplers PM1 and PM2 may comprise prisms or other optical lenses, and the sensing film F is located between the first and second optical couplers PM1 and PM2.

As mentioned above, when the sensing light L propagates through the first optical coupler PM1 into the light guide element WG, the sensing light L is reflected multiple times inside the light guide element WG, and an evanescent wave of the sensing light L can cause Surface Plasmon Resonance (SPR) between the light guide element WG and the sensing film F. As a result, the specific substance in the specimen that is attached to the sensing film F (or the reaction product generated by the specific substance and the sensing film F)

can absorb the energy of the sensing light L or cause phase variation of the sensing light L.

Hence, the intensity or phase of the sensing light L received by the light receiver D6 would be different from the sensing light L generated by the light emitter D5, whereby the concentration or quantity of the specific substance in the specimen can be determined. For example, the specific substance may comprise glucose or anti-allergen antibody.

Specifically, to compensate the positioning error between the light emitter D5 and the first optical coupler PM1, a driving mechanism DM1 in the analyzing device V is provided and connected to the light emitter D5. The driving mechanism DM1 can drive the light emitter D5 to rotate relative to the sensing module U, to ensure the sensing light L emitted by the light emitter D5 can successfully and efficiently propagate through the first optical coupler PM1 to the light guide element WG.

Similarly, another driving mechanism DM2 in this embodiment is provided and connected to the light receiver D6 for driving the light receiver D6 to rotate relative to the sensing module U, thus ensuring the sensing light L that propagates through the second optical coupler PM2 can efficiently and successfully reach the light receiver D6.

For example, the driving mechanisms DM1 and DM2 may comprise a voice coil motor (VCM) that applies the configuration of the driving mechanisms as disclosed in FIGS. 1-32, so that the angle of the light emitter D5 and the light receiver D6 can be appropriately adjusted to improve the efficiency of the optical sensing system.

Figure 36:
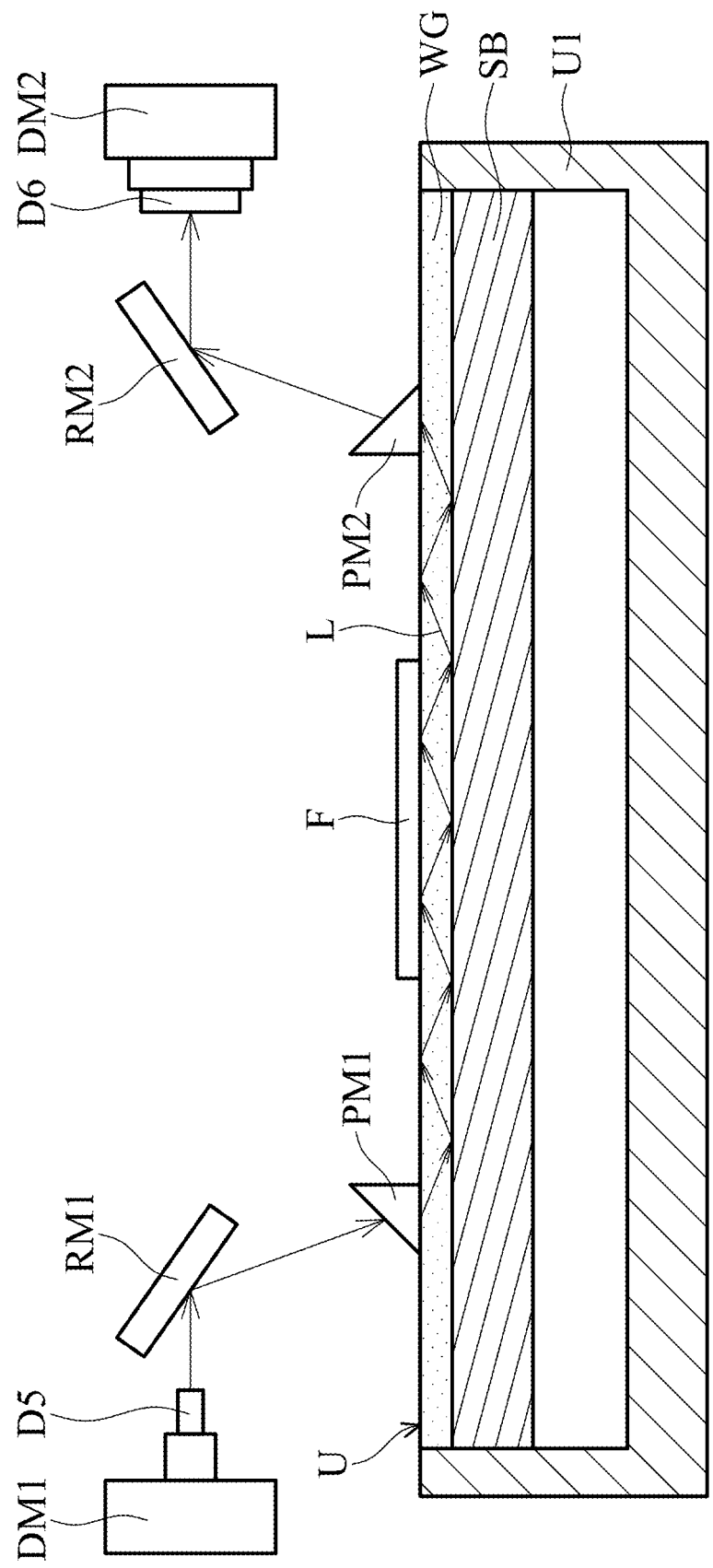
FIG. 36 is a perspective diagram of an optical sensing system in accordance with another embodiment of the invention.

FIG. 36 is a perspective diagram of an optical sensing system in accordance with another embodiment of the invention. As shown in FIG. 36, this embodiment is different from FIG. 35 in that a first light path adjusting element RM1 and a second light path adjusting element RM2 are provided in the analyzing device V to guide the sensing light L into/out of the sensing module U.

As shown in FIG. 36, the light emitter D5 emits the sensing light L to the first light path adjusting element RM1, and the first light path adjusting element RM1 redirects the sensing light L to propagate through the first optical coupler PM1 and into the light guide element WG. Subsequently, the sensing light L propagates through the light guide element WG and the second optical coupler PM2 to the second light path adjusting element RM2, and the second light path adjusting element RM2 guides the sensing light L to the light receiver D6.

In some embodiments, the light emitter D5 and the first optical coupler PM1 (or the light receiver D6 and the second light path adjusting element RM2, or the light emitter D5, the light receiver D6 and the first and second light path adjusting element RM1 and RM2) are arranged in a direction parallel to the light guide element WG for miniaturization of the optical sensing system.

In some embodiments, the first and second light path adjusting element RM1 and RM2 may comprise a prism or mirror that has a curved surface, and they may apply the configuration of the driving mechanisms as disclosed in FIGS. 1-32, so that they can be appropriately driven to rotate and efficiently guide the sensing light L to the light receiver D6.

Figure 37:
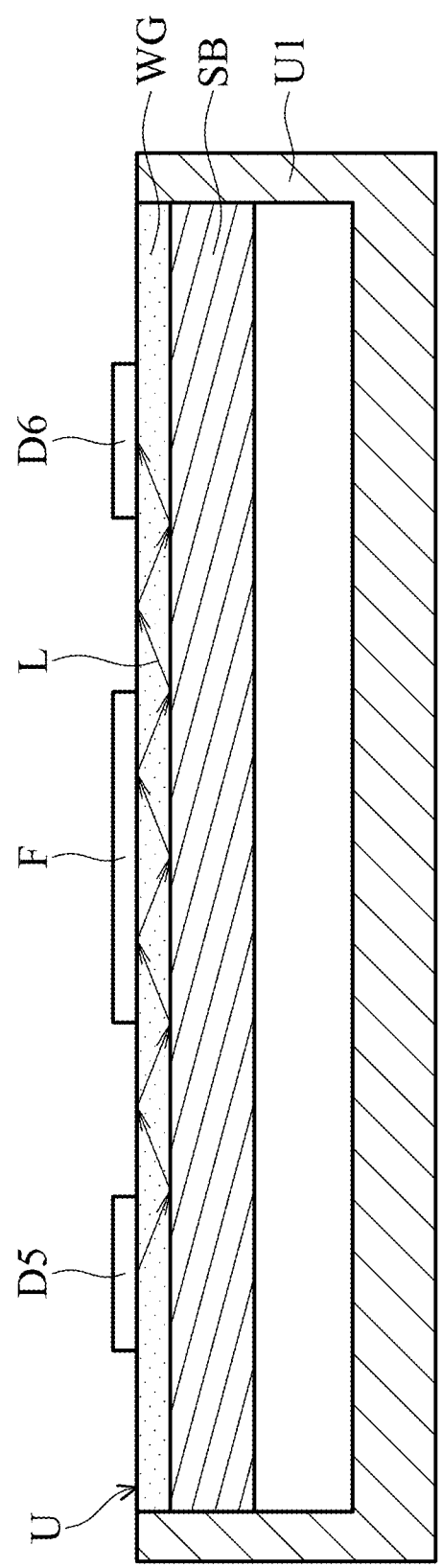
FIG. 37 is a perspective diagram of an optical sensing system in accordance with another embodiment of the invention.

FIG. 37 is a perspective diagram of an optical sensing system in accordance with another embodiment of the invention. As shown in FIG. 37, this embodiment is different from FIG. 35 in that the first and second optical couplers PM1 and PM2 are omitted from the optical sensing system. Here, the light emitter D5 and the light receiver D6 are directly disposed on the top surface of the light guide element WG. In some embodiments, the light receiver D6 may have a thickness larger than the light emitter D5 to efficiently receive the sensing light L and facilitate miniaturization of the optical sensing system.

For example, the light emitter D5 may comprise OLED, and the light receiver D6 may comprise organic photodiodes (OPD), and both of them are directly formed on the top surface of the light guide element WG by a coating process. Thus, the sensing light L can directly enters the light guide element WG and prevent the positioning error between the light emitter D5 and the light guide element WG. In some embodiments, a middle layer (not shown) may be formed between the light guide element WG and the light receiver D6, wherein the middle layer comprises a refractive index greater than the light guide element WG or ranged between the light guide element WG and the light receiver D6. In some embodiments, the middle layer may be integrally formed with the light receiver D6 in one piece.

FIG. 38 is a perspective diagram showing the sensing light L propagates from the light emitter D5 through the sensing module U to the light receiver D6. FIG. 39 is a perspective diagram showing the light emitter D5 is rotatable relative to the sensing module U. FIG. 40 is a perspective diagram showing the light emitter D5 and the light receiver D6 are both rotatable relative to the sensing module U.

As shown in FIG. 38, the sensing light L is emitted from the light emitter D5 through the sensing module U to the light receiver D6, wherein the light emitter D5 and the light receiver D6 may be disposed inside the analyzing device V or directly affixed to the light guide element WG of the sensing module U (FIG. 37).

As shown in FIG. 39, the light emitter D5 may be rotatable relative to the sensing module U by applying the driving mechanism DM1 in FIGS. 35 and 36, so that the sensing light L can be successfully and efficiently guided into the light guide element WG. In some embodiments, as shown in FIG. 40, b the light emitter D5 and the light receiver D6 are both rotatable relative to the sensing module U by applying the driving mechanisms DM1 and DM2 in FIGS. 35 and 36, so that the light receiver D6 can efficiently receive the sensing light L.

FIG. 41 is a perspective diagram showing the light emitter D5 and the sensing module U are rotatable relative to the light receiver D6. FIG. 42 is a perspective diagram showing the light receiver D6 and the sensing module U are rotatable relative to the light emitter D5.

As shown in FIG. 41, the light emitter D5 may be affixed to the sensing module U, and they can both rotate relative to the light receiver D6 by applying the driving mechanisms as disclosed in FIGS. 1-32, so that light receiver D6 can efficiently receive the sensing light L.

Similarly, as shown in FIG. 42, the light receiver D6 may be affixed to the sensing module U, and they can both rotate relative to the light emitter D5 by applying the driving mechanisms as disclosed in FIGS. 1-32, so that the sensing light L can be successfully and efficiently guided to the sensing module U.

FIG. 43 is a perspective diagram showing the first light path adjusting element RM1 is rotatable relative to the sensing module U. FIG. 44 is a perspective diagram showing the first and second light path adjusting elements RM1 and RM2 are both rotatable relative to the sensing module U.

As shown in FIG. 43, the first light path adjusting element RM1 may be disposed in the analyzing device V for guiding the sensing light L to the sensing module U (FIG. 36).

Specifically, the first light path adjusting element RM1 can rotate relative to the sensing module U or the light emitter D5.

Similarly, as shown in FIG. 44, the second light path adjusting element RM2 may also be disposed in the analyzing device V for guiding the sensing light L to the light receiver D6, so that the light receiver D6 can efficiently receive the sensing light L.

It should be noted that the sensing module U may comprise disposable material and is detachably connected to the analyzing device V. Hence, it could be easy to use and especially suitable in the field of point-of-care testing (POCT).

Figure 45:
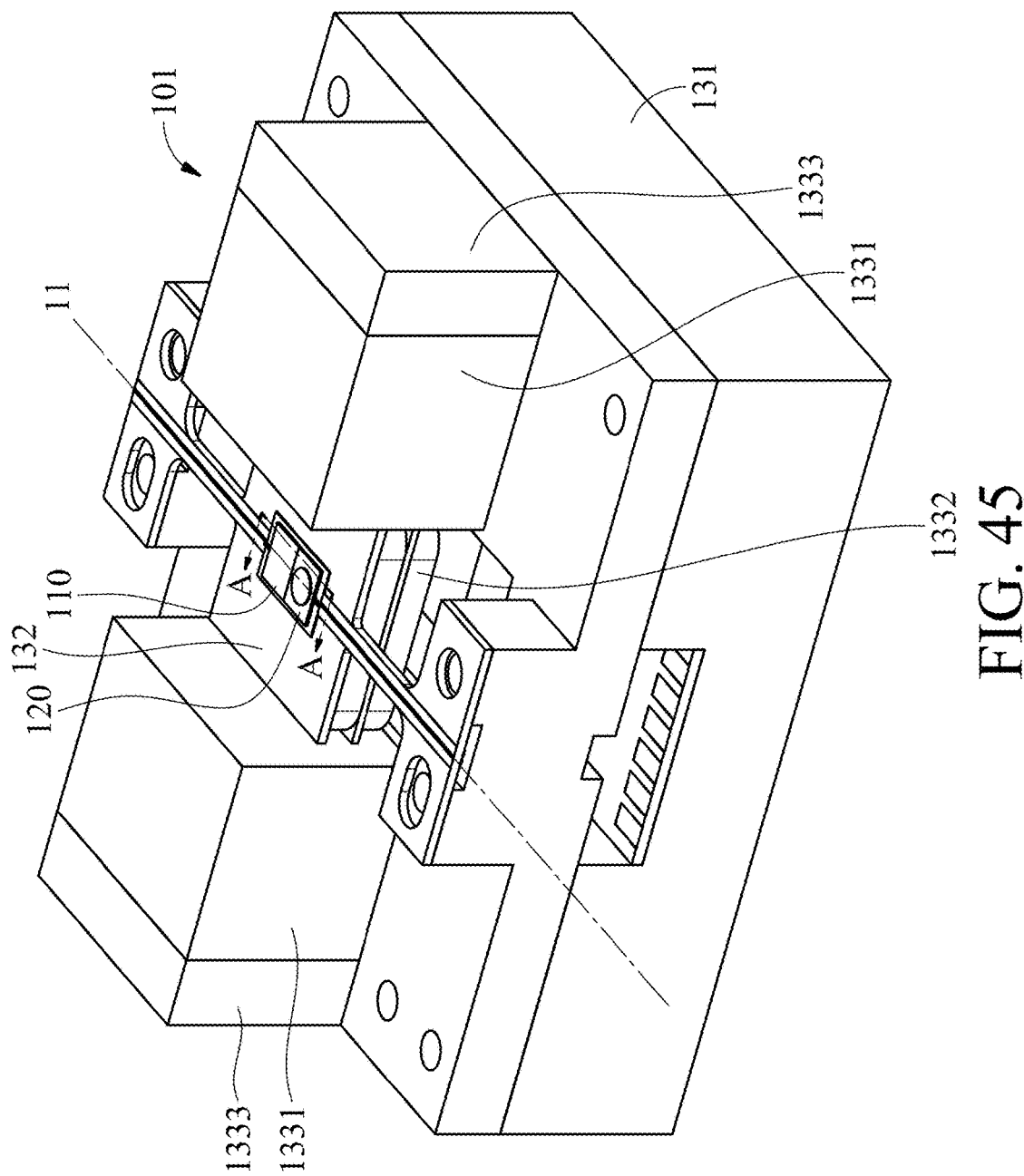
FIG. 45 is a schematic diagram of an optical member driving mechanism according to an embodiment of the invention.
Figure 46:
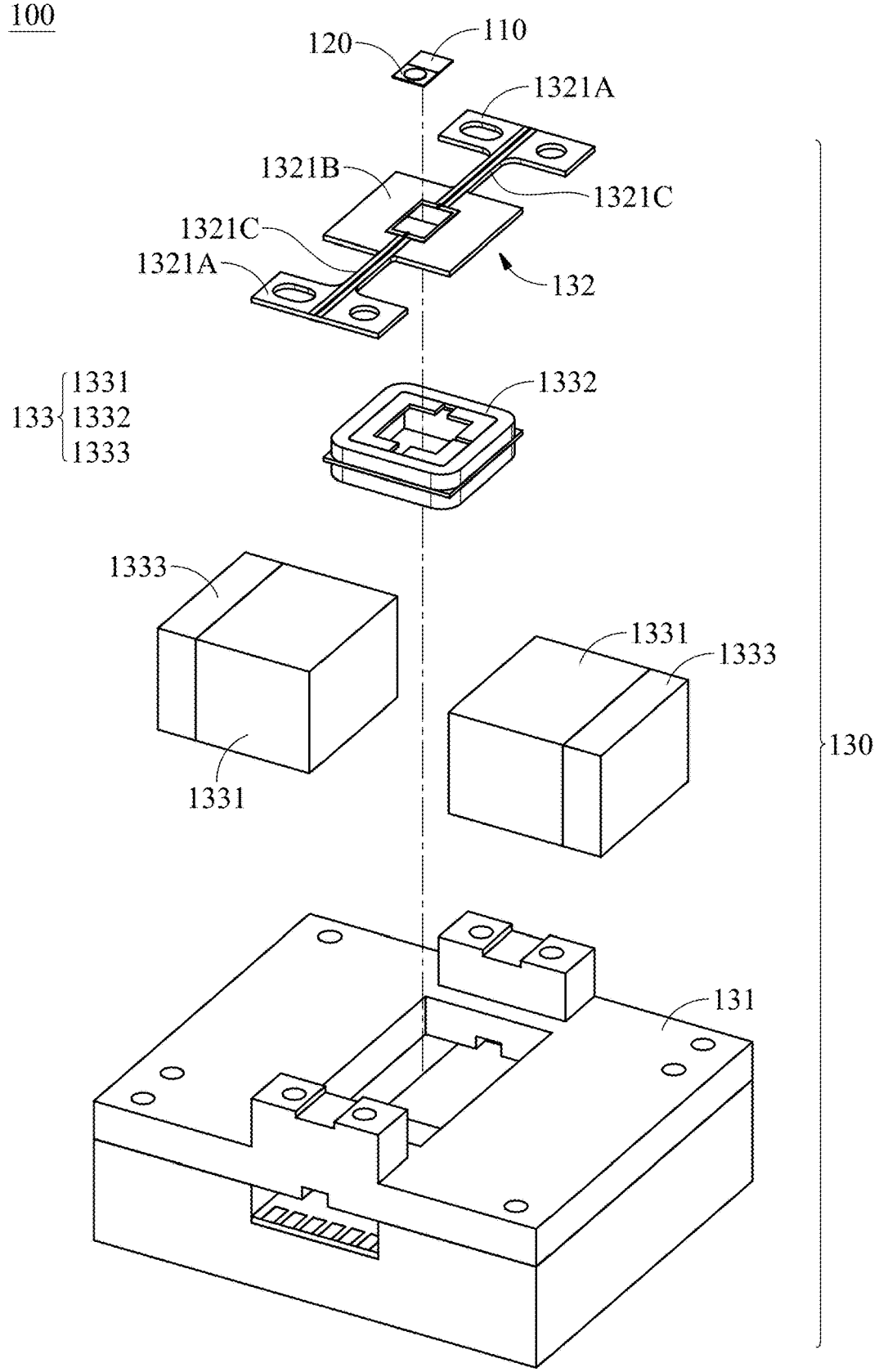
FIG. 46 is an exploded-view diagram of the optical member driving mechanism according to an embodiment of the invention.

FIG. 45 is a schematic diagram of an optical member driving mechanism 100, and FIG. 46 is an exploded-view diagram of the optical member driving mechanism 100. The optical member driving mechanism 100 can be mounted in a vehicle (such as a car or a motorcycle) or a portable device (such as a smart phone or a tablet computer), and can be electrically connected to a processor (not shown). The optical member driving mechanism 100 can emit light toward an object, and receive the light reflected by the object. The processor can calculate the profile of the object according to the time lag between emitting and receiving, or the data of luminous intensity of the received light.

As shown in FIGS. 45 and 46, the optical member driving mechanism 100 primarily includes a light emitter 110, a light receiver 120, and a rotation module 130, wherein the light emitter 110 and the light receiver 120 are disposed on the rotation module 130. The light emitter 110 emits light toward a direction away from the optical member driving mechanism 100 at a side 101 of the optical member driving mechanism 100, and the light receiver 120 receives the same type light being emitted toward the optical member driving mechanism 100 at the same side 101. For example, the light can be an infrared light, a white light, or a laser.

The rotation module 130 includes a fixed portion 131, a movable portion 132, and a driving assembly 133. The fixed portion 131 can be a base, and the movable portion 132 can be a carrier. The movable portion 132 is movably connected to the fixed portion 131.

Figure 47:
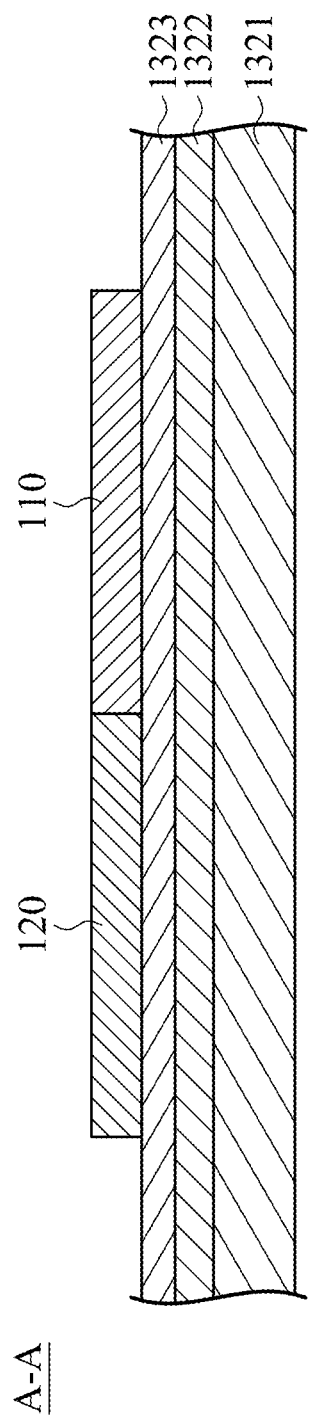
FIG. 47 is a cross-sectional view along the line A-A in FIG. 45.

As shown in FIGS. 46 and 47, in this embodiment, the movable portion 132 has a metal substrate 1321, an insulation layer 1322, and a wire layer 1323. The insulation layer 1322 is disposed between the metal substrate and the wire layer 1323. The light emitter 110 and the light receiver 120 are disposed on the insulation layer 1322 and electrically connected to the wire layer 1323.

In this embodiment, the metal substrate 1321 is constituted by a flexible sheet spring, including at least one first engaged section 1321A, at least one second engaged section 1321B, and at least one string section 1321C. The first engaged section 1321A is affixed to the fixed portion 131, the insulation layer 1322 is disposed on the second engaged section 1321B, and the string section 1321C connects the first engaged section 1321A to the second engaged section 1321B. Therefore, the light emitter 110 and the light receiver 120 can be suspended on the fixed portion 131 by the metal substrate 1321 of the movable portion 132.

The driving assembly 133 includes at least one first electromagnetic driving member 1331, at least one second electromagnetic driving member 1332, and at least one magnetic permeability member 1333. The first electromagnetic driving member 1331 is disposed on the fixed portion 131. The second electromagnetic driving member 1332 is disposed on the movable portion and corresponds to the first electromagnetic driving member 1331. The second engaged section 1321B can be driven to move relative to the fixed portion 131 by the first electromagnetic driving member 1331 and the second electromagnetic driving member 1332.

In detail, in this embodiment, the first electromagnetic member 1331 is a magnet, and the second electromagnetic member 1332 is a coil. When a current flows through the second electromagnetic member 1332, an electromagnetic effect is generated between the first electromagnetic driving member 1331 and the second electromagnetic member 1332, and the second engaged section 1321B is driven to rotate around a first rotation axis 11 relative to the fixed portion 131.

The magnetic permeability member 1333 is adjacent to the first electromagnetic member 1331 to enhance the magnetic pushing force. In some embodiments, the first electromagnetic member 1331 is a coil, and the second electromagnetic member 1332 is a magnet.

Since the light emitter 110 and the light receiver 120 are disposed on the second engaged section 1321B, when the second engaged section 1321B is driven to rotate, the light emitter 110 and the light receiver 120 rotate simultaneously. Therefore, the scanning range of the optical member driving mechanism 100 can be increased, and the situation that the reflected light cannot be received by the light receiver 120 due to the position can be reduced.

In this embodiment, the insulation layer 1322 and the second electromagnetic driving member 1332 are respectively disposed on opposite sides of the metal substrate 1321. Furthermore, the light emitter 110 and the light receiver 120 are arranged along the first rotation axis 11, so that the first rotation axis 11 passes through the light emitter 110 and the light receiver 120. In some embodiments, the light emitter 110 and the light receiver 120 are respectively disposed on the different sides of the first rotation axis 11, and the distance between the light emitter 110 and the first rotation axis 11 is substantially the same as the distance between the light receiver 120 and the first rotation axis 11.

Figure 48:
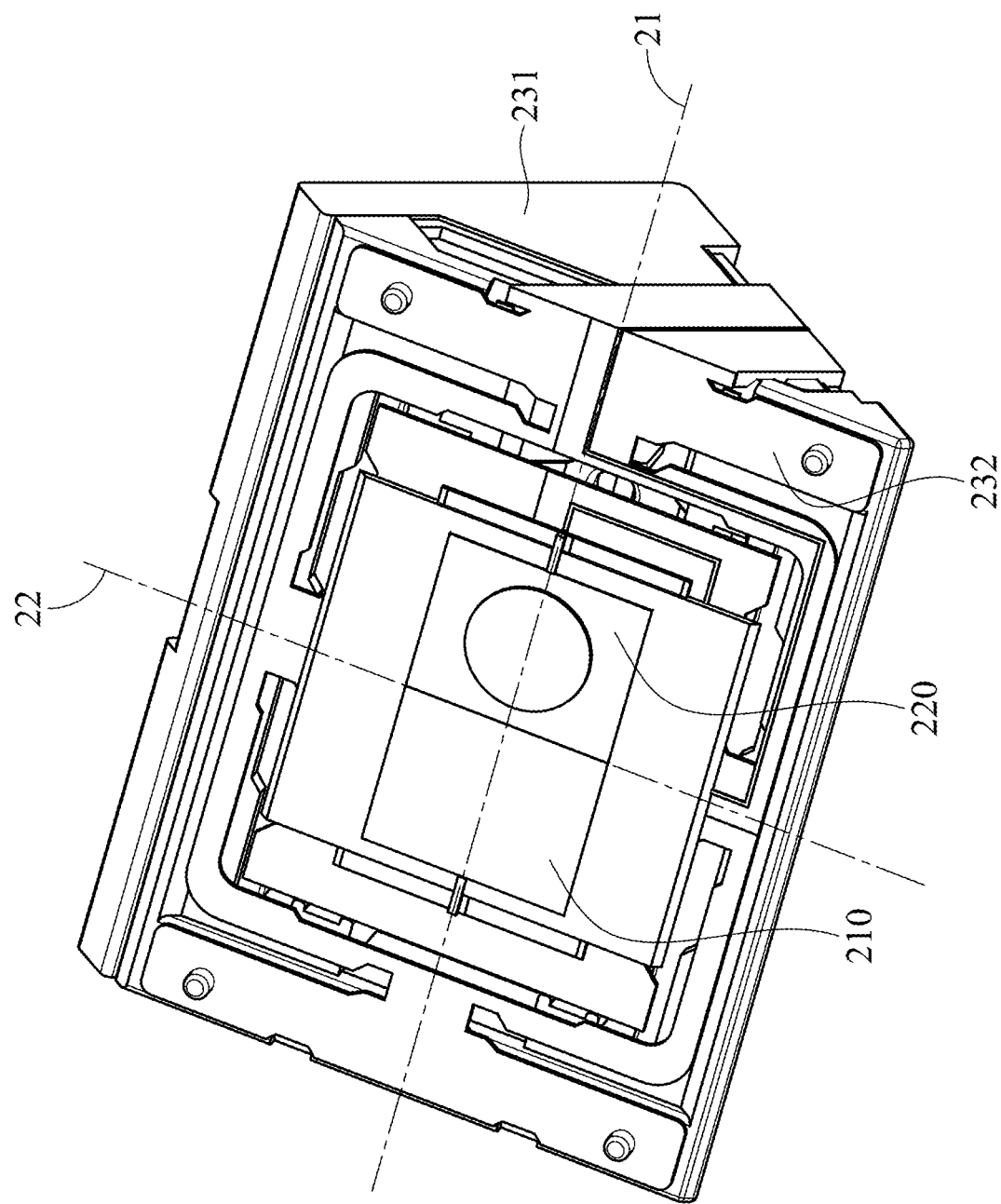
FIG. 48 is a schematic diagram of an optical member driving mechanism according to another embodiment of the invention.
Figure 49:
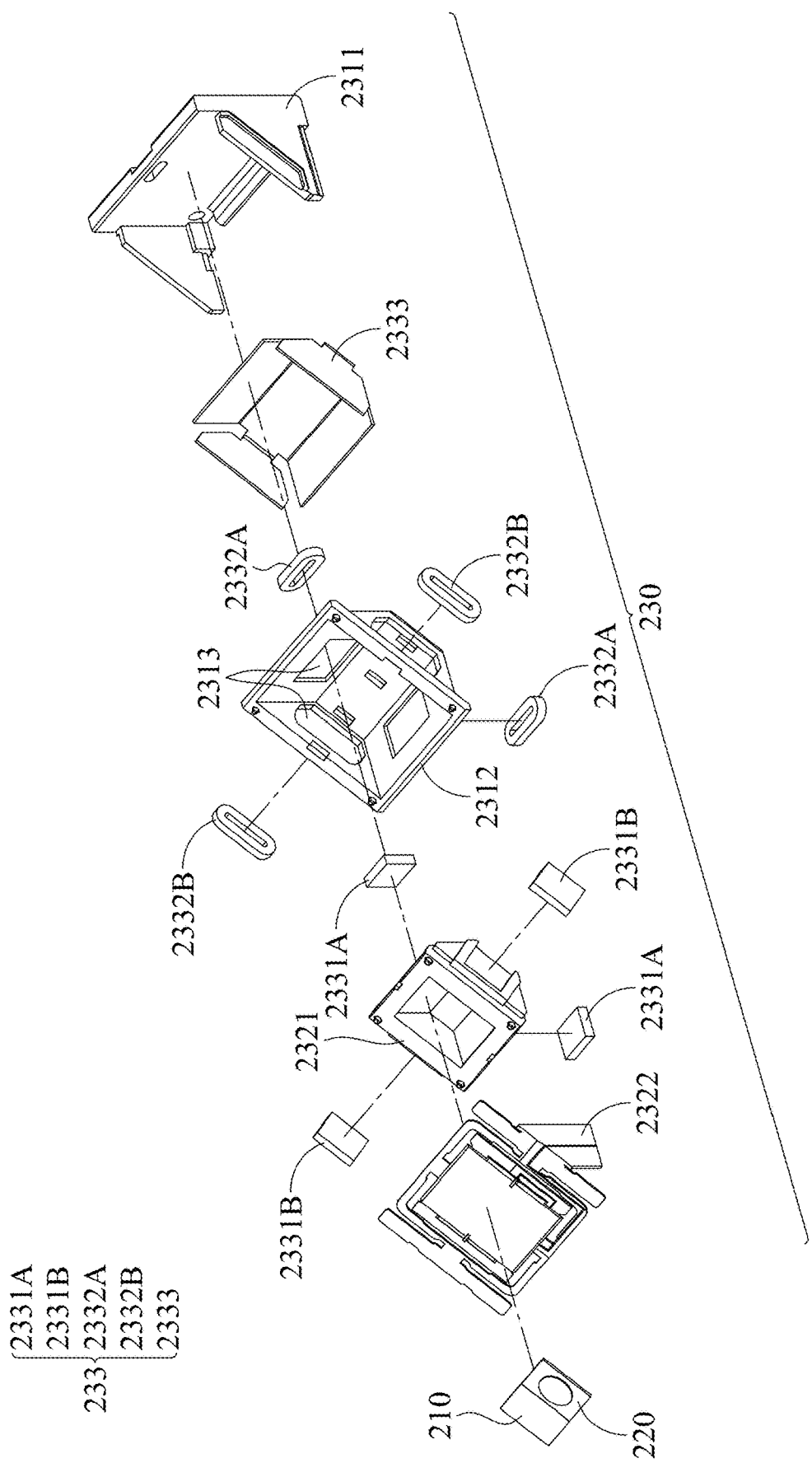
FIG. 49 is a schematic diagram of an optical member driving mechanism according to another embodiment of the invention.

Referring to FIGS. 48 and 49, in another embodiment, an optical member driving mechanism 200 primarily includes a light emitter 210, a light receiver 220, and a rotation module. The light emitter 210 and the light receiver 220 are disposed on the rotation module 230, and the rotation module 230 can drive the light emitter 210 and the light receiver 220 to rotate around a first rotation axis 21 and a second rotation axis 22, wherein the first rotation axis 21 is perpendicular to the second rotation axis 22.

The rotation module 230 includes a fixed portion 231, a movable portion 232, and a driving assembly 233. The fixed portion 231 includes a base 2311 and a frame 2312. The base 2311 is fixedly joined to the frame 2312. The movable portion 232 includes a supporting member 2321 and a carrier 2322. The movable portion 232 is movably connected to the fixed portion 231.

Figure 50:
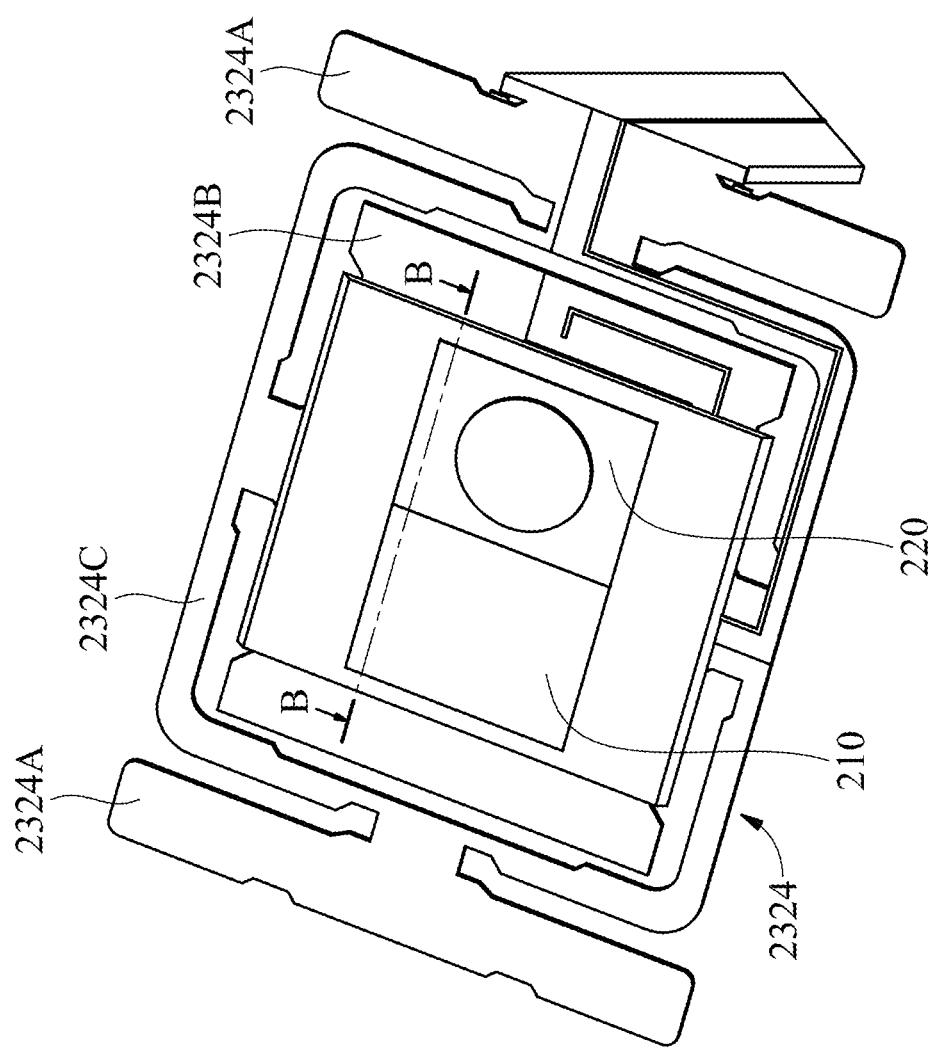
FIG. 50 is a schematic diagram of a light emitter, a light receiver, and a movable portion according to another embodiment of the invention.
Figure 51:
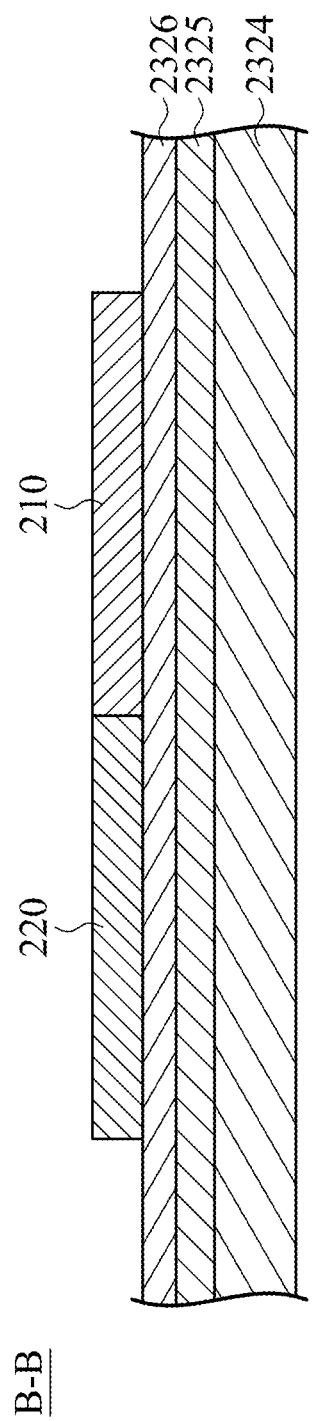
FIG. 51 is a cross-sectional view along the line B-B in FIG. 50.

Referring to FIGS. 49-51, in this embodiment, the carrier 2322 has a metal substrate 2324, an insulation layer 2325, and a wire layer 2326. The insulation layer 2325 is disposed between the metal substrate 2324 and the wire layer 2326. The light emitter 210 and the light receiver 220 are disposed on the insulation layer 2325 and electrically connected to the wire layer 2326.

In this embodiment, the metal substrate 2324 is constituted by a flexible sheet spring, including at least one first engaged section 2324A, at least one second engaged section 2324B, and at least one string section 2324C. The first engaged section 2324A is affixed to the frame 2312, the insulation layer 2325 is disposed on the second engaged section 2324B, and the string section 2324C connects the first engaged section 2324A to the second engaged section 2324B. Therefore, the light emitter 210 and the light receiver 220 can be suspended on the fixed portion 231 by the metal substrate 2324 of the movable portion 232.

The supporting member 2321 is connected to the second engaged section 2324B, and the second engaged section 2324B is disposed between the supporting member 2321 and the insulation layer 2325. The driving assembly 233 includes at least one first electromagnetic driving member 2331A, at least one first electromagnetic driving member 2331B, at least one second electromagnetic driving member 2332A, at least one second electromagnetic driving member 2332B, and a circuit board 2333. The first electromagnetic driving members 2331A and 2331B are affixed to the supporting member 2321, and respectively disposed on the different surfaces of the supporting member 2321. The circuit board 2333 is clamped between the base 2311 and the frame 2312. The second electromagnetic driving members 2332A and 2332B are disposed on the circuit board 2333, and respectively corresponds the first electromagnetic driving members 2331A and 2331B through the openings 2313 of the frame 2312. The second engaged section 2324B can be driven to move relative to the fixed portion 231 by the first electromagnetic driving members 2331A and 2331B and the second electromagnetic driving members 2332A and 2332B.

In detail, in this embodiment, the first electromagnetic members 2331A and 2331B are magnets, and the second electromagnetic members 2332A and 2332B are coils. When a current flows through the second electromagnetic member 2332A, an electromagnetic effect is generated between the first electromagnetic driving member 2331A and the second electromagnetic member 2332A, and the second engaged section 2324B is driven to rotate around the first rotation axis 21 relative to the fixed portion 231. When a current flows through the second electromagnetic member 2332B, an electromagnetic effect is generated between the first electromagnetic driving member 2331B and the second electromagnetic member 2332B, and the second engaged section 2324B is driven to rotate around the second rotation axis 22 relative to the fixed portion 231.

In some embodiments, the first electromagnetic driving members 2331A and 2331B are coils, and the second electromagnetic members 2332A and 2332B are magnets.

Since the light emitter 210 and the light receiver 220 are disposed on the second engaged section 2324B, when the second engaged section 2324B is driven to rotate, the light emitter 210 and the light receiver 220 rotate simultaneously. Therefore, the scanning range of the optical member driving mechanism 200 can be increased, and the situation that the reflected light cannot be received by the light receiver 220 due to the position can be reduced.

The light emitter 210 and the light receiver 220 are arranged along the first rotation axis 21, so that the first rotation axis 21 passes through the light emitter 210 and the light receiver 220. Moreover, the light emitter 210 and the light receiver 220 are respectively disposed on the different sides of the second rotation axis 22, and the distance between the light emitter 210 and the second rotation axis 22 is substantially the same as the distance between the light receiver 220 and the second rotation axis 22.

Figure 52:
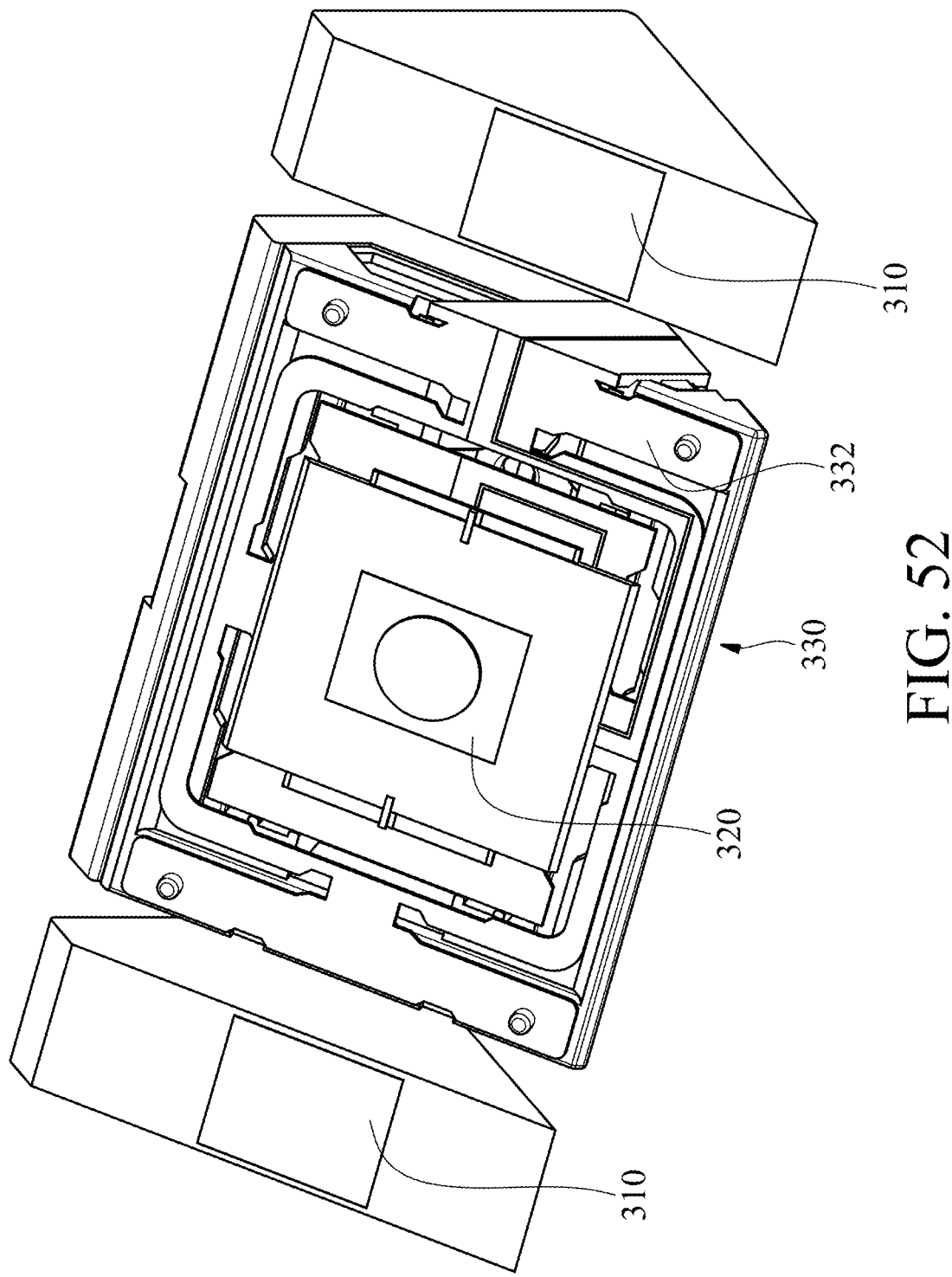
FIG. 52 is a schematic diagram of an optical member driving mechanism according to another embodiment of the invention.

Referring to FIG. 52, in another embodiment, an optical member driving mechanism 300 primarily includes two light emitters 310, a light receiver 320, and a rotation module 330, wherein the structure of the rotation module 330 is the same as that of the rotation module 230, so that the features thereof are not repeated in the interest of brevity. The light receiver 320 is disposed on the movable portion 332 of the rotation module 330, and two light emitters 310 are disposed on opposite sides of the light receiver 320. Owing to the rotation of the light receiver 320, the scanning range of the optical member driving mechanism 300 can be increased. Furthermore, since the light receiver 320 can receive the reflected lights from two light emitters 310, the profile of the object can be accurately calculated.

Figure 53:
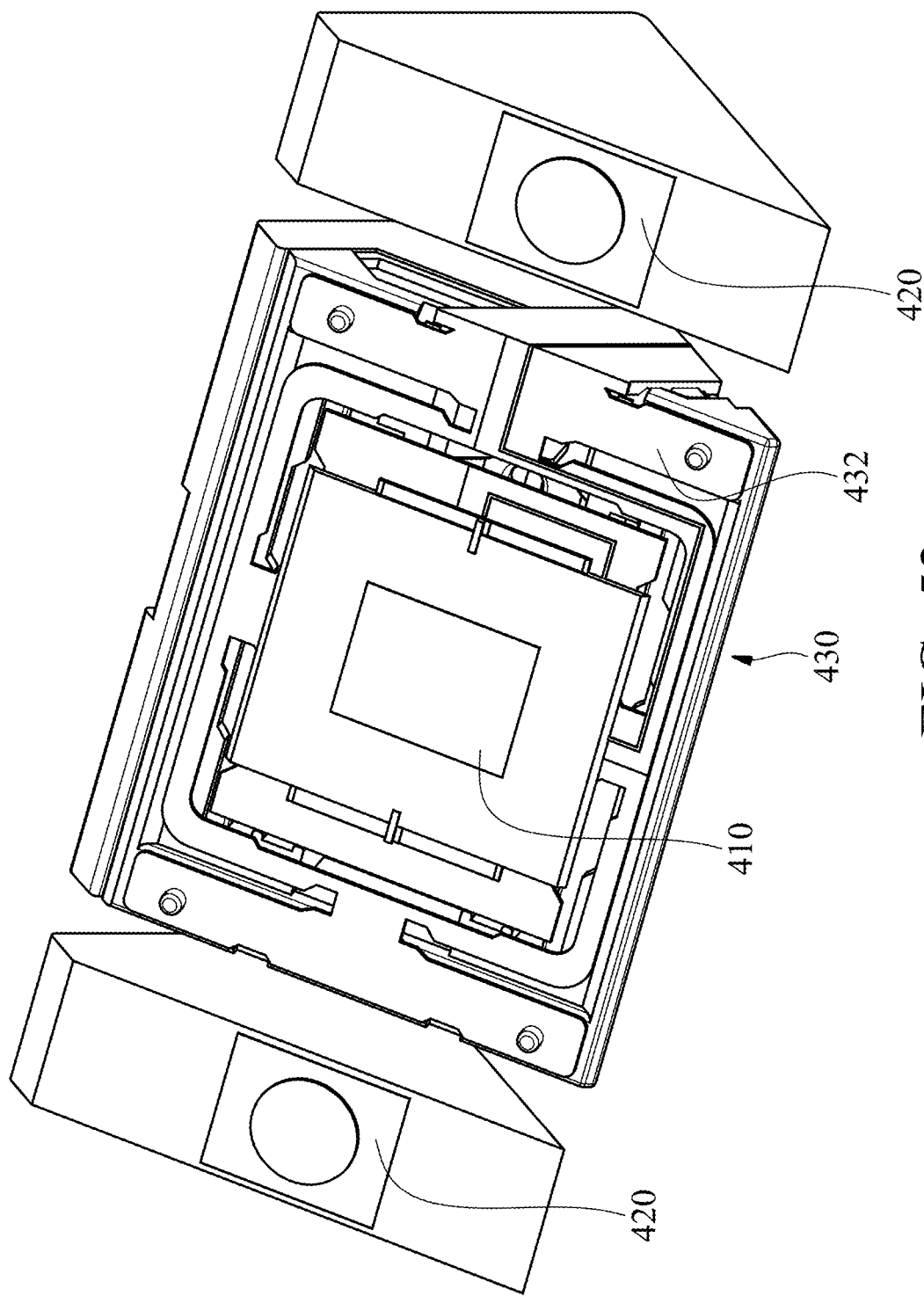
FIG. 53 is a schematic diagram of an optical member driving mechanism according to another embodiment of the invention.

Referring to FIG. 53, in another embodiment, an optical member driving mechanism 400 primarily includes a light emitter 410, two light receivers 420, and a rotation module 430, wherein the structure of the rotation module 430 is the same as that of the rotation module 230, so that the features thereof are not repeated in the interest of brevity. The light emitter 410 is disposed on the movable portion 432 of the rotation module 430, and two light receivers 420 are disposed on opposite sides of the light emitter 410. The light receiving ranges of two light receivers 420 can be overlapped. Owing to the rotation of the light emitter 410, the scanning range of the optical member driving mechanism 400 can be increased.

Figure 54:
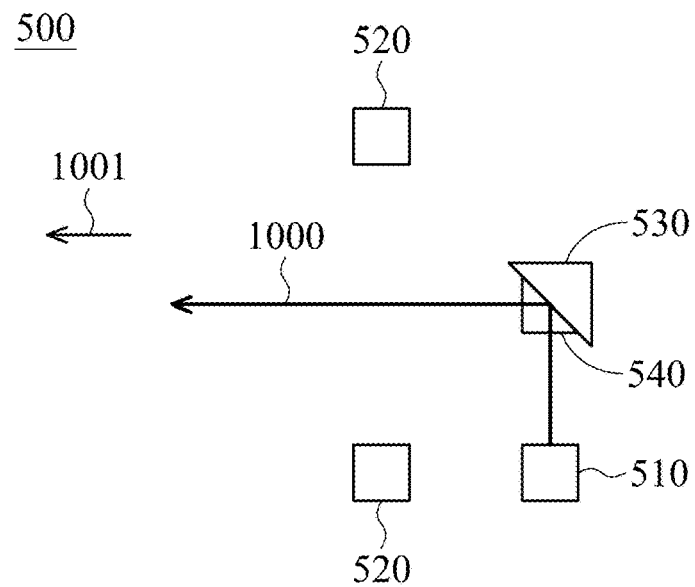
FIG. 54 is a schematic diagram of an optical member driving mechanism according to another embodiment of the invention.

Referring to FIG. 54, in another embodiment, an optical member driving mechanism 500 primarily includes a light emitter 510, two light receivers 520, a rotation module 530, and a reflecting member 540, wherein the structure of the rotation module 530 is the same as that of the rotation module 230, so that the features thereof are not repeated in the interest of brevity.

The reflecting member 540 can be a mirror or a prism, and can be disposed on the rotation module 530. The light emitter 510 emits light 1000 toward the reflecting member 540. After being reflected by the reflecting member 540, the light 1000 moves toward the object in a particular direction 1001. Two light receivers 520 are disposed on opposite sides of the reflecting member 540. After being reflected by the object, the light 1000 can be received by two receivers 520.

It should be noted that, as seen from the direction 1001, the light emitter 510 overlaps one of the light receivers 520, so as to save space. For example, the optical member driving mechanism 500 in this embodiment can be used in the vehicle, so as to save space between two receivers 520 to dispose other components.

Figure 55:
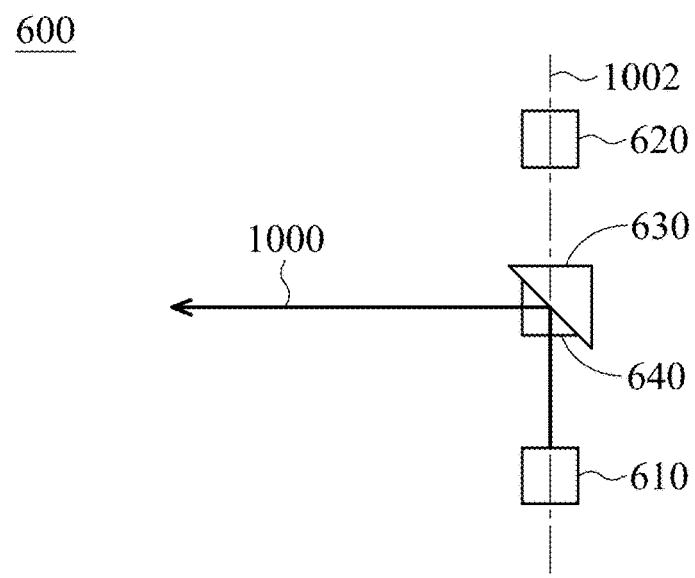
FIG. 55 is a schematic diagram of an optical member driving mechanism according to another embodiment of the invention.

Referring to FIG. 55, in another embodiment, an optical member driving mechanism 600 primarily includes a light emitter 610, a light receiver 620, a rotation module 630, and a reflecting member 640, wherein the structure of the rotation module 630 is the same as that of the rotation module 230, so that the features thereof are not repeated in the interest of brevity.

The reflecting member 640 can be a mirror or a prism, and can be disposed on the rotation module 630. The light emitter 610 emits light 1000 toward the reflecting member 640, and the reflecting member 640 reflects the light 1000 to the object. After being reflected by the object, the light 1000 can be received by the receiver 620.

Specifically, the light emitter 610, the reflecting member 640, and the light receiver 620 are arranged in a straight line 1002, so that the thickness of the optical member driving mechanism 600 can be reduced. The optical member driving mechanism 600 can be used in the portable device.

Figure 56:
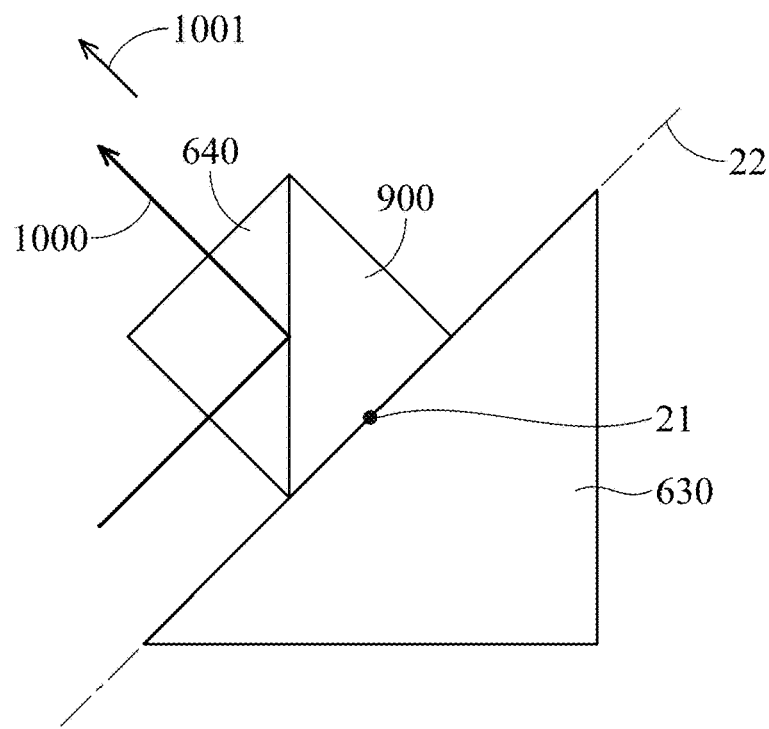
FIG. 56 is a schematic diagram of a rotation module, a reflecting member, and a light path adjusting member according to another embodiment of the invention.

In the aforementioned embodiments, when the light emitter is disposed on the rotation module, or the light is reflected by the reflecting member on the rotation module, the light being emitted toward the object may not shift horizontally due to the rotation. Therefore, as shown in FIG. 56, in some embodiments, a light path adjusting member 900 can be disposed on the rotation module 630 (or the rotation module 230, 330, 430 or 530). The light emitter 210 or 410 or the reflecting member 540 or 640 can be disposed on the light path adjusting member 900.

Owing to the light path adjusting member 900, the emission direction 1001 of the reflected light 1000 can be parallel or perpendicular to the second rotation axis 22. The light being emitting toward the object can shift horizontally.

Figure 57:
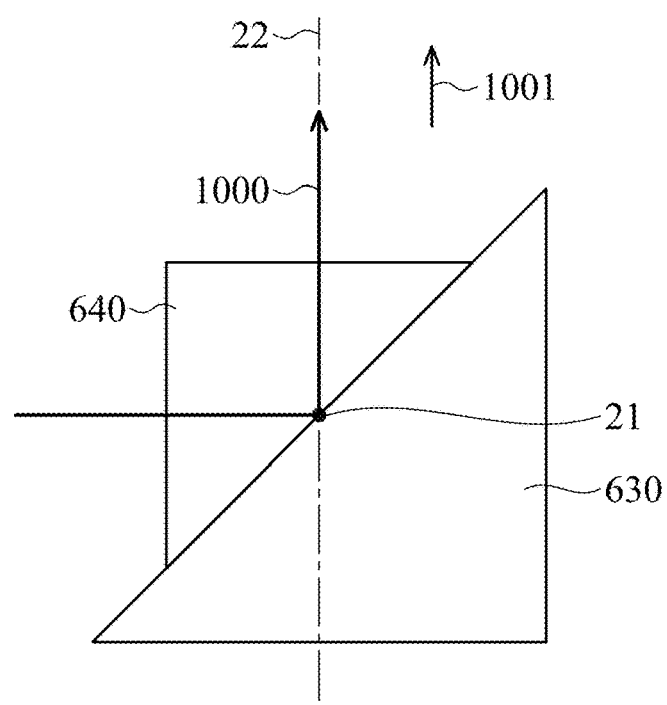
FIG. 57 is a schematic diagram of a rotation module and a reflecting member according to another embodiment of the invention.

As shown in FIG. 57, in some embodiments, the direction of the magnetic pushing force of the driving assembly 233 can be changed to adjust the second rotation axis 22. The second rotation axis 22 can be adjusted to be parallel or perpendicular to the emission direction 1001 of the reflected light 1000, so that the light being emitted toward the object can shift horizontally.

In the aforementioned embodiments, the light emitter and the light receiver can be a fill light member (such as a flash) and an image sensor.

In summary, an optical member driving mechanism is provided, including a movable portion, a fixed portion, a driving assembly, at least one light emitter, and at least one light receiver. The driving assembly is configured to drive the movable portion to move relative to the fixed portion. The light emitter emits light toward an object, and the light receiver receives the light reflected by the object.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical sensing system, comprising:
 a sensing module, having a substrate, a light guide element disposed on the substrate, and a sensing film disposed on the light guide element for retaining a specimen;
 a light emitter, emitting a sensing light to the light guide element;
 a driving mechanism, driving the light emitter to rotate relative to the sensing module; and
 a light receiver, receiving the sensing light that propagates through the light guide element.

2. The optical sensing system as claimed in claim 1, wherein the driving mechanism drives the light receiver to rotate relative to the sensing module.

3. The optical sensing system as claimed in claim 1, further comprising an analyzing device, wherein the sensing module is detachably connected to the analyzing device, and the light emitter and the light receiver are fixed in the analyzing device.

4. The optical sensing system as claimed in claim 1, wherein the driving mechanism drives the light emitter and the sensing module to rotate relative to the light receiver.

5. The optical sensing system as claimed in claim 1, wherein the driving mechanism drives the light receiver and the sensing module to rotate relative to the light emitter.

6. The optical sensing system as claimed in claim 1, wherein the light receiver is disposed on a surface of the light guide element.

7. The optical sensing system as claimed in claim 1, wherein the light emitter is disposed on a surface of the light guide element.

8. The optical sensing system as claimed in claim 7, wherein the light emitter comprises OLED.

9. The optical sensing system as claimed in claim 8, wherein the light emitter is formed on the light guide element by a coating process.

10. The optical sensing system as claimed in claim 1, wherein an evanescent wave of the sensing light causes Surface Plasmon Resonance (SPR) between the light guide element and the sensing film.

11. The optical sensing system as claimed in claim 1, further comprising an analyzing device, wherein the analyzing device has a processing unit, and the sensing module is detachably connected to the analyzing device, wherein the light receiver receives the sensing light and transmits sensing data to the processing unit according to the sensing light.

12. The optical sensing system as claimed in claim 11, wherein the sensing data includes intensity or phase information of the sensing light.

13. The optical sensing system as claimed in claim 11, wherein the analyzing device further has a memory unit and a display, and the processing unit compares the sensing data with reference data in the memory unit and then transmits an image signal to the display.

14. An optical sensing system, comprising:
 a sensing module, having a substrate, a light guide element disposed on the substrate, and a sensing film disposed on the light guide element for retaining a specimen;
 a light emitter, emitting a sensing light to the light guide element;
 a light receiver, receiving the sensing light that propagates through the light guide element; and
 a first optical coupler, disposed on the light guide element, wherein the light emitter emits the sensing light through the first optical coupler into the light guide element.

15. The optical sensing system as claimed in claim 14, further comprising a first light path adjusting element, wherein the light emitter emits the sensing light through the first light path adjusting element to the first optical coupler.

16. The optical sensing system as claimed in claim 15, further comprising a driving mechanism, wherein the driving mechanism drives the first light path adjusting element to rotate relative to the sensing module.

17. An optical sensing system, comprising:
   a sensing module, having a substrate, a light guide element disposed on the substrate, and a sensing film disposed on the light guide element for retaining a specimen;
   a light emitter, emitting a sensing light to the light guide element;
   a light receiver, receiving the sensing light that propagates through the light guide element; and
   a second optical coupler, disposed on the light guide element, wherein the sensing light sequentially propagates through the light guide element and the second optical coupler to the light emitter.

18. The optical sensing system as claimed in claim 17, further comprising a second light path adjusting element, wherein the sensing light sequentially propagates through the second optical coupler and the second light path adjusting element to the light receiver.

19. The optical sensing system as claimed in claim 18, further comprising a driving mechanism, wherein the driving mechanism drives the second light path adjusting element to rotate relative to the sensing module.

* * * * *